(12) United States Patent
Swanson et al.

(10) Patent No.: US 12,406,296 B2
(45) Date of Patent: *Sep. 2, 2025

(54) GREETING CARD WITH ACTIONABLE APERTURE

(71) Applicant: Hallmark Cards, Incorporated, Kansas City, MO (US)

(72) Inventors: Kevin Weldon Swanson, Prairie Village, KS (US); Jennifer Richards Garbos, Kansas City, MO (US); David Galen Saville, Shawnee, KS (US); Krista Masilionis, Leawood, KS (US); Stephanie Young, Overland Park, KS (US); Cecilia Jeanne Merkle, Overland Park, KS (US); Anne Horton, Overland Park, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/780,779

(22) Filed: Jul. 23, 2024

(65) Prior Publication Data

US 2024/0403943 A1 Dec. 5, 2024

Related U.S. Application Data

(60) Continuation of application No. 18/136,314, filed on Apr. 18, 2023, now Pat. No. 12,086,868, which is a (Continued)

(51) Int. Cl.
*G06Q 30/0601* (2023.01)
*B41M 7/00* (2006.01)
*B42D 15/04* (2006.01)
*G06Q 20/30* (2012.01)
*G06Q 20/32* (2012.01)
*G06Q 20/34* (2012.01)
(Continued)

(52) U.S. Cl.
CPC ....... *G06Q 30/0641* (2013.01); *B41M 7/0027* (2013.01); *B42D 15/04* (2013.01); *G06Q 20/30* (2013.01); *G06Q 20/3278* (2013.01); *G06Q 20/352* (2013.01); *G06Q 20/3567* (2013.01); *H04L 67/02* (2013.01); *H04W 4/60* (2018.02)

(58) Field of Classification Search
CPC .... B42D 15/04; B42D 15/045; B42D 15/042; G06Q 30/0641; G06Q 20/30; G06Q 20/3278; G06Q 20/352; G06Q 20/3567; G06Q 10/101; G06Q 50/10; H04L 67/02; H04W 4/60; G06K 19/06046
See application file for complete search history.

(56) References Cited

U.S. PATENT DOCUMENTS 12,086,868 B2 * 9/2024 Swanson ............ G06Q 20/3278

\* cited by examiner

*Primary Examiner* — Matthew Mikels
(74) *Attorney, Agent, or Firm* — Practus, LLP; Jesse J. Camacho

(57) ABSTRACT

A card is provided that includes, for example, a fold that defines a first panel and a second panel, where each of those panels includes front and back surfaces. The second panel includes a void. The back surface of the first panel includes an actionable unique identifier such that when the greeting card is folded along the fold lines the actionable unique identifier is visible through the void. The actionable unique identifier is usable to retrieve a digital presentation among other things.

17 Claims, 48 Drawing Sheets

Related U.S. Application Data continuation-in-part of application No. 18/076,208, filed on Dec. 6, 2022, now Pat. No. 11,977,937, and a continuation-in-part of application No. 17/180,273, filed on Feb. 19, 2021, said application No. 18/076,208 is a continuation-in-part of application No. 17/967,695, filed on Oct. 17, 2022, now Pat. No. 12,190,754, said application No. 17/180,273 is a division of application No. 15/791,576, filed on Oct. 24, 2017, now abandoned, which is a continuation-in-part of application No. 15/227,779, filed on Aug. 3, 2016, now abandoned.

(60) Provisional application No. 63/460,248, filed on Apr. 18, 2023, provisional application No. 63/460,253, filed on Apr. 18, 2023, provisional application No. 63/356,177, filed on Jun. 28, 2022, provisional application No. 63/274,455, filed on Nov. 1, 2021, provisional application No. 63/257,107, filed on Oct. 18, 2021.

(51) Int. Cl.
*H04L 67/02* (2022.01)
*H04W 4/60* (2018.01)

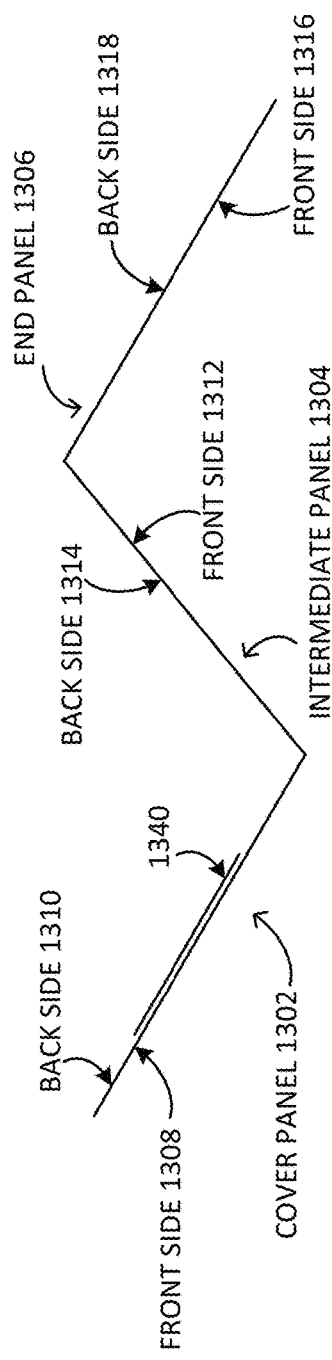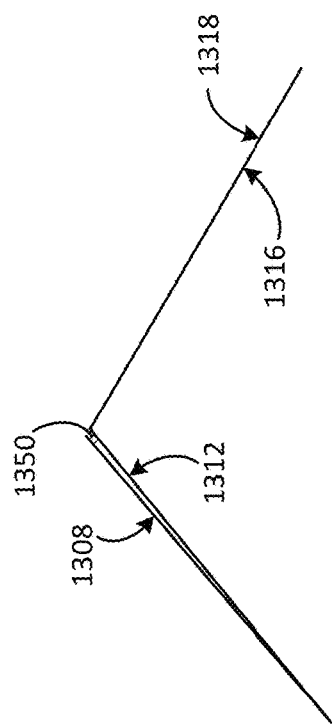
FIG. 13E.
FIG. 13F.

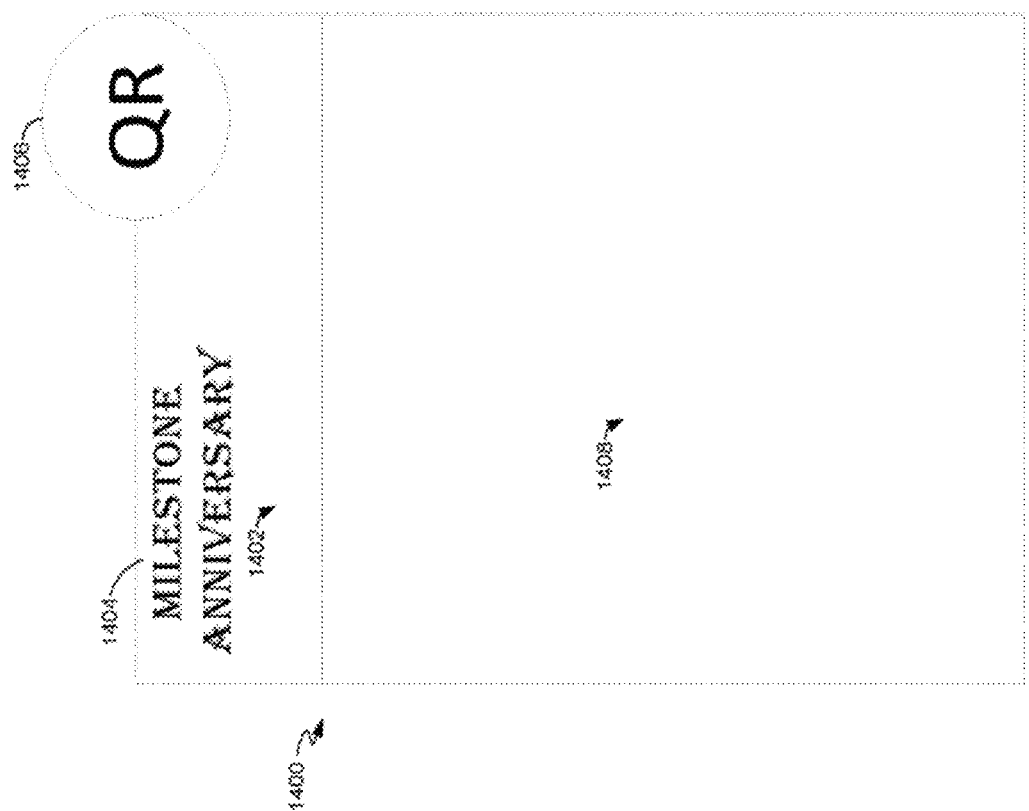

GREETING CARD WITH ACTIONABLE APERTURE

CROSS-REFERENCE TO RELATED APPLICATIONS

This Application is a Continuation Application of U.S. application Ser. No. 18/136,314 entitled "GREETING CARD WITH ACTIONABLE APERTURE" and filed on Apr. 18, 2023. U.S. application Ser. No. 18/136,314 is a CIP of two applications and claims the benefit of provisional applications and as set forth below.

U.S. application Ser. No. 18/136,314 claims the benefit of priority of the following three provisional applications: (1) U.S. Provisional Application No. 63/460,253 filed Apr. 18, 2023 and entitled "GIFTING, PRESENTING, AND CONVEYING SYSTEMS AND METHODS"; (2) U.S. Provisional Application No. 63/356,177 filed Jun. 28, 2022 entitled "SYSTEM AND METHOD FOR VIRTUALIZED OFFERINGS"; and (3) U.S. Provisional Application No. 63/460,248 filed Apr. 18, 2023 entitled "CURATING, ASSOCIATING, AND CONVEYING MEMORY REPRESENTATIONS."

U.S. application Ser. No. 18/136,314 is a Continuation-In-Part of U.S. application Ser. No. 18/076,208, filed Dec. 6, 2022 entitled "Collaborative Asset Generation and Communication" (which is a Continuation-In-Part U.S. application Ser. No. 17/967,695, filed Oct. 17, 2022 entitled "Collaborative Asset Generation and Communication," which claims the benefit of U.S. Provisional Application No. 63/257,107, filed Oct. 18, 2021, and claims the benefit of U.S. Provisional Application No. 63/274,455, filed Nov. 1, 2021). U.S. application Ser. No. 18/076,208 is now U.S. Pat. No. 11,977,937.

U.S. application Ser. No. 18/136,314 is also Continuation-In-Part of U.S. Application U.S. application Ser. No. 17/180,273 filed on Feb. 19, 2021 entitled "GIFT-TRANSFER SYSTEM" (which is a divisional application of U.S. application Ser. No. 15/791,576, filed Oct. 24, 2017 (now abandoned), which was a continuation-in-part of U.S. application Ser. No. 15/227,779, filed Aug. 3, 2016 (now abandoned)).

This Application incorporates by reference herein all the aforementioned nonprovisional and provisional applications in their entirety for all purposes.

BACKGROUND

Printing high-quality greeting cards is a complex process. Generally, printing artwork implicates different printing parameters and processes than mere black-and-white, textual, or simple color imaging that does not require high fidelity. Thus, for example, printing the likes of a QR code can implicate different processes than for printing high-quality graphics. Even so, including a QR code (or similar) as part of a greeting card, especially one that is actionable to retrieve a digital presentation is desirable. One solution to this problem was developed and described herein is to print the QR code and textual images on one unfolded surface of a card, complex artwork on the other unfolded side, and include a window such that when the card is folded, the QR code appears through the window, allowing optimal printing processes to be used while preserving the ability to include an actionable identifier useable to retrieve an optionally customizable digital presentation.

BRIEF DESCRIPTION OF THE DRAWINGS

FIGS. 13A-G illustrate a greeting card with an obscured unique identifier that is linked to a digital presentation, in accordance with aspects of the technology described herein;

FIG. 14 illustrates a greeting card with an obscured unique identifier that is linked to a digital presentation, in accordance with aspects of the technology described herein;

DETAILED DESCRIPTION

Figure 1:
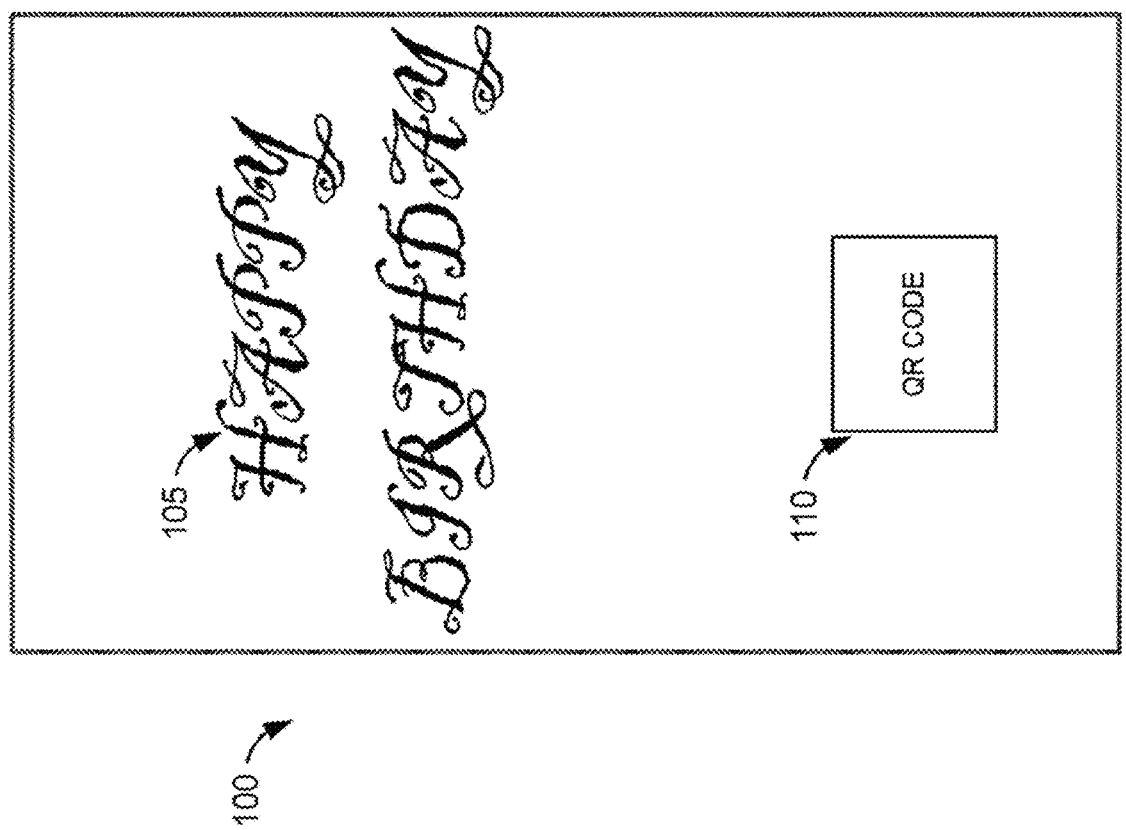
FIG. 1 is a diagram of a unique identifier (e.g., QR code) located on a tangible object, in accordance with aspects of the technology described herein.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

The technology described herein allows, among other thigs, a sender to initiate generation of a digital presentation, which may include a video generated by merging videos provided by one or more users, a gift indicia (such as an indication of a gift, a link to a gifting experience, etc.). The technology can facilitate the generation and collection of digital assets, such as video, images, gift indicia, and audio recordings from a one or more users. The digital presentation may be associated with a tangible object using a unique identifier located on the tangible object. The digital presentation may be stored in computer memory on a user-experience server and associated with the unique identifier. Instances of a single unique identifier may be placed on one or more tangible objects. Each instance may be associated with the same digital asset. When the unique identifier is provided to the user-experience server by a recipient of the tangible object, the digital presentation can be retrieved and output to the computing device that provided the unique identifier.

The tangible object may be a greeting card, gift card, ornament, picture frame, clothing, pottery, decoration, accessory, and the like. A unique identifier, such as a QR code, radiofrequency identification tag (RFID), near-field communication (NFC) chip/circuit, and/or unique design, may be located on the tangible object and used to associate the tangible object with the digital presentation. As an alternative, the unique identifier may be located on a tag (hanging tag) or decal associated with tangible object. As yet another alternative, the unique identifier may be within a box or otherwise obscured by packaging and/or integrated into packaging.

As used herein, a unique identifier may include a unique machine-readable number and/or alphanumeric sequence encoded by the unique identifier. The unique identifier allows an associated tangible object or group of related tangible objects to be differentiated from all of other similar tangible objects or groups of related tangible objects even among the same model of tangible object. For example, a first instance of a generic birthday card with a first design has a first unique identifier and a second instance of same generic birthday card has a second unique identifier that is different than the first unique identifier.

Similarly, each card in a first batch of generic birthday cards with a first design has a first unique identifier and each card in a second batch of the same generic birthday card has a second unique identifier that is different than the first unique identifier. In this way, each card in the first batch may be linked to the same digital presentation and each card in the second batch linked to a second digital presentation. In one aspect, the digital presentation is stored in a cloud data store and indexed with an identifier linked to the QR code or other unique identifier. Upon scanning the QR code with a visual sensor (e.g., camera) on a computing device, such as a smart phone, an application on the device may retrieve the digital presentation and present it to the user. In one aspect, the digital presentation includes one or more of gifting indicia, a customized video generated by one or more users, a selection of photos, sounds. For example, the customized video may be from a collection of users wishing happy birthday to a recipient of a greeting card.

Generation of the digital presentation may be originated by a sender of the greeting card, or other tangible object, by the sender scanning a unique identifier located on the greeting card. A single unique identifier is associated with a single digital presentation in one embodiment. Associating the same unique identifier with one or more tangible objects associates each of the tangible objects with the single digital presentation. For example, the same unique identifier may be printed on (including affixing a printout to) one or more greeting cards, mugs, cups, journals, books, picture frames, ornaments, toys, and the like.

For example, all cards in a box of cards may have the same unique identifier. In this way, all of the recipients are able to view the digital presentation. For example, a family may generate a digital presentation that can be associated with a group of holiday greeting cards. Each recipient of a holiday greeting card may access the same digital presentation by scanning the unique identifier on the card. The sender may purchase the tangible object with the unique identifier located on it. The unique identifier may be obscured by packaging, a box, a removable portion of the tangible object (e.g. a flap), a moveable portion of the tangible object, and the like. The sender may need to remove packaging or manipulate the portion of the tangible object obscuring the unique identifier to scan the unique identifier. Thereafter, the system may associate the unique identifier with the digital presentation. Scanning the unique identifier can cause the collaborative-asset application to display the digital presentation to a recipient and/or a sender for editing, approval, or viewing.

The digital presentation (e.g., only an indicia of a gift sandwiched between system-proposed bookended content in some embodiments) may be intended for viewing by the recipient of the tangible object. Scanning the unique identifier may cause a customized video application on the phone to be opened, gift to appear, or begin a series of steps or interactions that require engagement by the user to convey the gift. The digital-presentation application may be provided by a digital-presentation service. The digital-presentation service may edit and join groups of videos provided by one or more users into a single video.

In an aspect, the first time the unique identifier is scanned, the digital presentation building interface is opened. The second time the unique identifier is scanned, the viewing interface is opened. In other aspects, the interface asks whether the user is a sender or receiver and the appropriate interface is then shown. In an aspect, the viewing interface is not available until after the digital presentation is finalized. Once finalized, the next scan may result in the application opening the viewing interface.

Returning to the digital-presentation application, the sender may be asked to login to an existing account or create an account for the customized video service. Other persons contributing content to the digital presentation may also log in. The unique identifier is stored in a memory accessible by the user-experience server. The user-experience server can associate the unique identifier with a digital asset, such as an image or video, designated by the user. The tangible object can be communicated to a recipient. For example, a greeting card can be mailed from a sender to a recipient.

The digital-presentation application can interact with a service that allows the sender to invite others to contribute to the digital presentation. The service may allow the sender to enter email addresses, phone numbers for texts, social media identifiers, or other means to contact potential collaborators. The service can track sent invitations and whether content was contributed by invitation recipients. The sender may receive notifications when new content is added. The service may combine the videos of one or more users into a single digital presentation. The sender may be able to approve and edit the digital presentation before allowing it to be viewed by the recipient.

In some aspects, a digital presentation may be configured for playback and/or interaction at one or more different timepoints. For example, to incorporate both time-constrained, and free-time playback options, one or more features may be incorporated into the user experience for playback of the digital presentation, such that the asset recipient (e.g., a greeting-card recipient that is gifted a card having a code that retrieves the particular digital presentation) and potentially one or more of the asset contributors (e.g., the greeting-card purchaser and any other contributor to the recorded digital content compilation) may interact at any time or at a particular timepoint with the digital content, or with the card recipient.

In some aspects, an asynchronous "party" may be created where the digital-presentation recipient is invited to join and interact with the digital-presentation contributors. The greeting-card recipient may scan a unique identifier to retrieve the digital presentation, and at the same time, an invitation to each digital-presentation contributor may be provided, so that contributors can see and/or interact with the recorded content of the other contributors, and the contributors themselves.

In this embodiment, attendees to the asynchronous party could participate at any time, given that the card recipient is invited to view the content and interact with the dedications within the recorded content at any time. In other embodiments, the card recipient may be invited to view the content and interact in real time with the recorded segments or other provided content from each contributor.

In further aspects, a video greeting card creator/purchaser, may be able to monitor if a card contributor has viewed, opened, or responded to the video content of the digital presentation. In some aspects, each of the content contributors may be able to view each of the other contributions to the entire collaborative content, while in further aspects, collaborators/contributors to the content may be further able to invite additional contributors/attendees to the asynchronous party platform by inviting the participants to socialize/view the recorded content. In another embodiment, contributors may assist in editing or creating the final digital presentation content, while in further embodiments, the greeting-card recipient may be able to respond back to all contributors.

In some aspects, an "event" date may be determined for engaging each of the digital collaborators, providing a reminder of different timepoints, such as the date/time to submit content to the digital presentation, and a date/time to rejoin the card recipient to view the collaborative content together. In further aspects, the unique identifier printed within the greeting card may be able to initiate recording by the greeting card purchaser, retrieve the collaborative recorded content for viewing by the greeting-card recipient, and initiate subsequent engagement and/or interaction between the greeting-card recipient and at least one of the digital-presentation contributors after delivery of the greeting card to the recipient.

In an aspect, the tangible object includes two obscured unique identifiers. One of the two obscured unique identifiers may be removable from the tangible object. In this way, the sender may keep the second unique identifier, while the first unique identifier remains attached to the tangible object. In one aspect, the item (e.g., removable tab) obscuring the permanent unique identifier includes a second copy of the unique identifier. Initially, both the first and second copy are obscured. In an aspect, the second unique identifier is located on an inside surface of a box used to as packaging for the tangible object or group of tangible objects, such as a box lid.

FIGS. 1-5 illustrate the use of the technology with a greeting card. However, aspects of the technology described herein are not limited to use with a greeting card. The example of FIGS. 1-5 describes the transfer of a greeting card between a first user and a second user. The first user is described as the sender and the second user is described as the recipient. The use of a QR code is one example of a unique identifier that may be suitable. FIGS. 1-16 primarily describe the technology in the context of a single tangible object with a unique identifier even though a tangible object is not necessary in all embodiments. FIGS. 17-22 primarily describe the technology in the context of a plurality of tangible objects with the same unique identifier. In both cases, a single digital presentation is associated with a single unique identifier.

Turning now to FIG. 1, the greeting card 100 includes a happy-birthday message 105 and a QR code 110. Though not shown, the greeting card 100 could also include stock-keeping unit ("SKU") identifiers. The SKU identifies the greeting card model but not the individual greeting card. In other words, all greeting cards of the same model may have the same SKU. The SKU may be used to identify a fiducial mark pattern associated with the card model. Different card models may include different fiducial marks, different arrangements of fiducial marks, and different amounts of fiducial marks, among other differences. In aspects, the SKU and/or card design could be used to identify the card in combination with the QR code 110 or other identifiers. The QR code is an example of a unique identifier.

Figure 2:
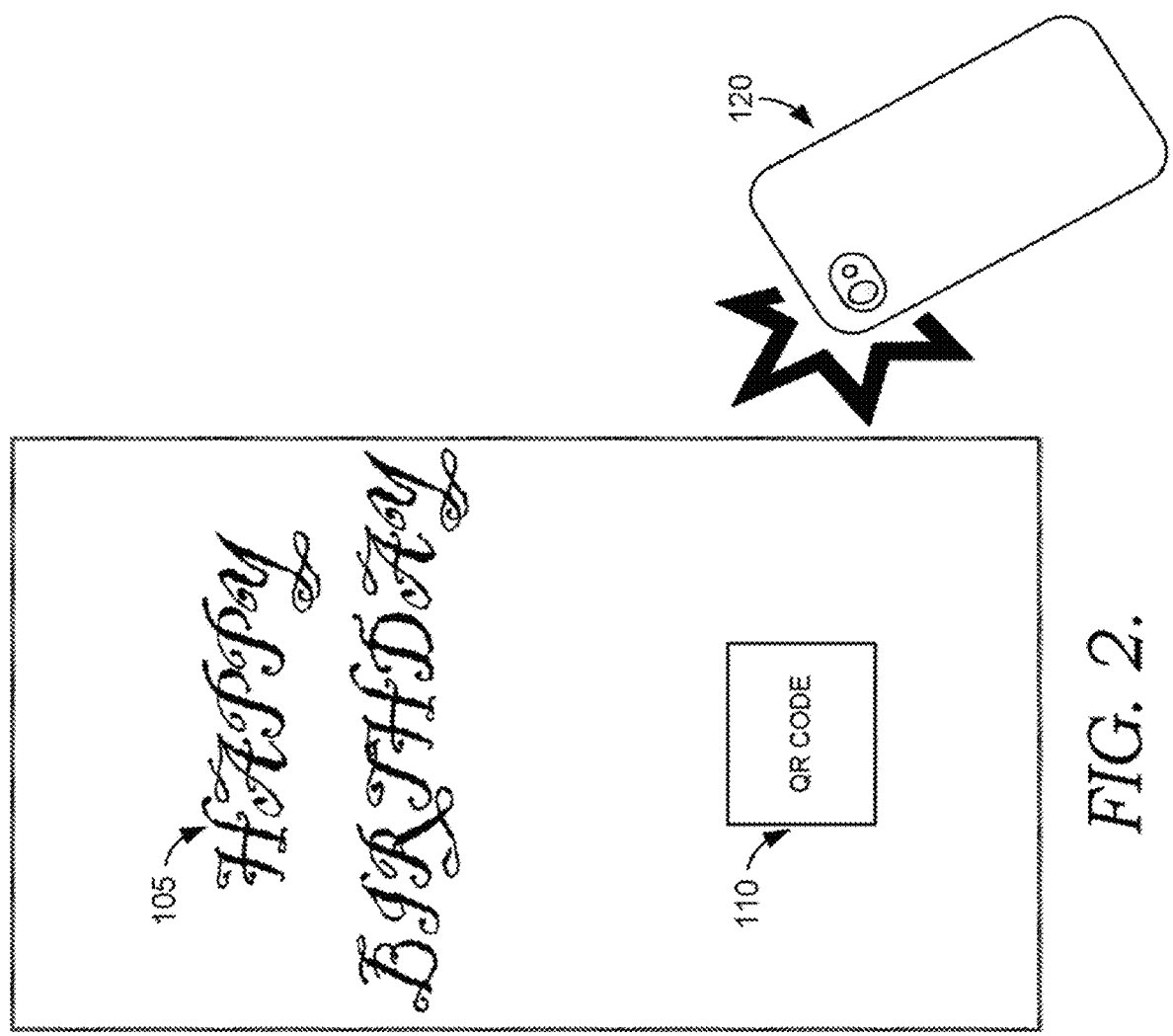
FIG. 2 is a diagram of a sender scanning a unique identifier (e.g., QR code) located on a tangible object, in accordance with aspects of the technology described herein.

Turning now to FIG. 2, the sender opens a customization interface of a greeting-card application running on a mobile device 120 and takes a picture of the QR code 110 with the mobile device's camera. The customization interface may provide instructions that ask the user to capture the portion of the greeting card including the QR code 110. In other words, the portion of the tangible object captured by the camera should include the QR code 110. When the SKU is included on the tangible object, then the instruction may request that the SKU also be included in the image. In this case, instructions could indicate that the QR code 110 should be captured along with the SKU and possibly other card design features. In aspects, one or more images may be requested. For example, when an SKU is located on the back of a greeting card and the QR code is located on the front.

The customization interface and/or greeting-card application can perform a quality check on the image. If the QR code 110 and/or other requested card features are not within the captured image, then the sender may be prompted to capture a second image. Alternatively or additionally, the quality check can be performed in real time through analysis of the video or gift indicia being indicated and instructions provided to adjust the camera location as needed. If the QR code 110 and other features are within the field of view, then the greeting-card application instructs the user to capture an image, for example by tapping the screen.

Figure 3:
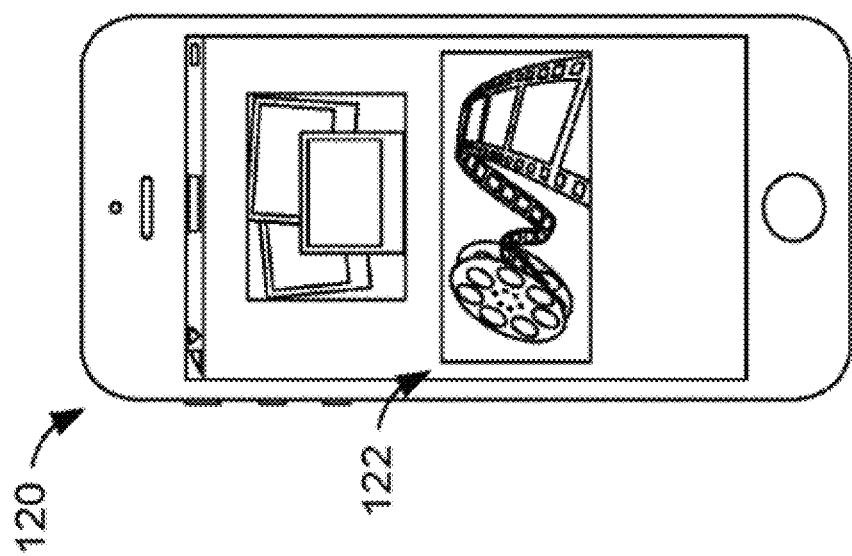
FIG. 3 is a diagram of a digital asset selection interface that a sender uses to associate a digital asset with the tangible object, in accordance with aspects of the technology described herein.

Turning now to FIG. 3, the sender 114 selects one or more digital assets to associate with a digital presentation that is associated with the greeting card 100 through the unique identifier. The digital assets may be identified through a customization interface provided by the greeting-card application. The digital assets can include assets located on a mobile device, PC, smart pad, etc. such as existing pictures and videos. The digital assets can include assets located on a server, such as gift indicia or publicly or privately available pictures and videos. The digital asset may also be created through the customization interface. For example, the customization interface can facilitate the user recording an audio or video message that becomes part of the digital presentation. Back-end services, such as the user-experience server 702, associate digital presentations with unique identifiers. The unique identifier is then stored in association with a reference to the digital presentation. The unique identifiers may be used to retrieve the digital presentations and output those assets to a recipient of the greeting card.

The greeting-card application can include an interface through which others are invited to contribute content. The content provided by others can be combined to form a digital presentation.

Figure 4:
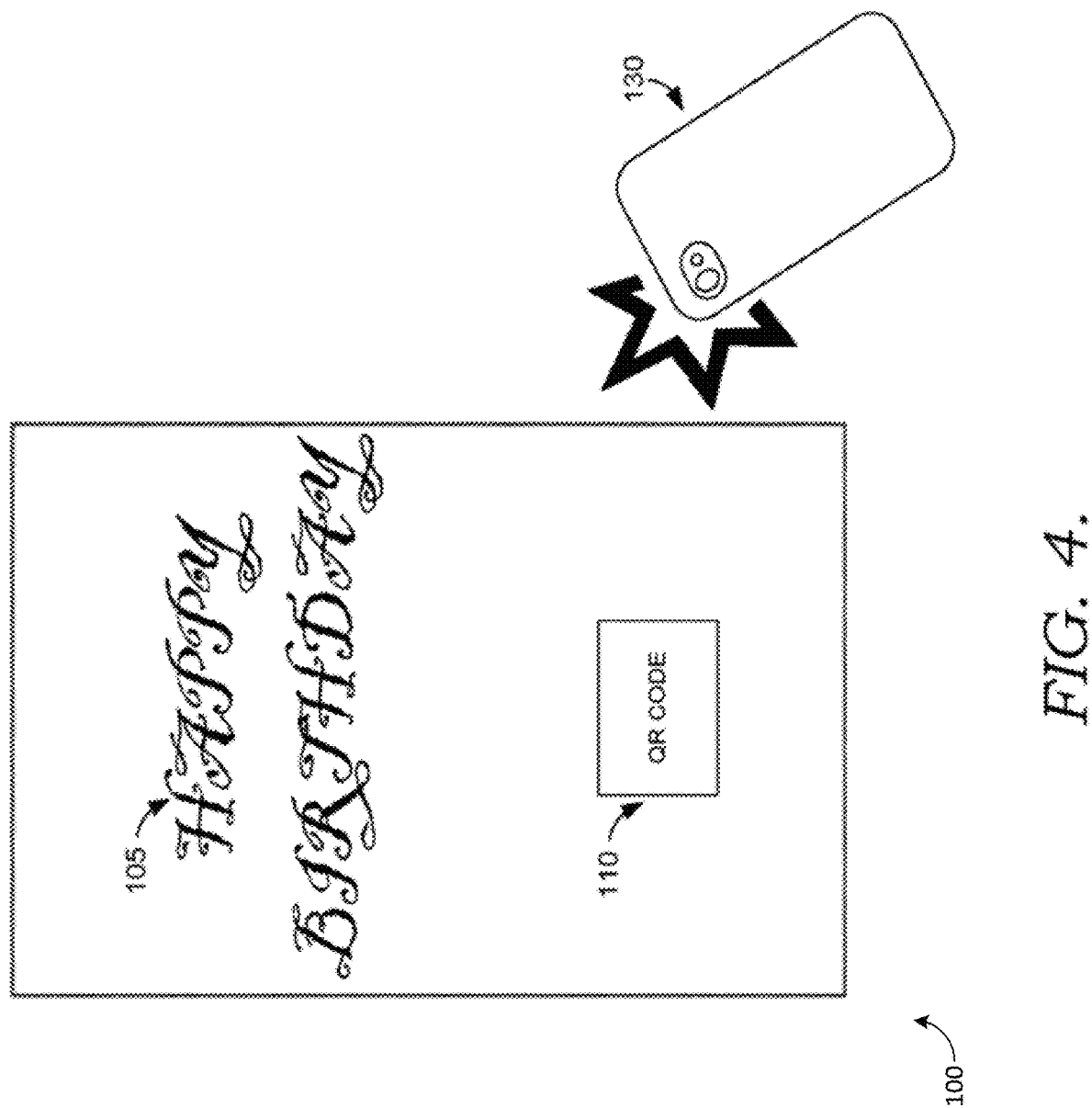
FIG. 4 is a diagram of a recipient scanning a QR code on the tangible object, in accordance with aspects of the technology described herein.

Turning now to FIG. 4, the recipient of the greeting card 100 opens the greeting-card application in the recipient's mobile device 130 and scans the greeting card. As before, the greeting-card application may provide instructions to the recipient to scan an adequate portion of the tangible object.

Figure 5:
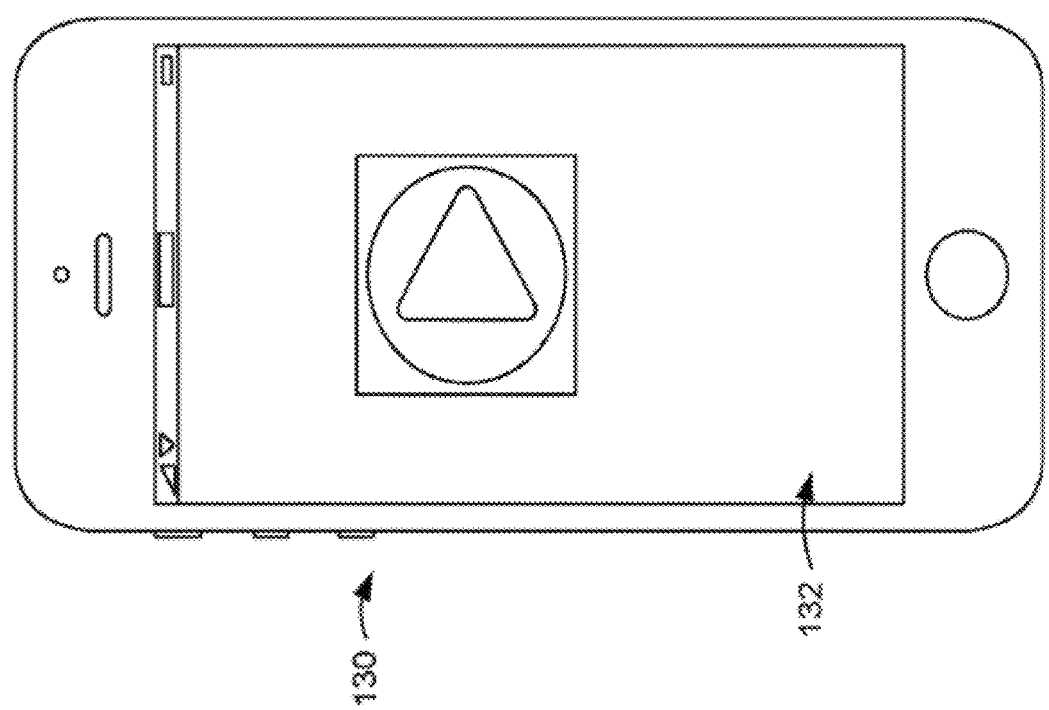
FIG. 5 is a diagram of a recipient viewing the digital presentation via the recipient's user device, in accordance with aspects of the technology described herein.

Turning now to FIG. 5, the greeting-card application then uses the image captured by the recipient to retrieve the unique identifier using the QR code 110 and/or other identifiers. The unique identifier is then sent to the user-experience server with instructions to retrieve any digital presentation associated with unique identifier. The digital presentation 132 is then provided to the recipient's mobile device 130 and output to the recipient.

Figure 6:
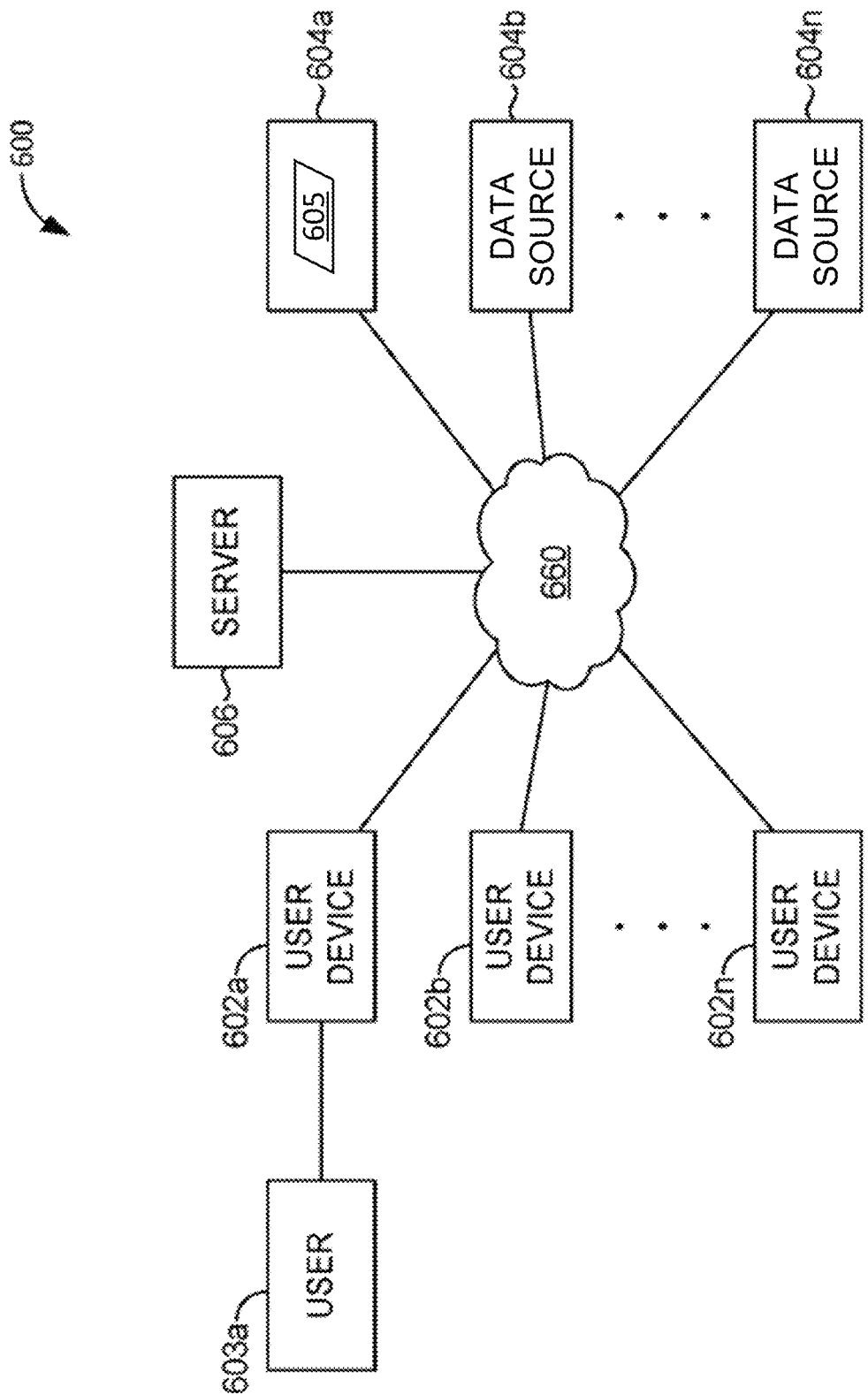
FIG. 6 is a block diagram of an exemplary computing environment suitable for use in implementing embodiments of the present disclosure.

Turning now to FIG. 6, a block diagram is provided showing an operating environment 600 in which some embodiments of the present disclosure may be employed. This and all arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 600 includes a number of user devices, such as user devices 602a and 602b through 602n; a number of data sources, such as data sources 604a and 604b through 604n; server 606; user 603, and network 660. Each of the aforementioned data sources need not be a discrete datastore. For example, they could be the internet or any source of data that could provide or create a digital asset 605.

Digital asset 605, as mentioned, could be one or more videos, images, gift indicia (such as an indication of a gift such as a QR code, a link to a gifting experience), audio, textual data, etc.).

Environment 600 shown in FIG. 6 is an example of an illustrative operating environment. Each of the components shown in FIG. 6 may be implemented via any type of computing device, such as computing device 1100, described in connection to FIG. 11. These components may communicate with each other via network 710, which may include, without limitation, one or more local area networks (LANs) and/or wide area networks (WANs). In exemplary implementations, network 710 comprises the Internet and/or a cellular network, amongst any of a variety of possible public and/or private networks.

Any number of user devices, servers, users, and data sources may be employed within operating environment 600 within the scope of the present disclosure. Each may comprise a single device or one or more devices cooperating in a distributed environment. For instance, server 606 may be provided via one or more devices arranged in a distributed environment that collectively provide the functionality described herein. Additionally, other components not shown may also be included within the distributed environment.

User devices 602a and 602b through 602n may comprise any type of computing device capable of use by a user 603. For example, in one embodiment, user devices 602a through 602n may be the type of computing device described in relation to FIG. 11 herein. By way of example and not limitation, a user device may be embodied as a personal computer (PC), a laptop computer, a mobile device, a smartphone, a tablet computer, a smart watch, a wearable computer, virtual reality headset, augmented reality headset, a personal digital assistant (PDA), an MP3 player, global positioning system (GPS) or device, video player, handheld communications device, gaming device or system, entertainment system, vehicle computer system, embedded system controller, a camera, remote control, a bar code scanner, a computerized measuring device, appliance, consumer electronic device, a workstation, or any combination of these delineated devices, or any other suitable device.

User devices 602a and 602b through 602n can be client devices on the client-side of operating environment 600, while server 606 can be on the server-side of operating environment 600. Server 606 can comprise server-side software designed to work in conjunction with client-side software on user devices 602a and 602b through 602n to implement any combination of the features and functionalities discussed in the present disclosure. This division of operating environment 600 is provided to illustrate one example of a suitable environment, and there is no requirement for each implementation that any combination of server 606 and user devices 602a and 602b through 602n remain as separate entities.

Each user device 602a and 602b through 602n can be associated with one or more users, such as user 603. The users can include sender and recipients as described herein. Some user devices can be associated with one or more users, such as a family PC, game console, meeting room PC, electronic white board, and such. Similarly, a single user can be associated with one or more devices, including shared devices. A user sign-in identification can be used to determine the user operating a user device at a point in time and to associate actions taken with a user record.

Data sources 604a and 604b through 604n may comprise data sources and/or data systems, which are configured to make data available to any of the various constituents of operating environment 600, or digital-presentation system 700 described in connection to FIG. 7. For instance, in one embodiment, one or more data sources 604a through 604n provide (or make available for accessing) digital assets that can be included or combined in a digital presentation and associated with unique identifiers. The digital assets 605 can be uploaded from user devices 602a through 602n and/or provided via server 606 or accessed via other public or private networks.

Figure 7:
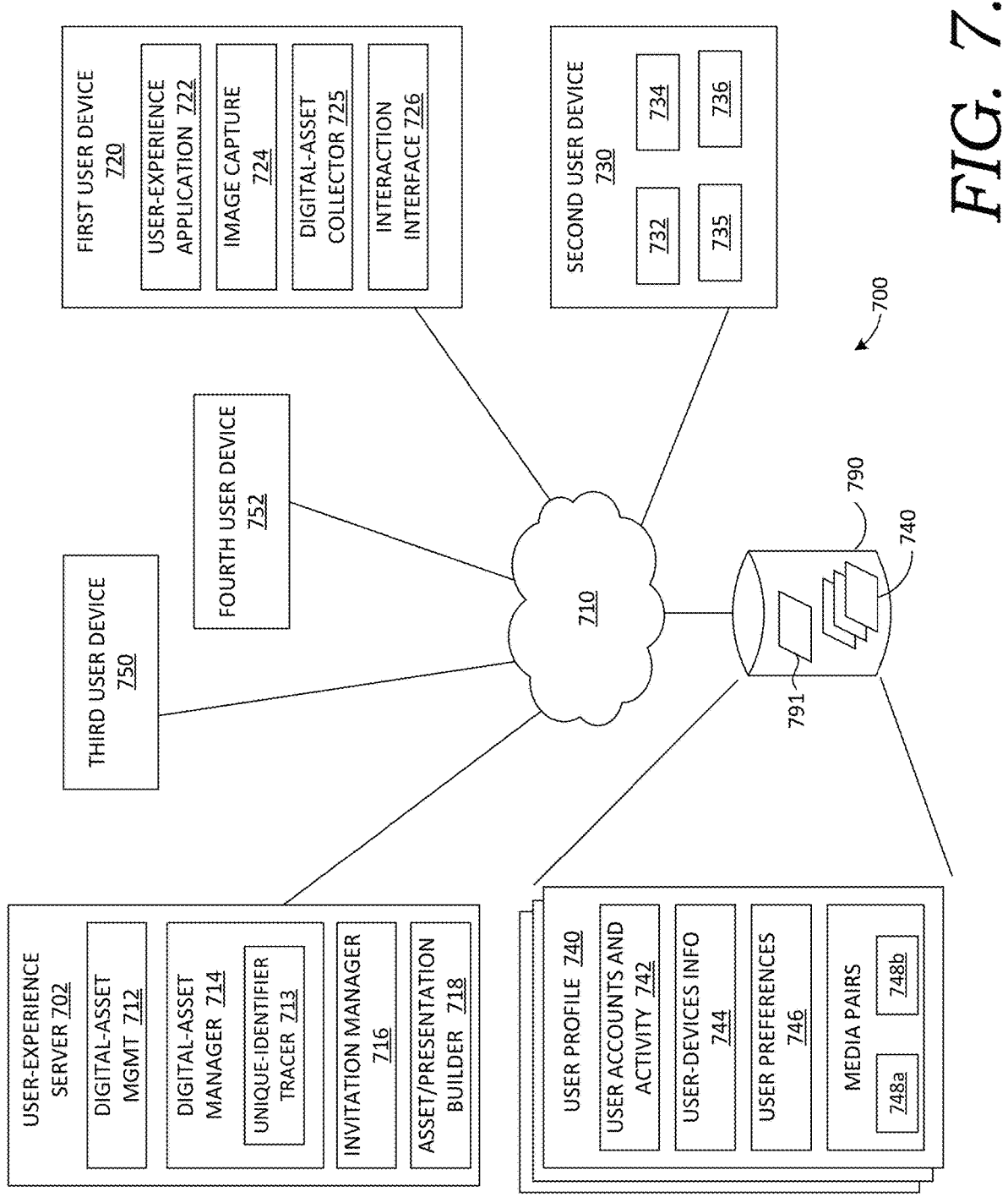
FIG. 7 is a block diagram illustrating an exemplary digital-presentation system in which some embodiments of the present disclosure may be employed.

Turning now to FIG. 7, a block diagram is provided illustrating an exemplary digital-presentation system 700 in which some embodiments of the present disclosure may be employed. The digital-presentation system 700 includes network 710, which is described in connection to FIG. 6, and which communicatively couples components of system 700. The components of digital-presentation system 700 may be embodied as a set of compiled computer instructions or functions, program modules, computer software services, or an arrangement of processes carried out on one or more computer systems, such as computing device 1100 described in connection to FIG. 11.

In one embodiment, the functions performed by components of digital-presentation system 700 are associated with one or more applications, services, or routines. In particular, such applications, services, or routines may operate on one or more user devices (such as user device 602a), servers (such as server 606), may be distributed across one or more user devices and servers, or be implemented in the cloud. Moreover, in some embodiments these components of digital-presentation system 700 may be distributed across a network, including one or more servers (such as server 606) and client devices (such as user device 602a), in the cloud, or may reside on a user device such as user device 602a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regard to specific components shown in digital-presentation system 700, it is contemplated that in some embodiments functionality of these components can be shared or distributed across other components.

The digital-presentation system 700 generally operates to identify a unique identifier on a tangible object, such as a greeting card. The unique identifier is used to associate a digital asset, such as a video, with the greeting card. The digital asset can be retrieved when the recipient of the card scans the unique identifier. As briefly mentioned above, each component of the digital-presentation system 700, including the user-experience server 702, first user device 720, second user device 730, third user device 750, fourth user device 752, and storage 790 and their respective subcomponents, may reside on a computing device (or devices).

The user-experience server 702 is responsible for providing the server-side of the user experience in some embodiments. Using a greeting card as an example, the user-experience server 702 will receive a unique identifier and a designated digital asset from the sender's user device. For the purpose of illustration, the first user device 720 is described as the sender's user device and the second user device 730 is described as the recipient's user device. The third user device 750 and fourth user device 750 are collaborating devices. The user-experience server 702 will associate the unique identifier and the digital asset together within a data store as a seed for a digital presentation.

The invitation-management component 716 sends invitations asking potential collaborators to submit content for the digital presentation. Invitations may be tracked and follow ups provided until content is received or a deadline is reached. Progress notifications may be provided to the sender. The digital-presentation builder 718 edits the original digital asset provided by the sender and the additional assets received from collaborators to build a digital presentation.

When the unique identifier is provided to the user-experience server 702 by the recipient of the tangible item, then the digital presentation can be retrieved and communicated to the computing device that provided the unique identifier the second time. Optionally an address, such as a URL, where a digital asset can be found can be communicated instead of the digital asset itself.

The user-experience server 702 includes sub-components, such as digital asset management component 712, digital presentation manager 714, unique-identifier tracker 713, invitation manager 716, and digital-presentation builder 718. These components work together to provide the experience described above.

The digital asset management component 712 manages digital assets and the association of the digital asset with a unique identifier. Managing the digital asset can include storing the digital asset. For example, pictures, videos, gift indicia, and audio recordings provided by the sender or collaborators may be stored by the digital asset management component 712. The digital assets provided by a particular sender could be stored in storage 790 and associated with a user profile 740 of the particular sender. In the example shown, the media pairs 748 include a digital asset 748a and an identifier 748b associated with it. A particular user, such as the sender, may be associated with one or more media pairs. In instances where the digital asset is already stored in association with a video provider, such as a social media platform, the digital asset 748a could be a link or reference to the digital asset. Any method of storing or identifying the digital asset in such a way that it may be retrieved in the future is suitable for use with the technology described herein.

Storing the media pairs in association with the user profile 740 can allow the user to modify the association. For example, a user that initially established the pairing may choose to delete the content, modify the content, etc.

The first user device 720 and the second user device 730 are provided. As mentioned, the first user device 720 can correspond to a user device used by a sender, while the second user device can be used by recipient. Both devices can include the same components, but these components may perform different functions depending on whether the device is a sender or recipient.

The user-experience application 722 can perform functions on behalf of the sender and receiver. The functions performed by the user-experience application 722 working on behalf of the sender are explained in conjunction with the user-experience application 722. Functions performed by a recipient are explained subsequently in association with the description of the user experience application 732. The user-experience application 722 could be a cloud-based experience provided through a web browser. The user-experience application 722 could be a specialized application that runs on the first user device 720 and communicates with a back-end service.

The user-experience application 722 can initiate generation of a customization interface by the customization interaction interface component 726. The customization interface can provide instructions asking the user to scan a unique identifier on the tangible object. The instructions can use a combination of textual explanation and images.

The image capture component 724 captures an image of the unique identifier and optionally an SKU. The image capture component 724 can then send the image to the user experience application 722 for further use.

The digital asset collection component 725 can provide an interface that allows the user to select a digital asset to associate with the tangible object as a seed for a digital presentation. The digital assets can include assets located on the mobile device, such as existing pictures and videos. The digital assets can include assets located on a server, such as publicly or privately available pictures and videos. The digital asset may also be created by the customization interface. For example, the customization interaction interface 726 can facilitate the user recording an audio or video message that becomes the digital asset. The unique identifier and the digital asset and/or identification information for the digital asset are communicated to the user-experience server 702. The user-experience server 702 maintains an association between digital assets and unique identifiers. The unique identifiers may be used to retrieve the digital presentations after digital assets are combined and output those digital presentations to a recipient of the greeting card.

The second user device 730 is used by the recipient of the tangible object. For example, a sender associated with the first user device 720 could mail a greeting card to the user of the second user device 730. The second user could then open the user-experience application 732 and follow instructions provided to retrieve a digital presentation associated with the tangible object by the first user. The user-experience application 732 could be a cloud-based experience provided through a web browser. The user-experience application 732 could be a specialized application that runs on the second user device 730 and communicates with a back-end service. The user-experience application 732 can generate a customization interface 736 that instructs the user to take a picture of the QR code on the greeting card or other tangible object. The image capture component 734 can capture an image QR code and communicate the image or code extracted from the image to the user-experience application 732. The image or code can then be communicated to the user-experience server 702. The user-experience server 702 analyzes the code and identifies the digital presentation associated with the unique identifier generated by analysis of the image. The digital asset collection 735 can perform functions that allow the digital presentation to be output to the user through the second user device 730.

User profile 740 includes user accounts and activity data 742, user device information 744, user preferences 746, and media pairs 748. User account(s) and activity data 742 generally includes user data related to the sending and receiving of tangible object using the user-experience server. In particular, user account(s) and activity data 742 can include data regarding user emails, texts, instant messages, calls, and other communications; social network accounts and data, such as news feeds; online activity; calendars, appointments, or other user data used by components of the system. Embodiments of user account(s) and activity data 742 may store information across one or more databases, knowledge graphs, or data structures.

As discussed hereinabove, user device information 744 may include identification information for devices used by a single user. The user device information can be used for security reasons to validate a user, maintain a secure session, and for other purposes. User preferences 746 can include various permissions, such as how long digital assets and the association between the digital assets and the unique identifier should be maintained.

The user preferences can include opt-in and opt-out selections for the sharing and collection of personal information. The activity data 742 can include a record of each digital presentation created or in progress. In aspects, the activity data 742 can be used to associate a newly scanned unique identifier with an existing digital presentation and/or digital presentation building project. In aspects, the user may be given an option to start a new digital presentation or link an existing digital presentation to a unique identifier scanned for the first time.

FIGS. 8A-G illustrate actions taken by a sender during generation of a digital presentation, in accordance with aspects of the technology described herein.

Figure 8A:
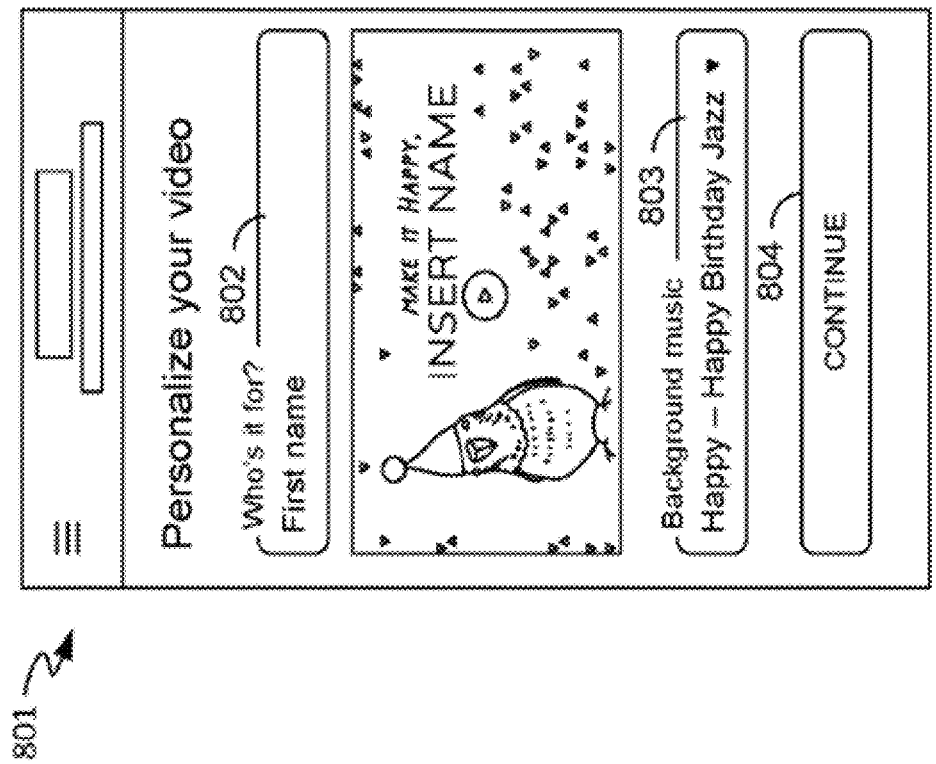
FIGS. 8A-G illustrate actions taken by a sender during generation of a digital presentation, in accordance with aspects of the technology described herein.

Turning now to FIG. 8A, shows a starting interface 801 for the digital presentation generation process. The interface 801 may be shown after the user logs into the digital presentation generation system. The interface 801 allows the sender to designate a recipient by name by entering the recipient's name in the text box 802. The sender may also select a theme (not shown), background music through a music drop down interface 803, and/or other creative aspects to be used when generating the digital presentation. The user may be asked to select from stock content provided by the digital-presentation service. The stock content may match the theme. Selecting the continue button 804 brings the user to the next interface.

Figure 8B:
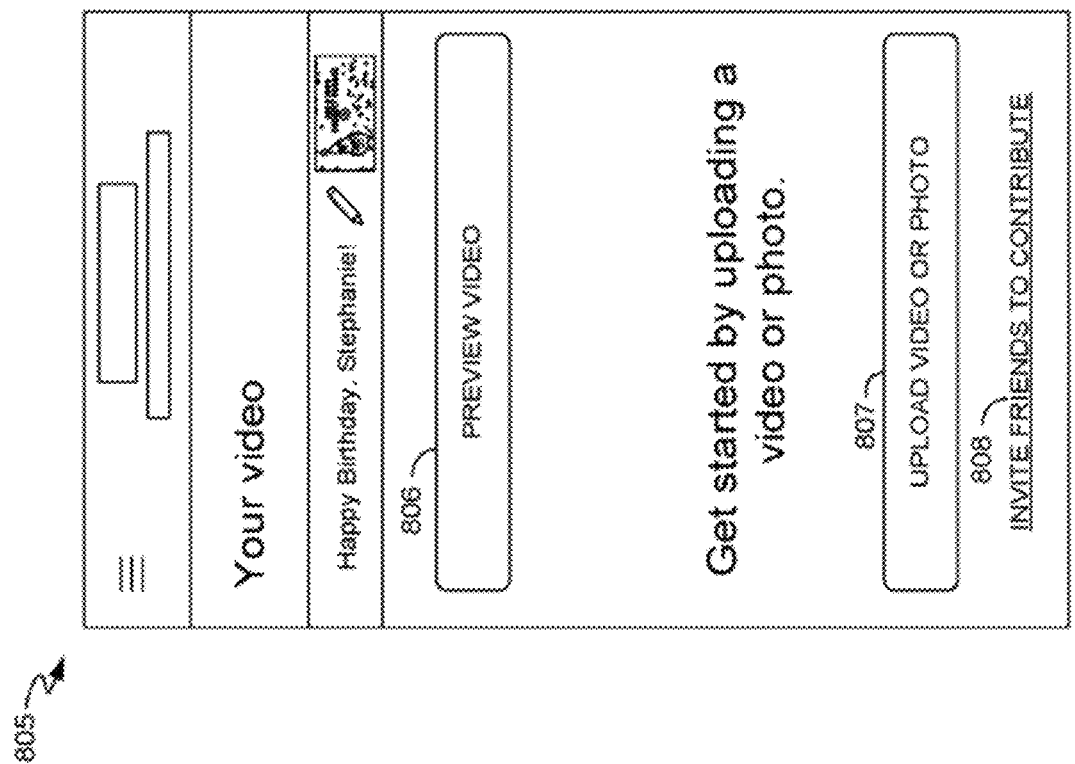

Turning now to FIG. 8B, shows an asset-upload interface 805, in accordance with aspects of the technology described herein. The asset-upload interface 805 allows the user to generate gift indicia or video and/or upload pre-existing content, such as a video, photograph, or audio file to act as a seed for the collaborative content. Selecting the preview video button 806 will play the current version of the digital presentation video. The user may start the process of uploading a video or photo by selecting the video upload button 807. In an aspect, the digital asset selection interface 809 is opened in response to selecting the video upload button 807. Selecting the invite a friend link 808 will open an interface through which friends may be invited to contribute content to the digital presentation. In an aspect, selecting the invite a friend link opens the invitation interface 901 of FIG. 9A.

In one aspect, the asset is a digital gift card or other holder of monetary value. The digital gift card may not be provided in or viewable within the digital presentation. Instead, it may be displayed in the interface used to view the digital presentation. It could also be separately communicated in electronic form to the recipient upon the recipient scanning the unique identifier.

Figure 8C:
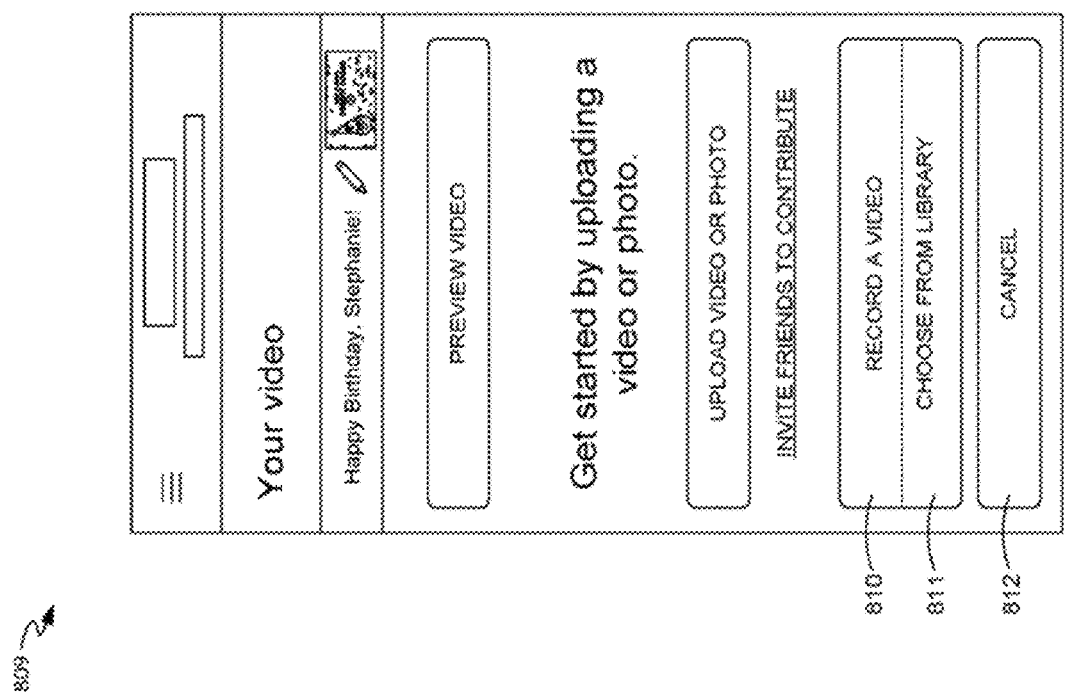

Turning now to FIG. 8C, a digital-asset selection interface 809 is shown, in accordance with aspects of the technology described herein. The digital-asset selection interface 809 gives the user the choice of creating content by selecting the record-a-video button 810 or selecting content from a library by selecting the choose-from-a-library button 811. Pressing the cancel button 812 may return the user to the digital asset-upload interface 805.

Figure 8D:
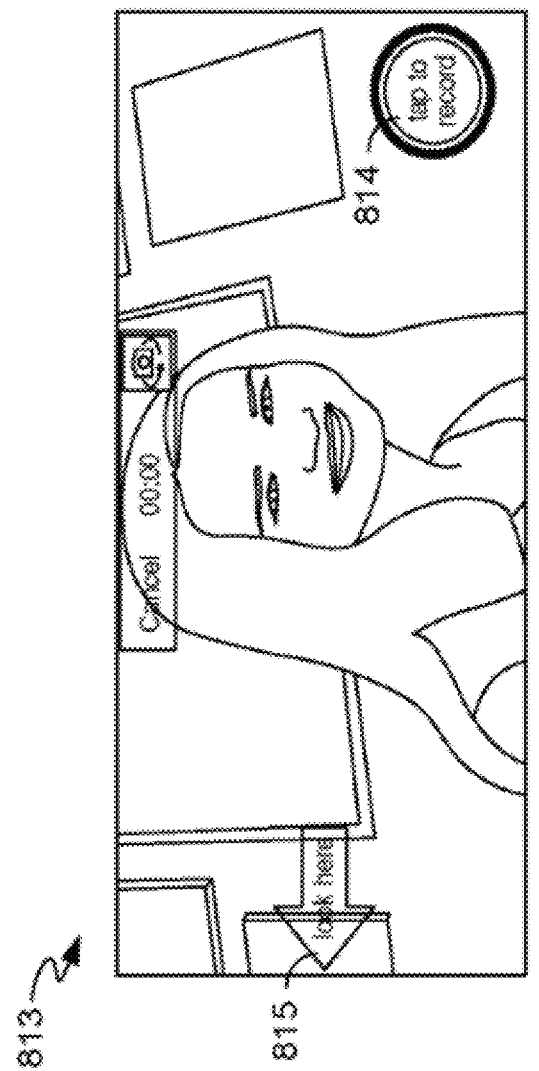

Turning now to FIG. 8D, a video creation interface 813 is shown, in accordance with aspects of the technology described herein. The video creation interface 813 allows a user to create a custom video. The video may be created using the front-facing camera on a smartphone or tablet. Alternatively, a webcam may be used. The smartphone interface may provide helpful instructions, such as reminding the user to look at the camera on the phone, rather than the screen, with a look-here arrow 815. The user may start recording by selecting the tap-to-record button 814. Once a video is recorded, the user may preview the video and then uploaded it, if satisfied. Otherwise, the user may attempt to record a second video and may repeat this process until the user is satisfied with the video created.

Figure 8E:
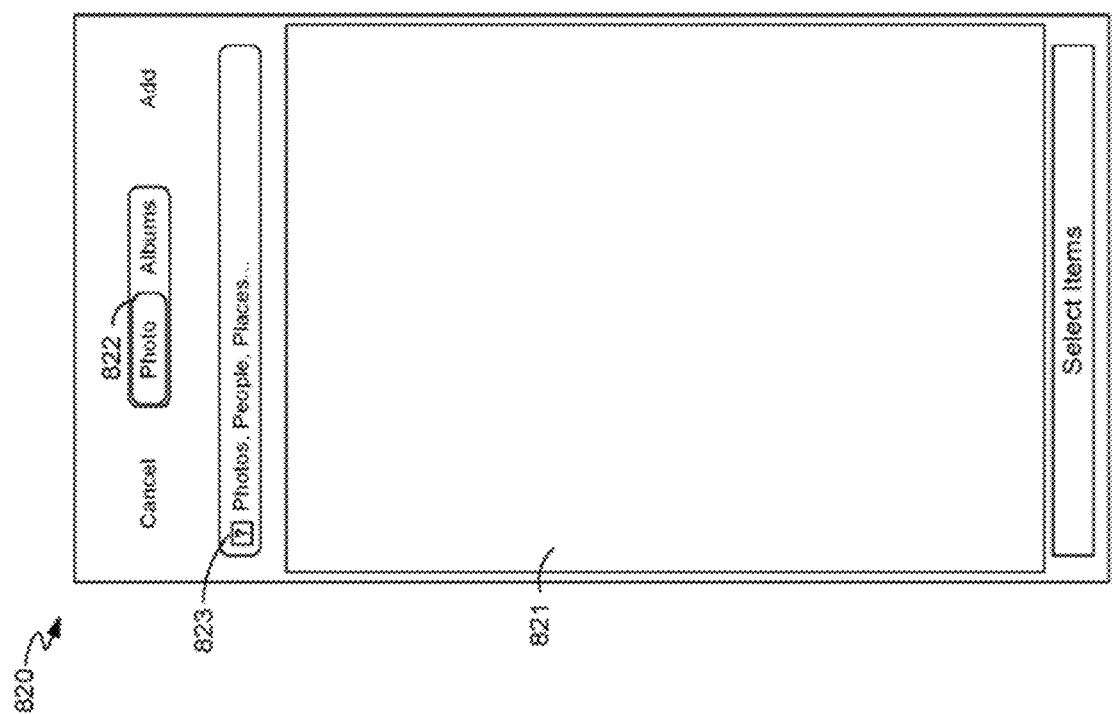

Turning now to FIG. 8E, a photo or video selection interface 820 is shown, in accordance with aspects of the technology described herein. The photo or video selection interface 820 allows a user to select pre-existing photos or videos. As can be seen, a filter 822 allows either photos or albums to be selected to help the user navigate to the desired content. The selection interface 821 may show thumbnails of the content to help the user identify the correct asset to upload to the digital-presentation service. A search box 823 is provided for the user to enter a search query meant to return a relevant video or photo.

Figure 8F:
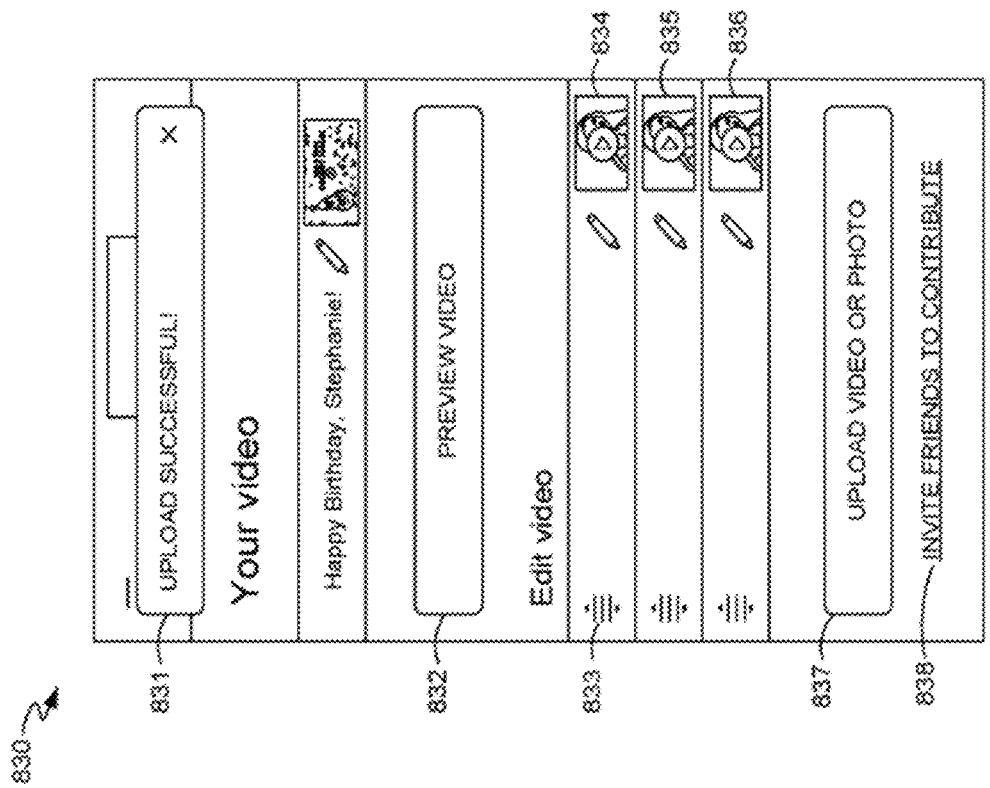

Turning now to FIG. 8F, a confirmation interface 830 is shown, in accordance with an aspect of the technology described herein. The confirmation interface 830 shows thumbnails (834, 835, and 836) of the uploaded content and a successful upload message 831. The confirmation interface 830 allows the sender to upload additional content through the upload video button 837 and to invite others to upload content through the invite others button 838. Selection of the invite others button 838 may take the user to the screen shown in FIG. 9A. Selection of the edit video control 833 enables the user to edit the associated video. The editing can include deleting all or part of the associated video. The digital presentation may be previewed by selecting the preview button 832.

Figure 8G:
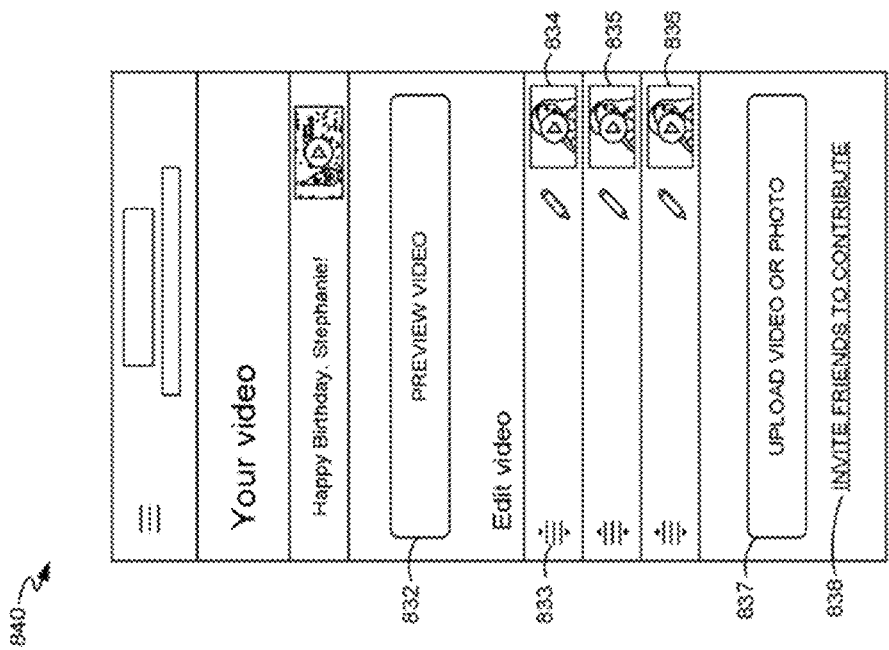

Turning now to FIG. 8G, a content management interface 840 is shown, in accordance with an aspect of the technology described herein. The content management interface 840 allows the user to edit the order of content, add content, or delete content from the digital presentation project. In one aspect, the added content is library content that can be placed anywhere within the digital presentation. The library content may be provided by a service that facilitates generation of the digital presentation. The library content could include a celebrity greeting, animation, or other type of content. The library content may be consistent with a theme on the tangible object. In aspects, the unique identifier is pre-associated with content that is consistent with a theme (e.g., happy birthday, happy anniversary) on the tangible object.

FIGS. 9A-E illustrate actions taken to invite others to contribute content to the generation of a digital presentation, in accordance with aspects of the technology described herein.

Figure 9A:
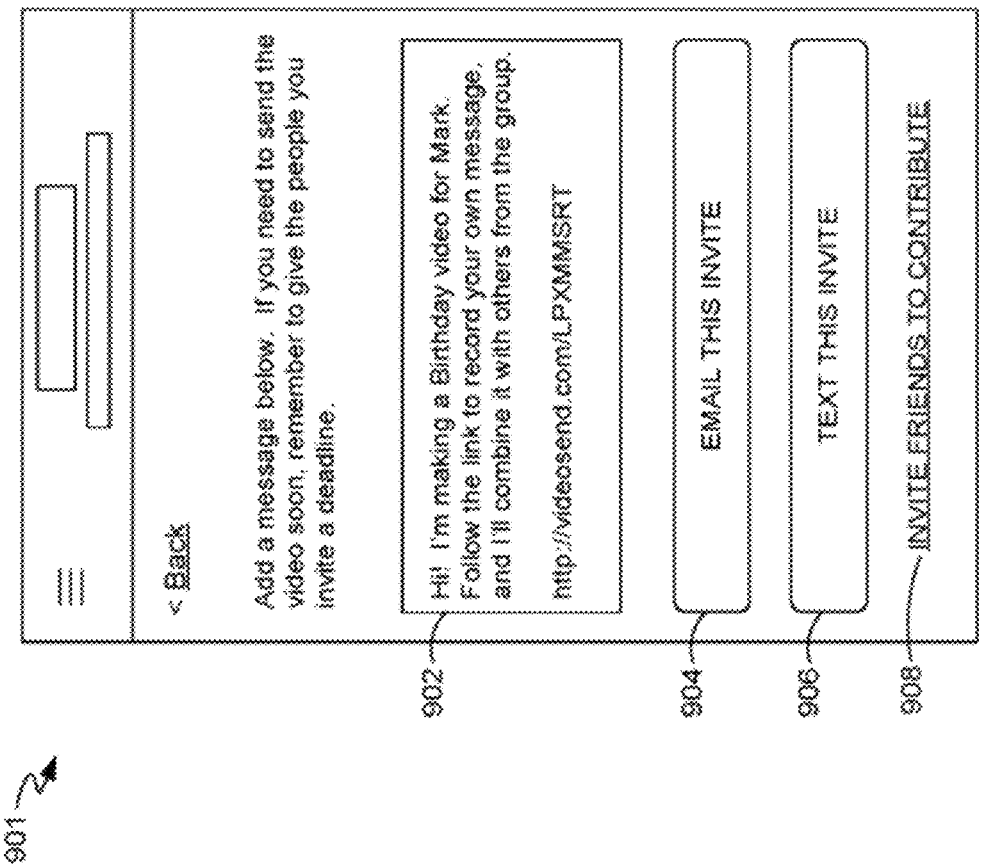
FIGS. 9A-E illustrate actions taken to invite others to contribute content to the generation of a digital presentation, in accordance with aspects of the technology described herein.

Turning now to FIG. 9A, an invitation interface 900 is shown, in accordance with aspects of the technology described herein. The invitation interface 900 is used by the sender to identify collaborators to which invitations to collaborate will be sent. In one aspect, the application may use a text system, social media application or email application on a smart device to send the invitation to the potential collaborators. In this way, the invitation appears to be a text or email sent from the sender to the collaborator. In another aspect, the email address, social media ID, or phone number are provided by the user and the system generates a text, email, or social media message that is sent from the system to the potential collaborator. Either way, the invitation will provide a link for the collaborator to follow if the potential collaborator chooses to participate.

A customized message to potential collaborators can be entered in text box 902. The message provided may be included in the body of an automatically generated message (e.g., text, email, social media post) to a potential collaborator. An automatically generated email invitation can be generated using the email invite button 904. An automatically generated text invitation can be generated using the text invite button 906. The link button 908 causes a link to be displayed that may be copied and pasted into a social media post, email, text, messaging application, and the like.

Figure 9B:
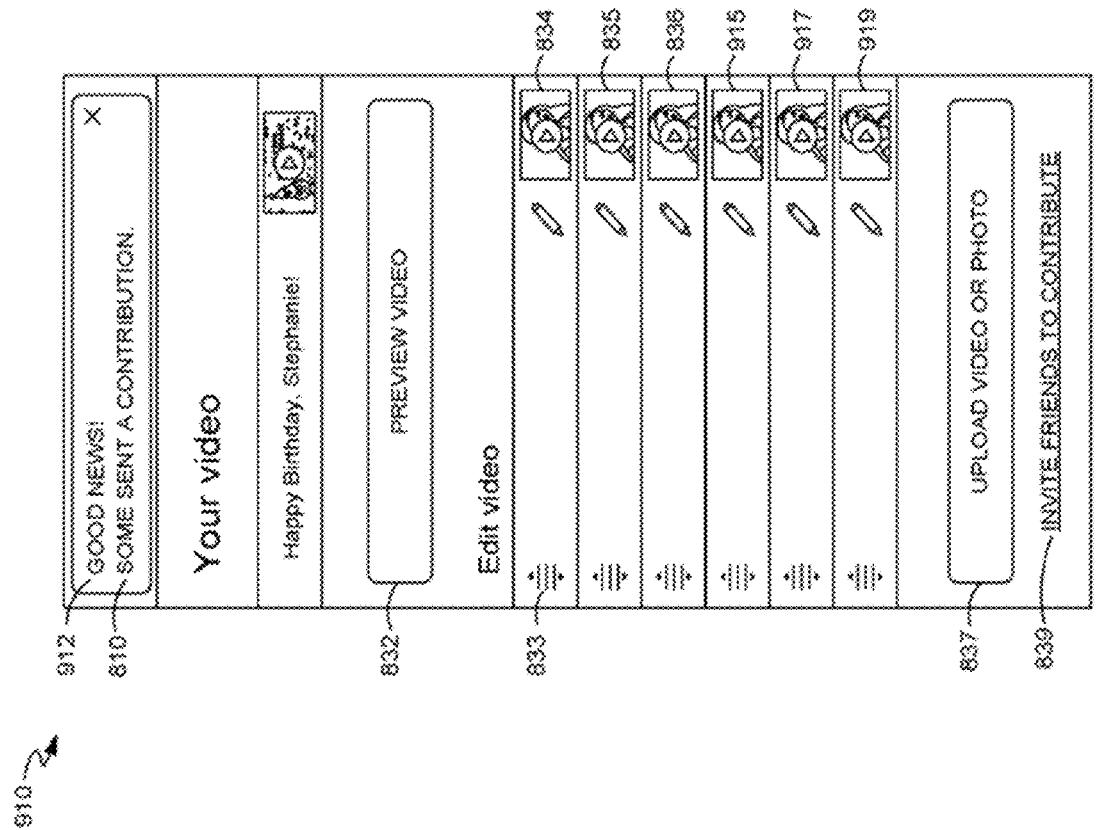

Turning now to FIG. 9B, a collaboration management interface 910 is shown, in accordance with aspects of the technology described herein. The collaboration management interface 910 provides a notification 912 when a collaborator uploads content. The collaboration management interface 910 shows videos or other digital asset provided by collaborators. The videos can be viewed individually by selecting the video thumbnails (915, 917, and 919). The collaboration management interface 910 may allow the user to arrange the order in which the digital presentations will be seen in the final digital presentation. Videos may also be deleted or shortened. The collaboration management interface 910 may provide an automated system that allows the sender to thank the collaborator for providing content. The collaboration management interface 910 also provides a link 839 for additional invitations to be sent to additional potential collaborators.

Figure 9C:
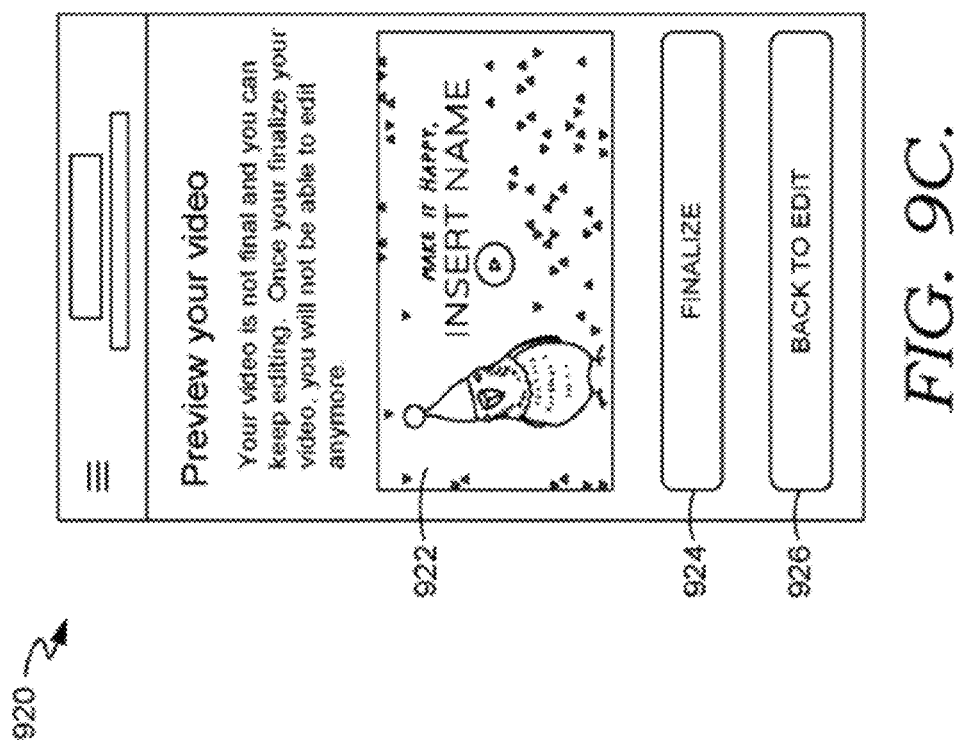

Turning now to FIG. 9C, a digital presentation editing interface 920 is shown, in accordance with aspects the technology described herein. The editing interface 920 allows the user to view the digital presentation by selecting a preview screen 922. The digital presentation may be created by the digital-presentation system described in FIG. 7. The digital presentation may start with an introductory video provided by the digital-presentation system that is tied to the tangible object on which the unique identifier (e.g., QR code) is located. The introductory video is an example of stock content. For example, the introductory video may include a message related to a message or theme on the tangible object, such as a birthday wish, holiday wish, expression of sympathy, or the like. The digital assets provided by the sender and collaborators may be merged to form a video that is then concluded with content provided by the digital-presentation service.

The digital presentation may end with stock terminal content. The terminal content may be stock content tied to the theme on the tangible object and complement the introductory content provided by the digital-presentation service. The terminal content and introductory content may match the theme on the card. The theme may be occasion based. Example occasions include, but are not limited to, an anniversary, birthday, holiday, graduation, get well, condolences, and the like. The theme may also be aesthetic, such as using the same art, colors, fonts, and the like.

Once satisfied with the digital presentation the sender may finalize it by selecting the finalize button 924. If the user is not satisfied, then selecting the back-to-editing button 926 will return the user to collaboration management interface 910 through which the video may edited. A digital link may then be sent to the recipient for electronic viewing. The recipient may also access the digital presentation by scanning the QR code on the card. This provides two means of access for the collaborative content. In aspects, digital links to the collaborative content may be sent to the collaborators who provided content. In this way, the collaborators may view the digital presentation sent to the recipient.

Figure 9D:
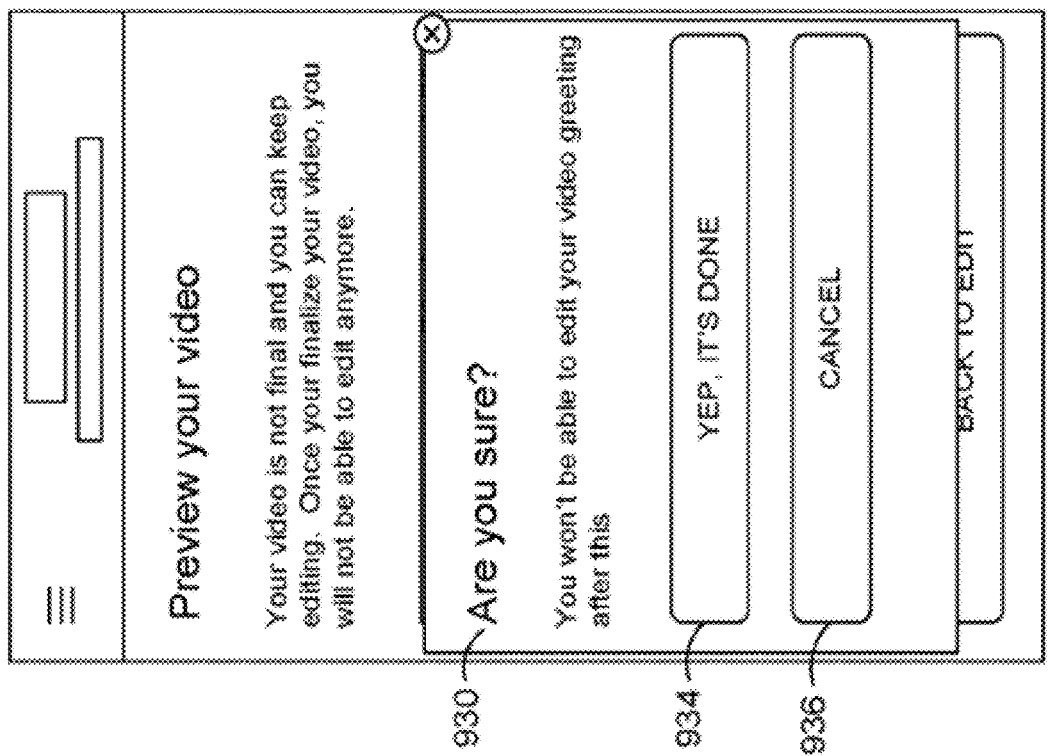

Turning now to FIG. 9D, a confirmation interface 930 is shown in response to the user selecting the done button 934. If the user does not confirm that the digital presentation is finalized by selecting the done button 934, then the user is taken back to the digital presentation editing interface 920 for further editing. Pressing the cancel button 936 also causes the user to be taken back to the digital presentation editing interface 920 for further editing. Otherwise, the digital presentation is finalized upon receiving confirmation in one embodiment.

Figure 9E:
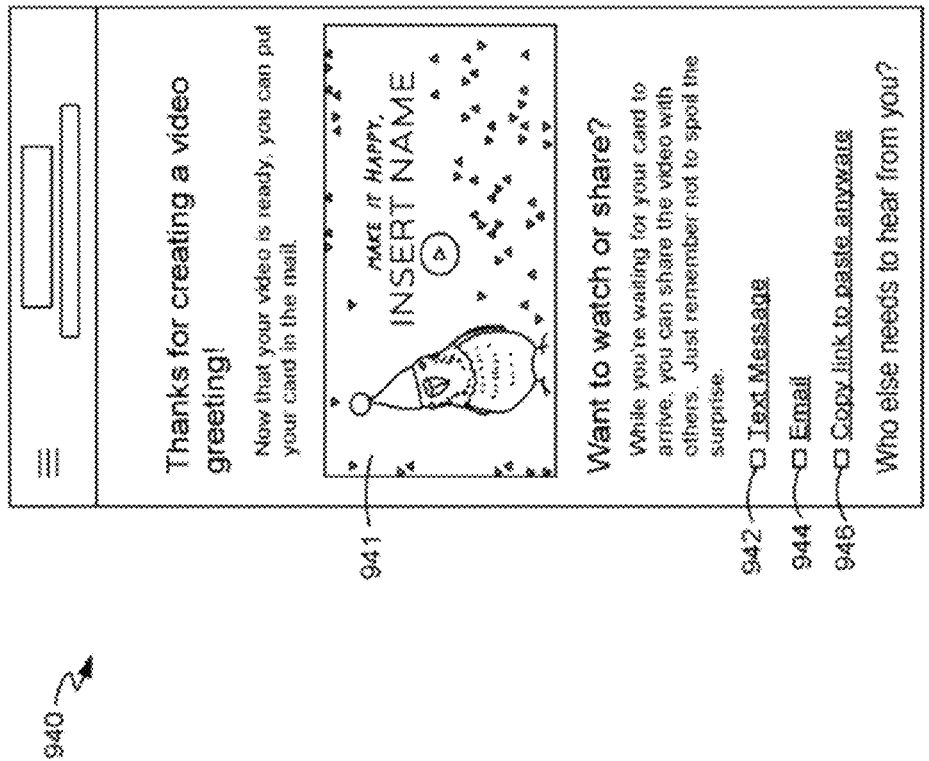

Turning now to FIG. 9E, a sharing interface 940 is shown, in accordance with an aspect of the technology described herein. The sharing interface 940 allows the sender to view the digital presentation by selecting the preview screen 941. The sharing interface 940 also allows the user to designate email addresses 944 or phone numbers 942 through which a link to the digital presentation may be shared. The sender may select any user they wish to share the digital presentation with. This can include the intended recipient, collaborators, friends, or anyone else they choose to share the digital presentation with. The sharing interface 940 also includes a link generation button 946 that allows a link to the digital presentation to be copied easily into social media, a webpage, or some other communication medium.

FIGS. 10A-G illustrate actions taken to edit and finalize a digital presentation, in accordance with aspects of the technology described herein.

Figure 10A:
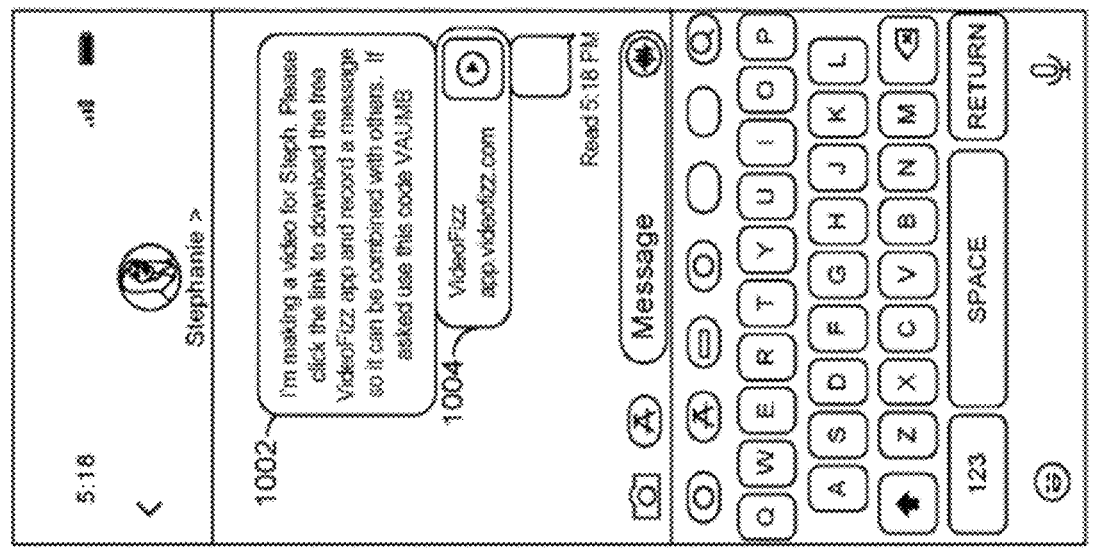
FIGS. 10A-G illustrate actions taken to edit and finalize a digital presentation, in accordance with aspects of the technology described herein.

Turning now to FIG. 10A, a text invitation interface 1000 is shown, in accordance with aspects of the technology described herein. The communication means used to send an invitation to a collaborator can include text, email, and social media. These methods may be selected by the user initiating generation of a digital presentation. The digital-presentation application on a sender's device may have access to the sender's contact list and select the text numbers from the list of designated collaborators. A single collaborator could be contacted through one or more communication means. For example, an email and text could be sent to the same collaborator. The text invitation 1002 can include a link 1004 that the user may select. In response to selecting the link 1004, a customization interface through which content can be uploaded may be opened. The customization interface may be the upload interface 1020.

Figure 10B:
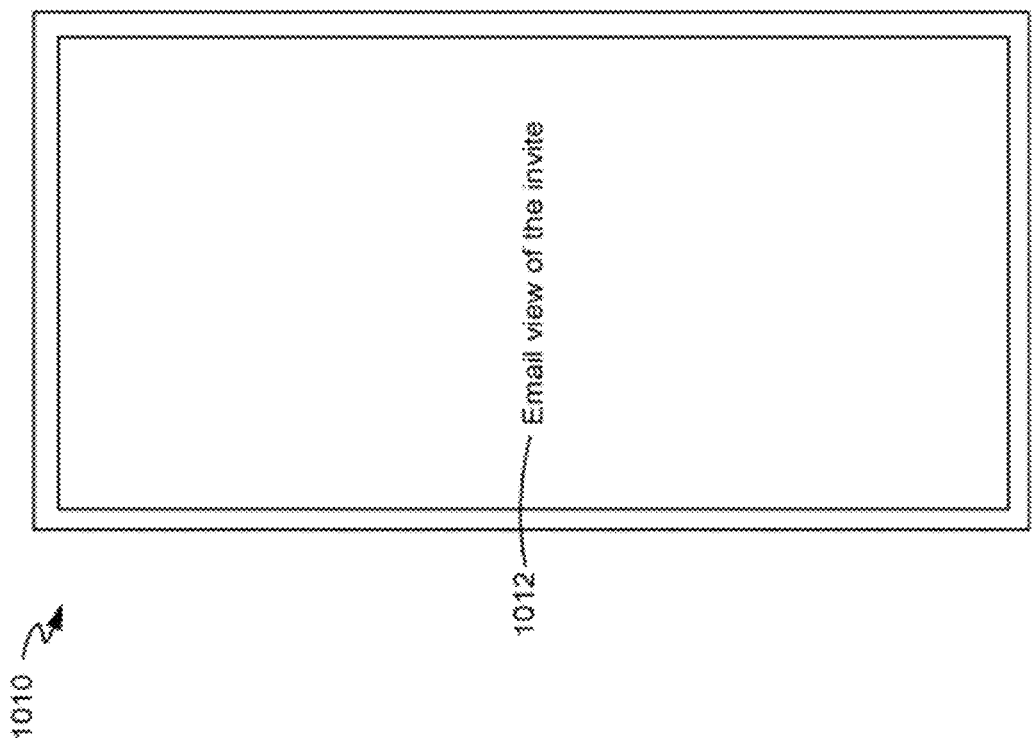

Turning now to FIG. 10B, an email invitation interface 1010 is shown, in accordance with aspects of the technology described herein. As with the text invitation, the email invitation interface 1010 provides a link 1012 the user can select to access a customization interface.

Figure 10C:
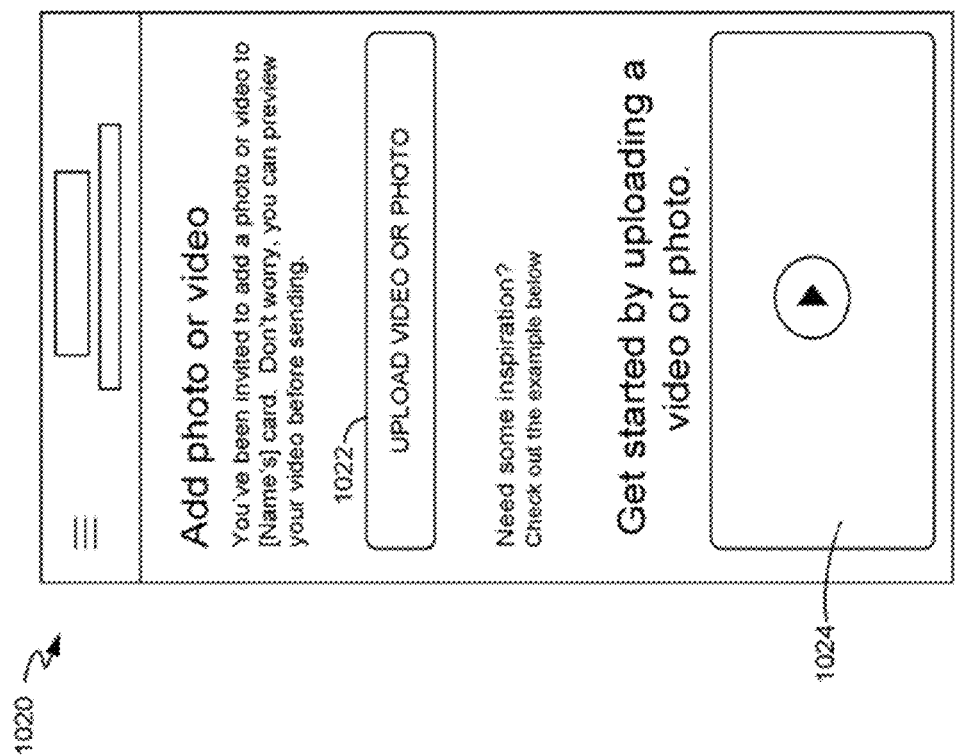

Turning now to FIG. 10C, a digital-asset-upload interface 1020 is shown, in accordance with aspects of the technology described herein. The digital-asset-upload interface 1020 provides an upload button 1022 for the user to upload content. The content can be uploaded from the user's device or from some other source, such as cloud storage. In an aspect, one button allows the user to create content by recording a video. A second button allows the user select previously created content. In one aspect, a link to example digital presentation video is provided to help the receiver think of a relevant and appropriate content to upload.

Figure 10D:
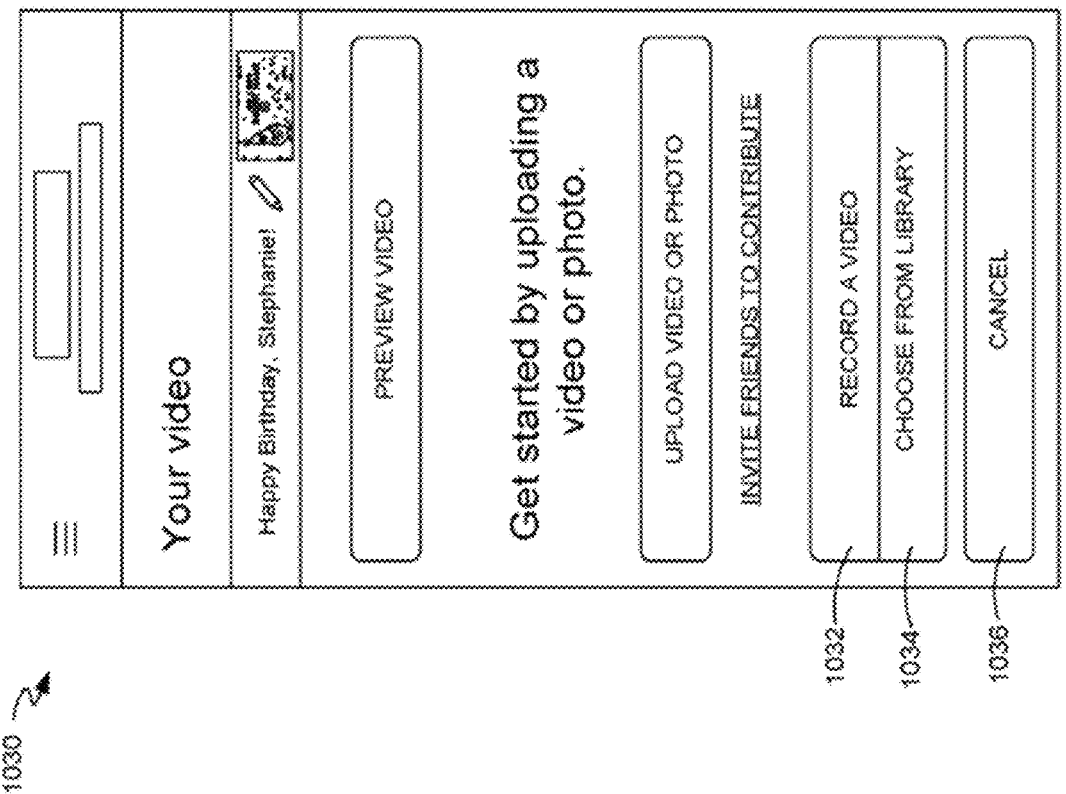

Turning now to FIG. 10D, a digital-asset-selection interface 1030 is shown, in accordance with aspects of the technology described herein. The selection interface 1030 includes a record video button 1032 to facilitate creating content or a selection button 1034 to select existing content from a library. The user may press cancel 1036 to return to a previous interface.

Figure 10E:
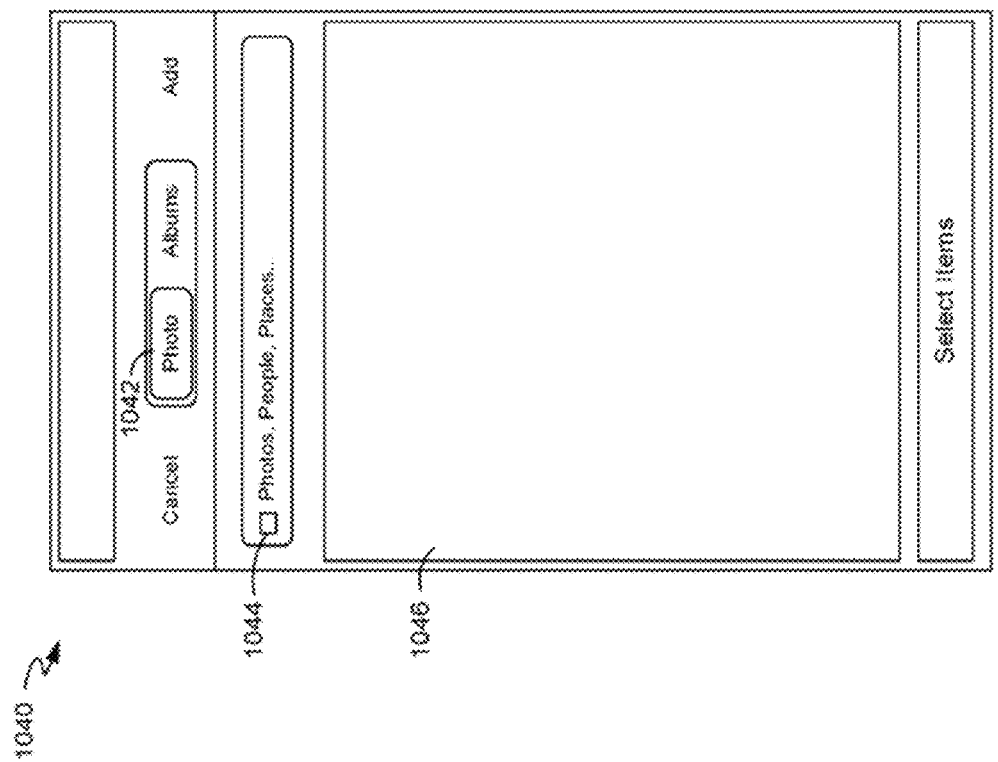

Turning now to FIG. 10E, a photo or video selection interface 1040 is shown, in accordance with aspects of the technology described herein. The photo or video selection interface 1040 allows a user to select pre-existing photos or videos. As can be seen, a filter 1042 allows either photos or albums to be selected to help the user navigate to the desired content. The selection interface 1040 includes a thumbnail interface 1046 to help the user identify the correct asset to upload to the digital-presentation service. The search box 1044 allows the user to search for existing content by name or other feature.

Figure 10F:
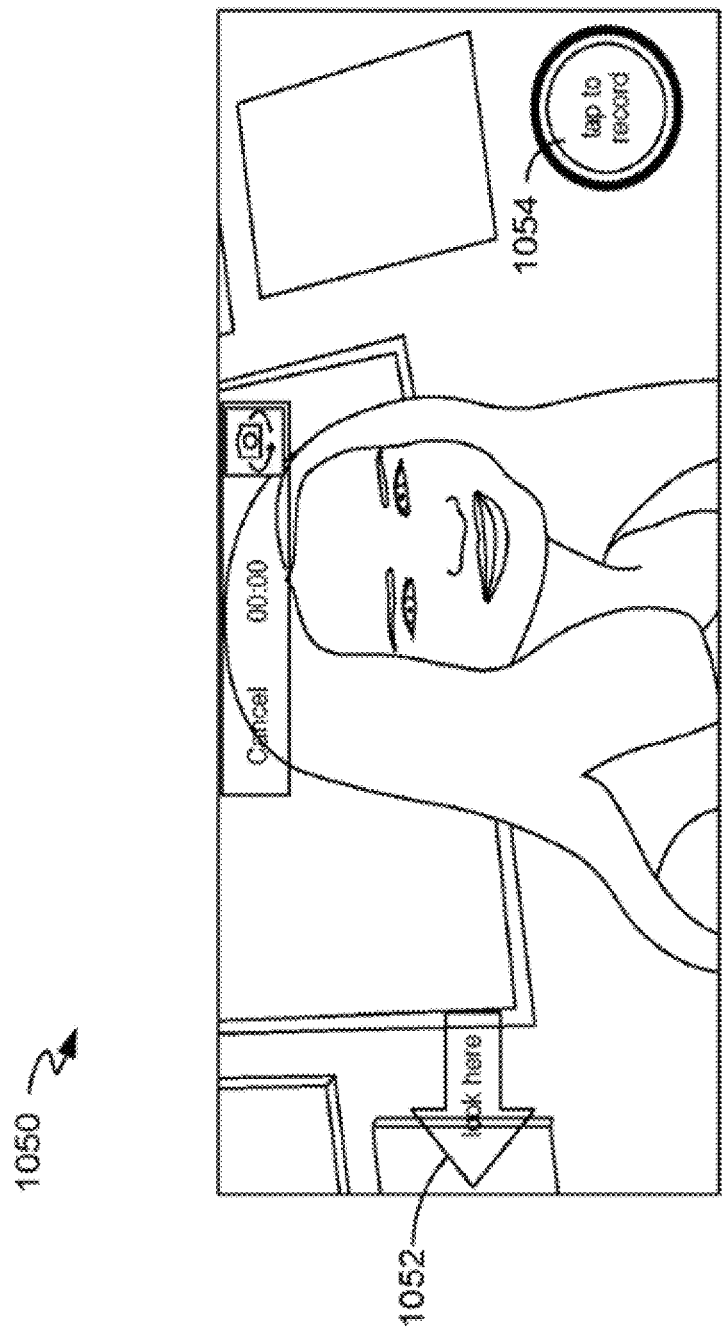

Turning now to FIG. 10F, a video-creation interface 1050 is shown, in accordance with aspects of the technology described herein. The video-creation interface 1050 allows a user to create a custom video. The video may be created using the front-facing camera on a smartphone or tablet. Alternatively, a webcam may be used. The smartphone interface may provide helpful instructions, such as reminding the user to look at the camera on the phone, rather than the screen, with a look-here arrow 1052. The user may start recording by selecting the tap-to-record button 1054. Once a video is recorded, the user may preview the video and then uploaded it if satisfied. Otherwise, the user may attempt to record a second video and may repeat this process until the user is satisfied with the video created.

Figure 10G:
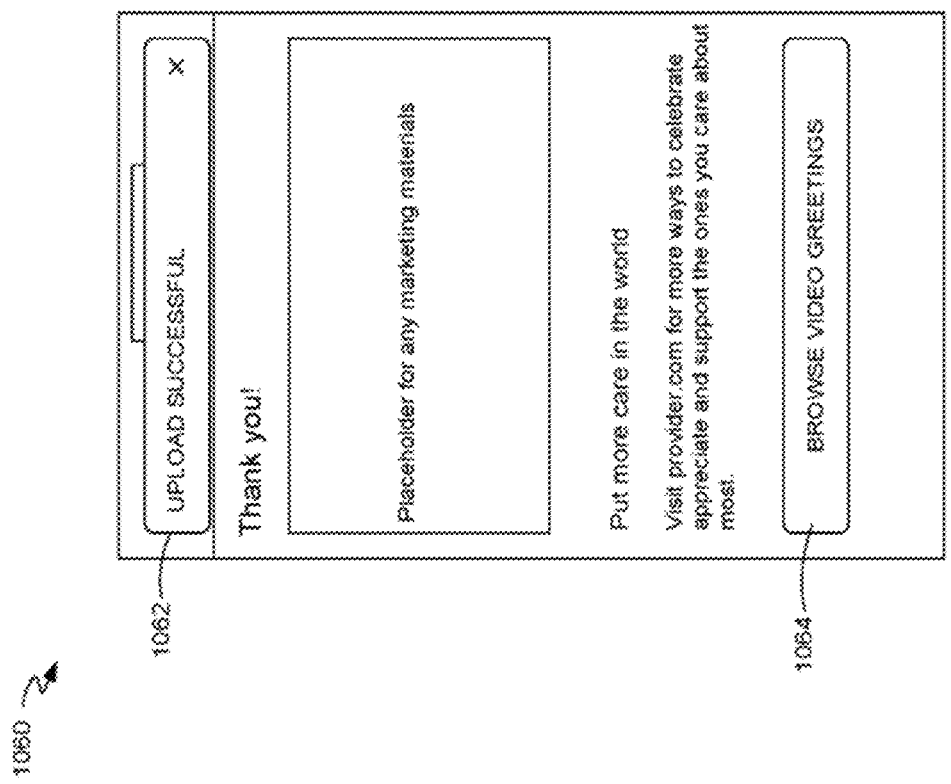

Turning now to FIG. 10G, an upload confirmation interface 1060 is shown, in accordance with aspects of the technology described herein. The confirmation interface 1060 provides a confirmation message 1062 that confirms to the collaborator that the content has been uploaded and no further actions are required on behalf of the collaborator. It should be noted that while the selection of videos and photos is illustrated, the content can also include an audio file, and animation, and the like. A browse video greetings button 1064 allows the recipient to start a new digital presentation.

Figure 12A:
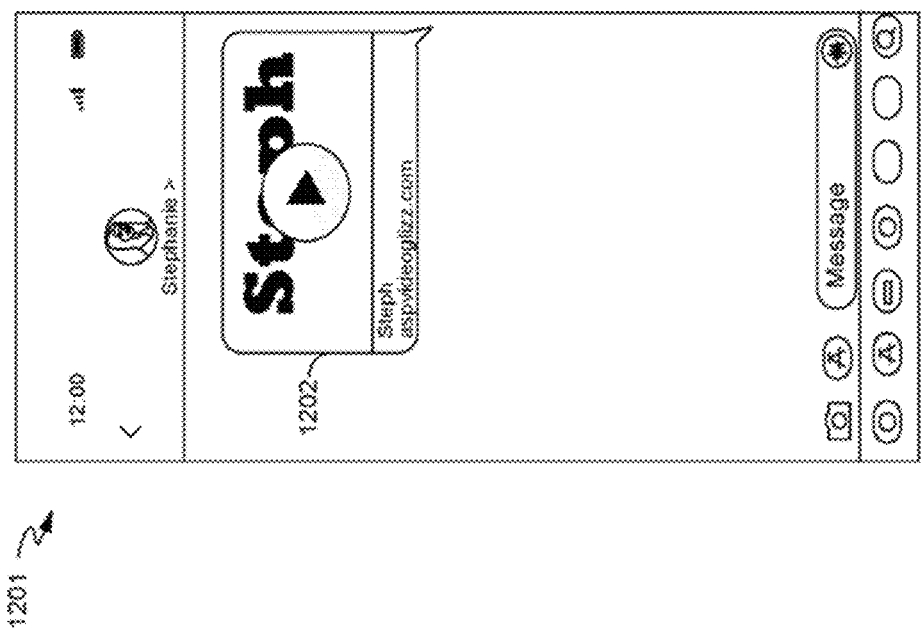
FIGS. 12A-C illustrate actions taken to view a digital presentation, in accordance with aspects of the technology described herein.
Figure 12B:
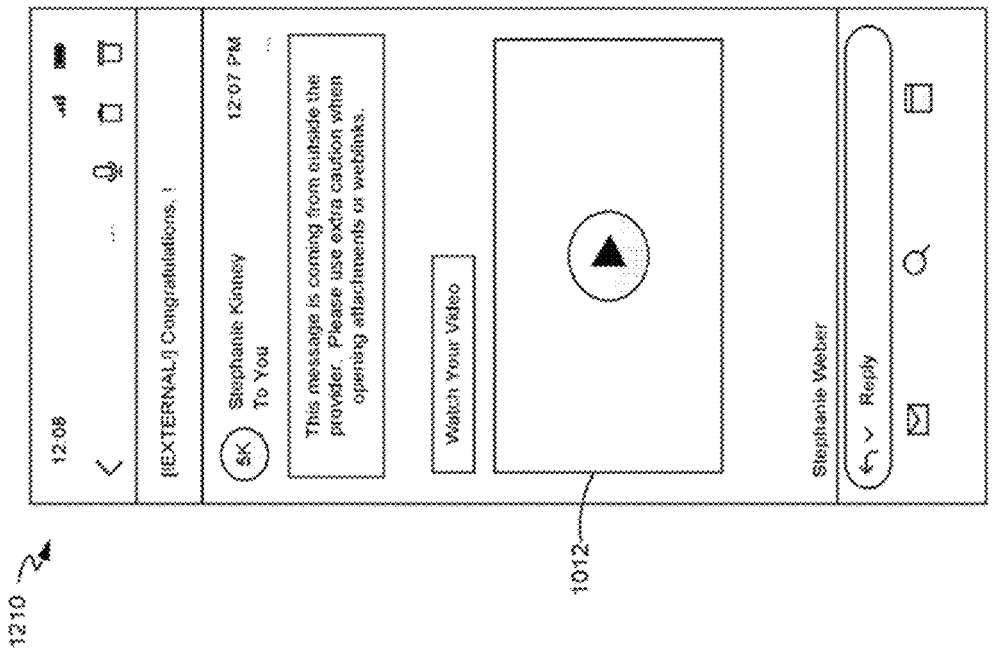
Figure 12C:
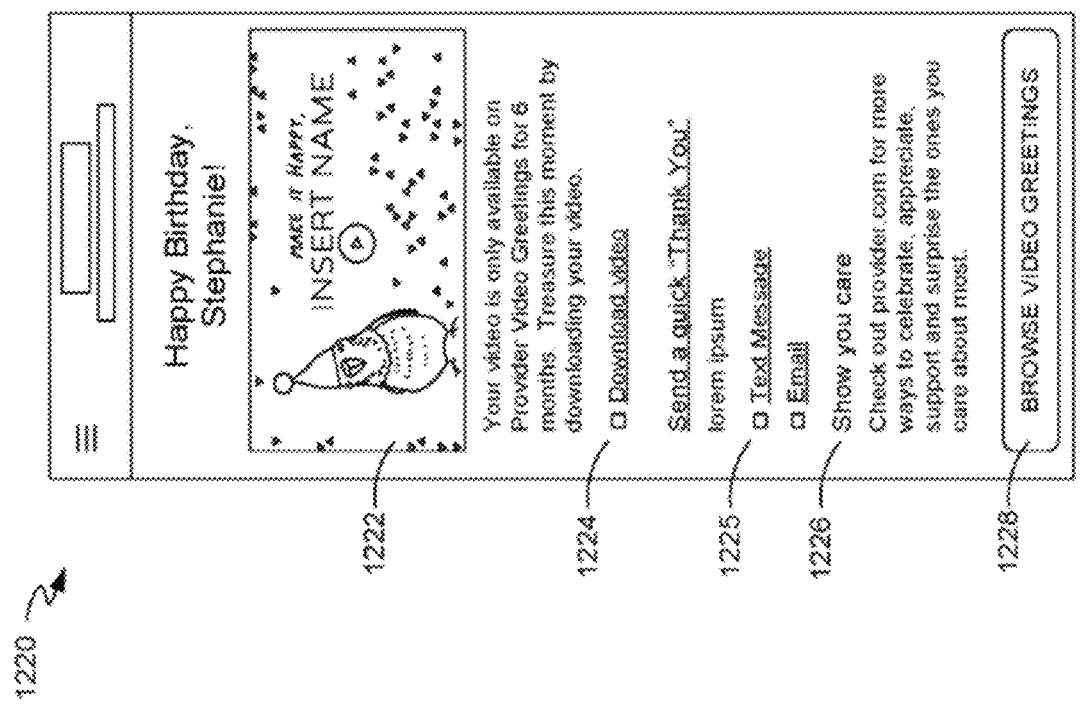

FIGS. 12A-C illustrate actions taken to view a digital presentation, in accordance with aspects of the technology described herein.

Turning now to FIG. 12A, a text reception interface 1201 for a digital presentation is shown, in accordance with aspects of the technology described herein. The text reception interface 1201 includes a link 1202 for the recipient to follow in order to access the digital presentation, which may be opened in a web browser or other application.

Turning now to FIG. 12B, an email reception interface 1210 for a digital presentation is shown, in accordance with aspects of the technology described herein. The email reception interface 1210 includes a link 1212 for the recipient to follow in order to access the digital presentation, which may be opened in a web browser or other application.

Turning now to FIG. 12C, a digital presentation viewing interface 1220 is shown, in accordance with aspects of the technology described herein. The viewing interface 1220 may be shown in a web browser or other application after the user selects a link in an email or text. The viewing interface 1220 may also be accessed by selecting a unique identifier (e.g., QR code) on a greeting card or other tangible object. The viewing interface 1220 includes a media player 1222 for the digital presentation. The viewing interface 1220 includes a thank-you interface.

The thank-you interface allows the recipient to send a text message or email to the sender and/or one or more collaborators with a thank you message. In aspects, the selection of either the text message button 1225 or email link 1226 will cause an email application or text application to open and be populated with the address or phone number of a sender or collaborator. Template message content may also be provided in the text or email. The thank you text or email can also include a link to the digital presentation to allow the sender or collaborator to easily view the digital presentation again. A browse video greetings button 1228 allows the recipient to start a new digital presentation.

Figure 13A:
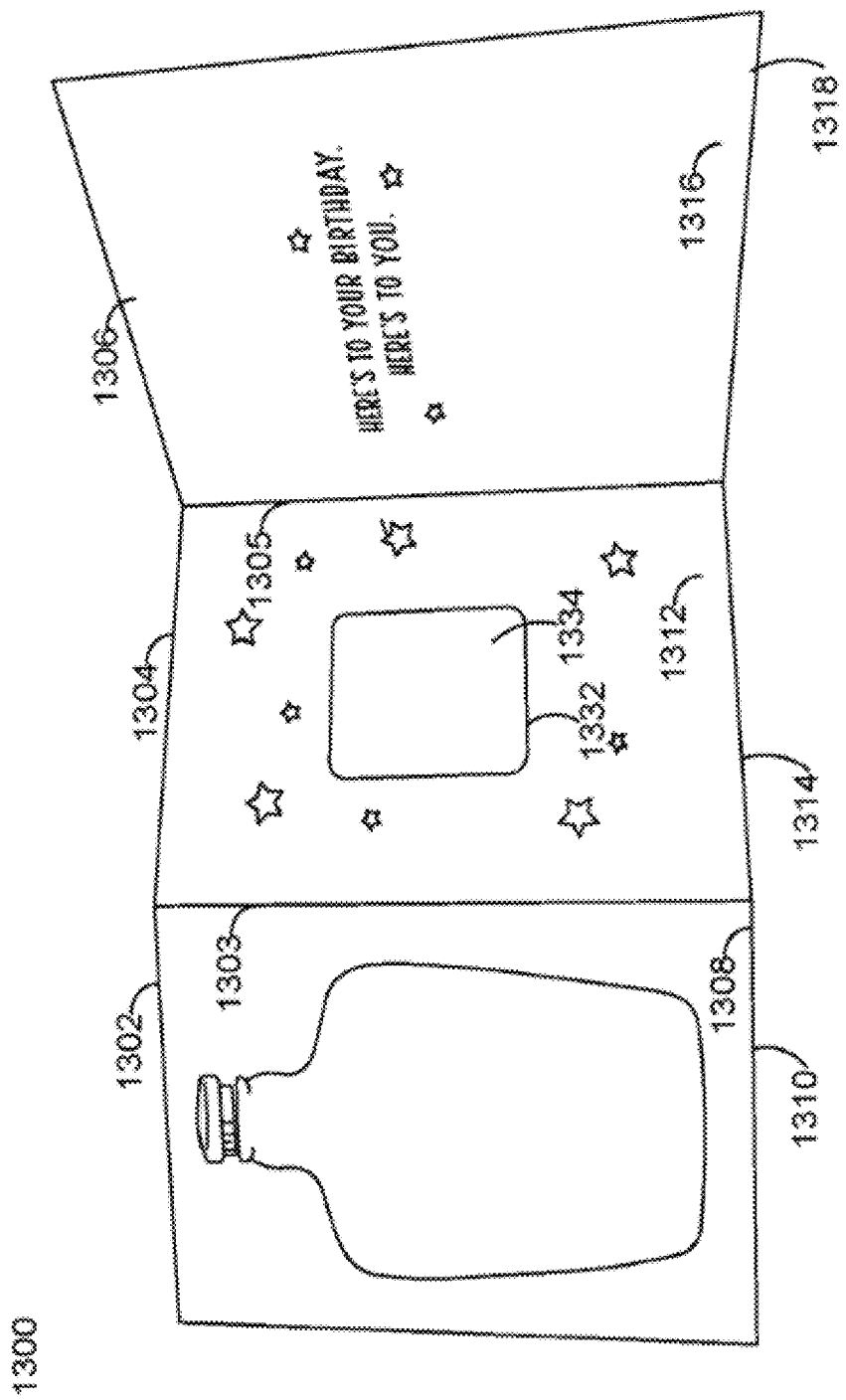

FIGS. 13A-D illustrate a greeting card with an obscured unique identifier that is linked to a digital presentation, in accordance with aspects of the technology described herein. The unique identifier could be printed on one or more greeting cards and/or one or more tangible objects. Turning now to FIG. 13A, an unconstructed greeting card 1300 with an obscured unique identifier is shown (which could be obscured via folding and unobscured when unfolded). Generally, in the first embodiment, the greeting card 1300 includes a cover/first panel 1302, an intermediary/second panel 1304, and an end/third panel 1306. Alternate embodiments are contemplated, with more or fewer panels, different fold lines, different securement mechanisms or couplings, and different positioning of the obscured unique identifier. The embodiments are not limited to those described in the figures. A variety of fold patterns could be used, such as a Z pattern, gate fold, heirlooms, horizontal format, vertical formats, apron fold, flip fold, infolds, multifold, money card, pop fold, mechanic fold, egg fold, and the like. For example, an L-fold configuration is also contemplated, wherein first panel 1302 would be folded in an asymmetrical or non-linear manner with respect to second and/or third panels 1304 and 1306, with an offset window in second panel 1304 for example, also allowing for the identifier to be viewed through the offset window.

Referring now to FIG. 13A, a front perspective view of a first embodiment of an unconstructed greeting card 1300 is depicted, in accordance with an aspect of the present invention. The first embodiment of the greeting card 1300 is formed from a single piece of card stock that is die cut and folded to provide three panels, namely, a cover panel 1302, an intermediary panel 1304, and an end panel 1306. It should be noted that the term "die cut" should be interpreted broadly to cover all types of cutting the shape out of a piece of material or stock (e.g. laser, scissors, etc.). Similarly, while "card stock" is identified in the described example, the invention is not so limited. The phrase "card stock" should be interpreted broadly to cover other types of material, such as plastics, synthetic paper, etc.

The cover panel 1302 has a first side 1308 (e.g., a front side) and a second side 1310 (e.g., a back side) and is coupled to the intermediary panel 1304 along a first fold line 1303. It should be noted that the term "fold line" as used herein should be interpreted broadly to cover all types of bends, scores, rules, creases, perforations, etc. The intermediary panel 1304 has a first side 1312 (e.g., a front side) and a second side 1314 (e.g., a back side) and is coupled to the end panel 1306 along a second fold line 1305. The end panel 1306 has a first side 1316 (e.g., a front side) and a second side 1318 (e.g., a back side).

The panels 1302, 1304, and 1306 may be folded together such that they are in a stacked arrangement, with the first side 1308 of the cover panel 1302 positioned as a first front outside surface of the greeting card 1300 and the second side 1318 of the end panel 1306 positioned as a rear outside surface of the of the greeting card 1300. Additionally, in this stacked arrangement, the second/back side 1310 of the cover panel 1302 and the second/back side 1314 of the intermediary panel 1304 are facing each other and are preferably coupled together (e.g., by adhesive) in an abutting relationship. Illustrative adhesive 1350 is shown in FIG. 13F.

Figure 13B:
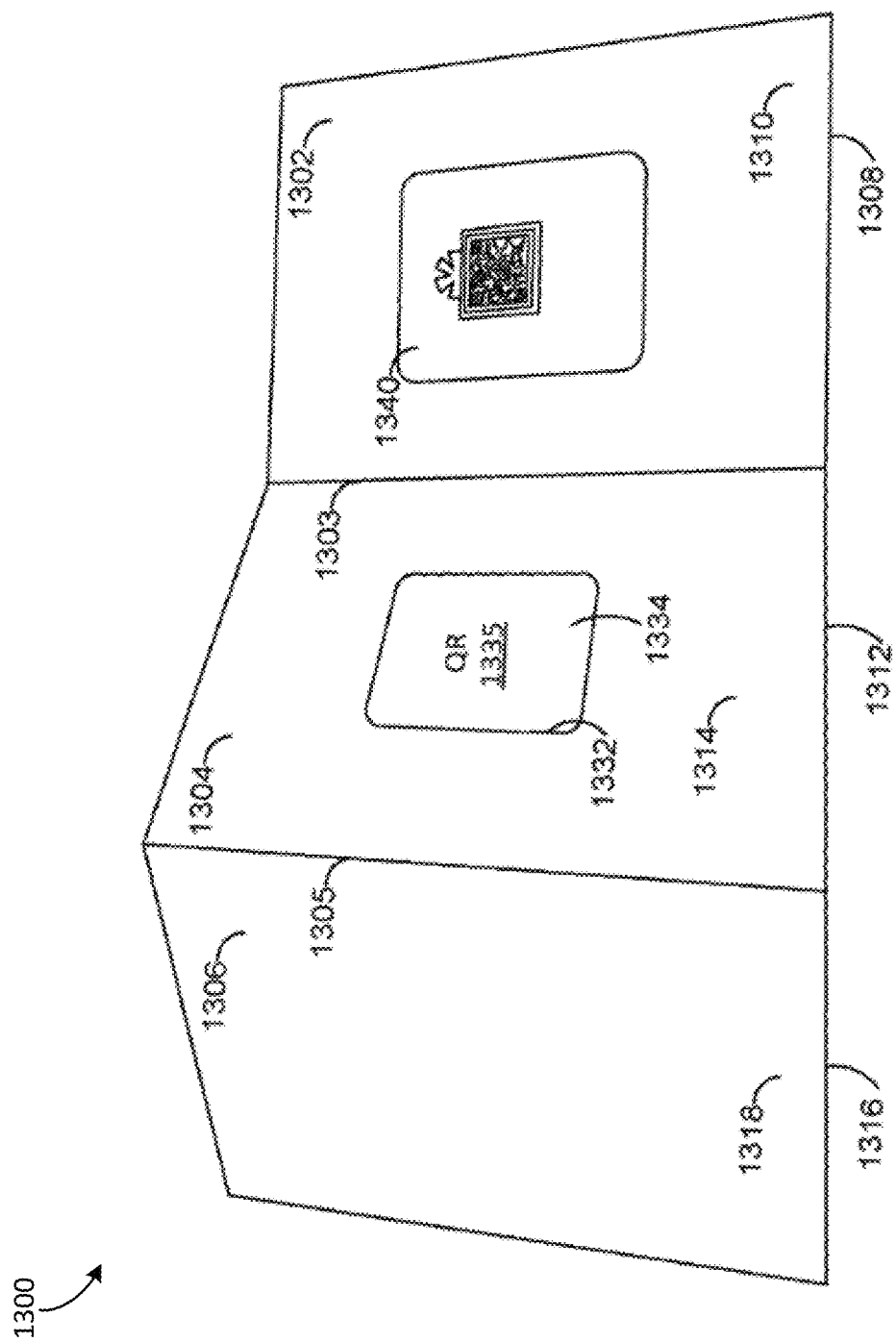
Figure 13C:
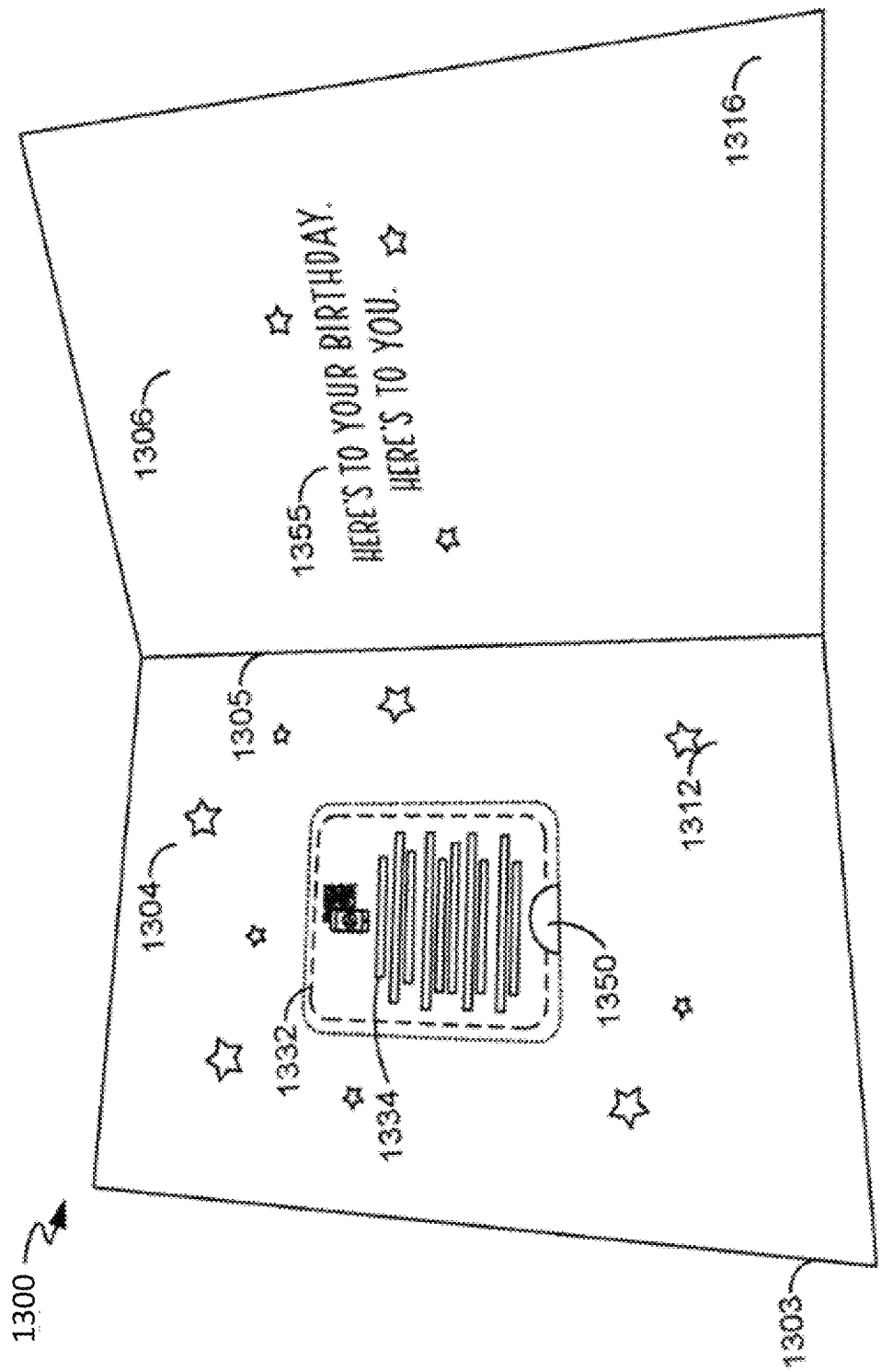
Figure 13D:
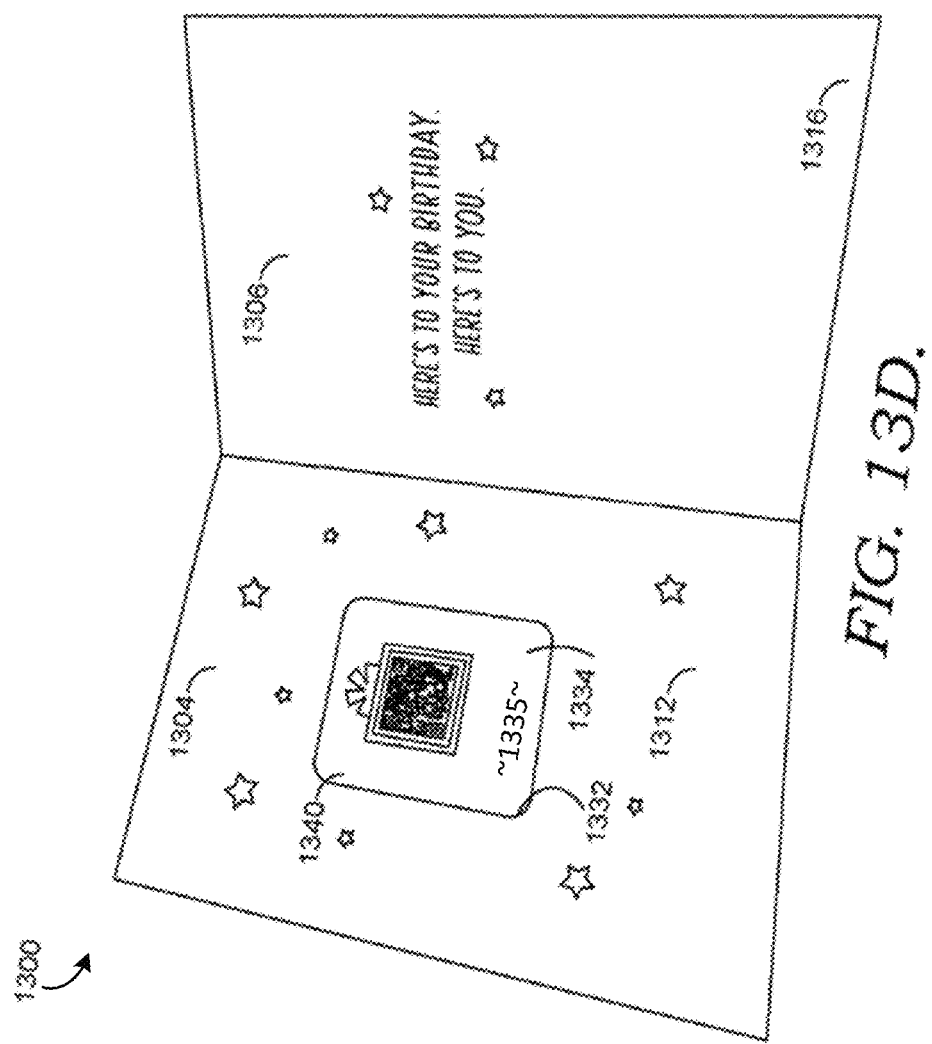

Further, in this stacked arrangement, which is illustrated in FIGS. 13C, 13D, and 13F, the first/front side 1312 of the intermediary panel 1304 and the first/front side 1316 of the end panel 1306 may be facing each other. This arrangement, as shown in FIG. 13F, provides for the appearance of a typical two-panel greeting card that can be opened and closed. For example, in FIG. 13C, the cover panel 1302 is not visible because it is folded behind and obscured by intermediary panel 1304 (except for the QR code or other identifier visible though the void in the intermediate panel).

This Z-type configuration and the various sides are also illustrated in FIG. 13E. FIG. 13E also shows a sticker embodiment whereby identifier 1340 is affixed to the back side 1310 of cover panel 1302 such that, when folded, it is visible through an aperture of intermediate panel 1304. Although FIG. 13E may appear to have gap between sticker 1340 and back side 1310, that is merely to be able to represent a thin sticker subject to the drawing requirements of a patent application. In such an embodiment, there would not actually be any such gap.

The aperture can take the form of a void or window. FIG. 13E also helps illustrate an overall first or front surface defined by front sides 1308, 1312, and 1316 as well as on overall second or rear surface defined by back sides 1310, 1314, and 1318. Numeral 1340 could take on a variety of forms, such being or linking to a digital game, a monetary gift, an experiential gift where, for example, the recipient could choose the gift, be customized to the scanner's location, a playlist, a customized video or picture or sound, a countdown with personalized items for each day, an invitation & countdown to a party/event, a letter, stitched-together photos and videos, an avatar of friends/family to represent them in videos, a GIF animation, a live camera feed or exclusive view, an AR overlay on travel destinations chosen by sender (e.g. versions of an Eiffel tower experience), a 360-degree video experience, humorous content, and the like.

By forming the greeting card 1300 from a single unitary piece of card stock, the die-cut card stock may be run through a printer prior to being folded to print a design, coloring, a pattern, sentiment or other indicia on one or both sides of the greeting card 1300. For printing, the greeting card 1300 may lie flat and is in a flat, unfolded configuration, such as just after the die-cutting process. This arrangement and use of three panels allows the die cut blank to be passed through a single sided printer, yet still provide printing on all three surfaces of the greeting card 1300 when it is formed.

Figure 13G:
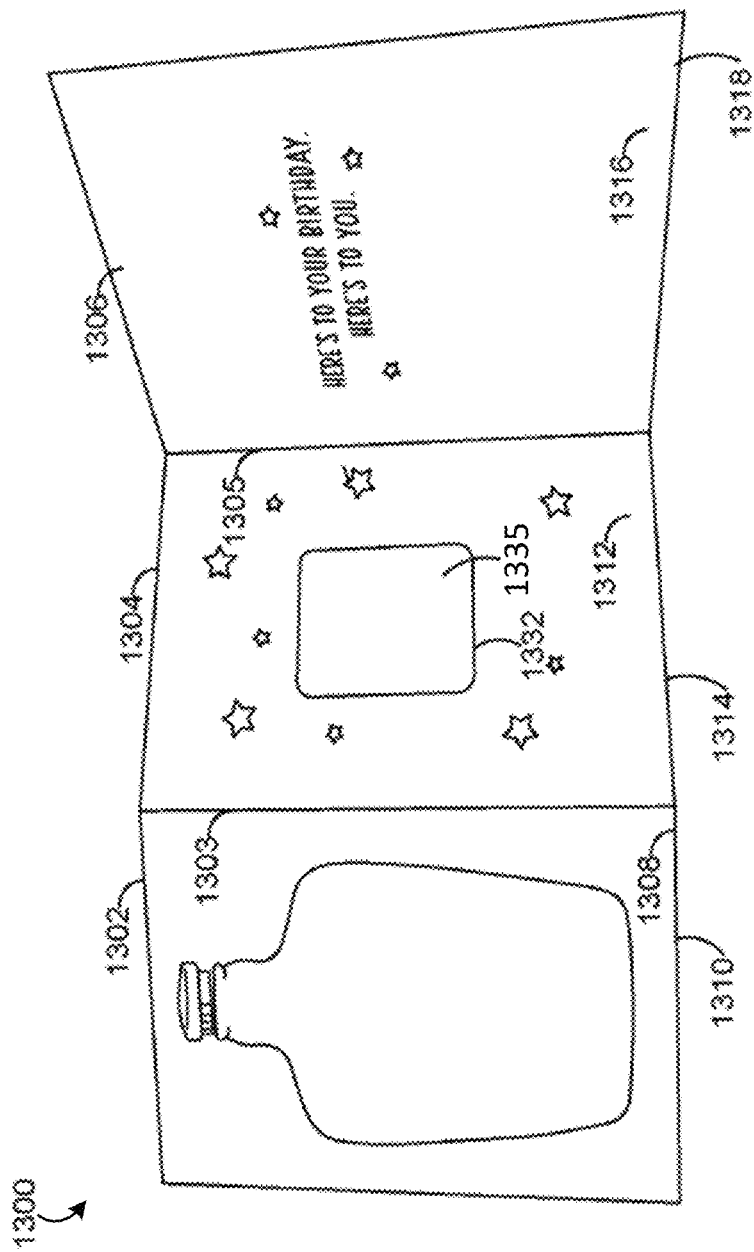
Figure 15:
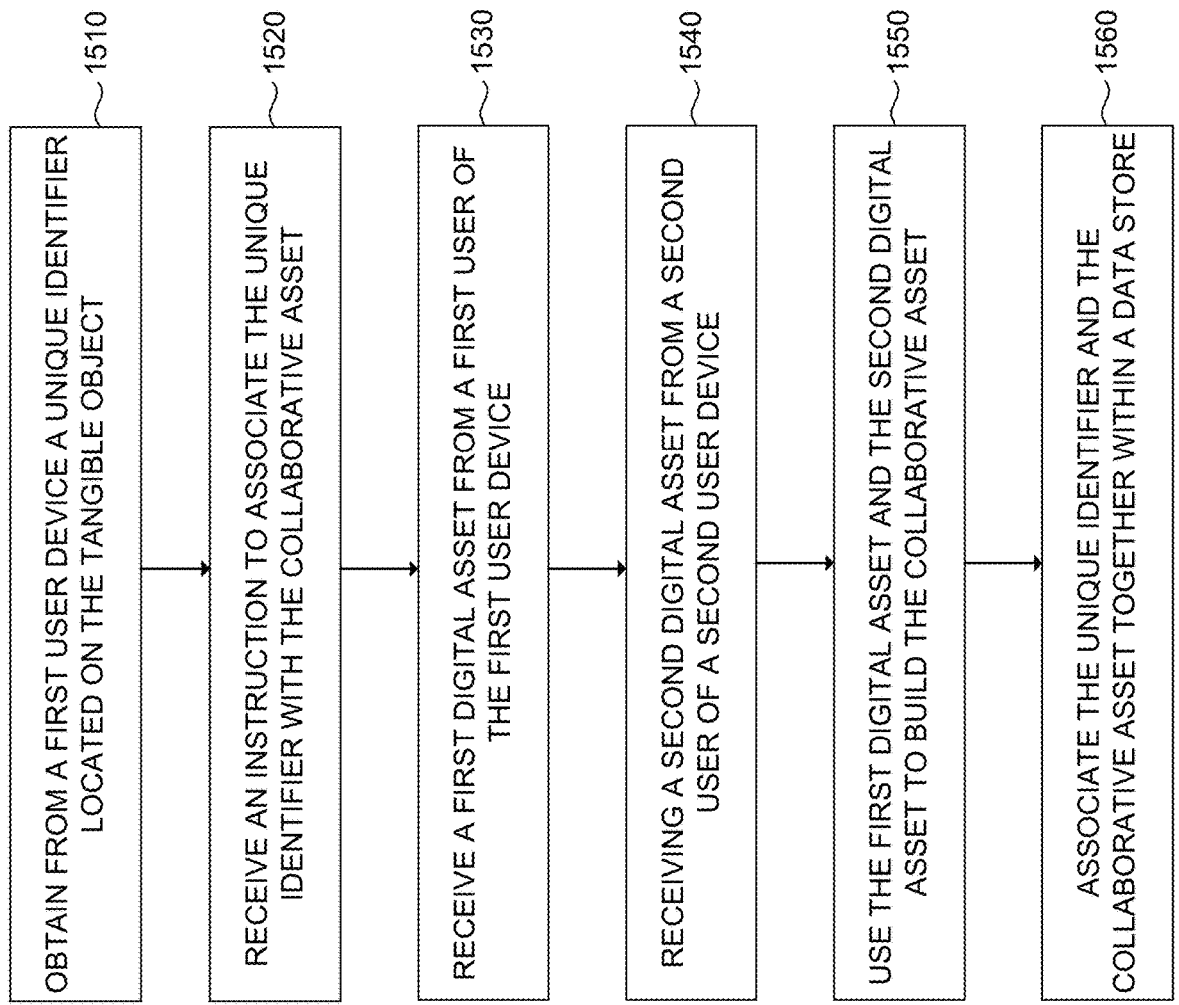
FIG. 15 illustrates a method of generating a digital presentation, in accordance with aspects of the technology described herein.

The intermediary panel 1304 includes a removable tab 1334 in one embodiment defined by an edge 1332. The removable tab 1334 is centered in the middle of the intermediary panel 1304. Embodiments may include removable tabs located elsewhere or no tabs, e.g., a void 1335 (FIG. 13G). As shown in FIG. 13D, the window 1335 created by removing (or never including) the removable tab 1334 makes a QR code, or other unique identifier, printed on (including affixed to) the back side 1310 of the cover panel 1302 visible to a user. In embodiments, the removable tab 1334 may include a second copy of the QR code on the back side. The greeting card 1300 may be sold with the removable tab 1334 attached. A purchaser may then remove the tab to expose the QR code and start the process of building a unique digital presentation. The removable tab 1334 deters a person from scanning the QR before purchasing the card.

Referring now to FIG. 13B, a back perspective view of a first embodiment of an unconstructed greeting card 1300 is depicted, in accordance with an aspect of the present invention. The cover panel 1302 has a first side 1308 and a second side 1310 and is coupled to the intermediary panel 1304 along a first fold line 1303. It should be noted that the term "fold line" as used herein should be interpreted broadly to cover all types of bends, scores, rules, creases, perforations, etc.

The intermediary panel 1304 has a first side 1312 and a second side 1314 and is coupled to the end panel 1306 along a second fold line 1305. The end panel 1306 has a first side 1316 and a second side 1318. The panels 1302, 1304, and 1306 may be folded together such that they are in a stacked arrangement, with the first side 1308 of the cover panel 1302 positioned as a first front outside surface of the greeting card 1300 and the second side 1318 of the end panel 1306 positioned as a rear outside surface of the of the greeting card 1300. Additionally, in this stacked arrangement, the second side 1319 of the cover panel 1302 and the second side 1314 of the intermediary panel 1304 are facing each other and are preferably coupled together (e.g., by adhesive) in an abutting relationship. Further, in this stacked arrangement, which is illustrated in FIGS. 13C and 13D, the first side 1312 of the intermediary panel 1304 and the first side 1316 of the end panel 1306 may be facing each other. This arrangement presents the appearance of a standard two panel greeting card that can be opened and closed.

The intermediary panel 1304 includes a removable tab 1334 defined by a perforated edge 1332. Though shown as a rectangle, the removable tab 1334 could be any suitable shape, such as a triangle, oval, circle, trapezoid, and the like. The removable tab 1334 is centered in the middle of the intermediary panel 1304. Embodiments may include removable tabs located elsewhere. As shown in FIG. 13D, the opening created by removing the removable tab 1334 makes a QR code 1340, or other unique identifier, printed on the back side 1310 of the cover panel 1302 visible to a user. One method of printing the QR code 1340 on the cover panel 1302 includes affixing a printout with the QR code 1340 to the panel. In aspects, a human readable version (not shown) of a unique number and/or alphanumeric sequence encoded in the unique identifier may be printed above the unique identifier 1340.

The human readable rendition of the information encoded within the unique identifier 1340 can assist with a quality check during manufacturing of the greeting card. In embodiments, the removable tab 1334 may include a second QR code 1335 that is identical to the QR code 1340. The second QR code 1335 would be obscured when the panels are in a stacked arrangement. The greeting card 1300 may be sold with the removable tab 1334 attached. A purchaser may then remove the removable tab 1334 to expose the QR code and start the process of building a unique digital presentation. The sender could keep the removable tab 1334 and use the second QR code 1335 to access the digital presentation. The removable tab 1334 deters a person from scanning the QR before purchasing the card.

Turning now to FIG. 13C, a view of the greeting card 1300 is shown in a formed and semi-open configuration, in accordance with an aspect of the present invention. The panels 1302, 1304, and 1306, are folded along the fold lines 1303 and 1305 to bring the panels 1302 and 1304 and 1306 together into a presentation arrangement. The unique identifier is obscured behind the removable tab 1334. The perforations on the perforated edge 1332 and finger slot 1350 make removal of the removable tab 1334 a simple task for a sender or purchaser of the card.

The view shown in FIG. 13C is of the inside of the card after opening. The removable tab 1334 provides instructions to remove the removable tab 1334 and scan the QR code. A birthday message is on the right side of the card 1355. Each card may include printed content associated with a theme (e.g., occasion, occasion/recipient, event, event/recipient). The theme may be specific or generic. For example, a generic birthday card vs. niece birthday card.

Turning now to FIG. 13D, shows the same greeting card 1300 as shown in FIG. 13A, but with the removable tab 1334 removed and the QR code 1340 exposed. The QR code 1340 may encode a unique identifier, a URL for the digital-presentation service, and a SKU for the greeting card. In combination, the SKU and unique identifier may form a unique identification for the specific card.

The SKU can be used by the digital-presentation service to select book-end content for the digital presentation. For example (see also, FIG. 22), a video introduction 2212 with aesthetics and a message that complements a message 2214 on the greeting card may be selected. For example, a greeting card with a happy-birthday message may be paired with introductory video 2212 with an audio of the happy birthday song along with graphics and animation 2214 that are similar to the design on the card. The example shown in FIG. 13D, a dancing bottle with the word "cheers" on it may sing happy birthday to be paired with the bottle on the greeting card. Concluding art or content 2216 may also be used to enhance the video or other digital presentation. For example, an ending message of have a great birthday could conclude the digital presentation.

Thus, a digital presentation could start with an introduction that is provided by a content provider. The introduction video could be aesthetically and thematically linked to the greeting card or other tangible object on which the QR code is located. The video could continue with custom birthday videos created by the sender and other collaborators and then conclude with content provided by the collaboration service that is tied to the theme and aesthetics of the greeting card. In aspects, content is provided by the collaboration service in between the various messages. The intermediary content can serve as introductions to the different sections of the video. The introductions could tie the theme of the tangible object and to a particular collaborator. For example, the intermediary content could communicate that "grandmas are special" or "grandma loves you" and introduce a video from grandma to a grandchild. Thus, both the tangible object and stock content in the digital presentation may have the same theme. Unique stock content may be provided for each model of tangible object. For example, a specific greeting card model (e.g., SKU) may have unique stock content available. Thus, the same template stock content may be used for all models of the same SKU and may be unique to the model. Alternatively, template stock content may also be used on one or more card models (e.g., SKUs) with similar themes. For example, the same stock content may be used for one or more birthday card models. In this way, different unique identifiers may be pre-linked (e.g., at printing) to stock content that matches the theme of the card on which the unique identifier is printed.

In some aspects, the unique identifier printed within the greeting card may be decorative, having both a visual appearance for a card recipient and scannable features for a computing device. In further embodiments, the unique identifier may be visible to the card purchaser upon viewing an exposed surface of the greeting card, while in other embodiments, a unique identifier may be partially and/or temporarily obstructed from view. For example, a scannable unique identifier may be printed on a particular surface of a greeting card such that, during manufacturing, the unique identifier may be printed on a manufacturing-accessible surface.

Upon further processing, including one or more of cutting, folding, gluing, or taping, the greeting card may be configured in such a way to obscure the unique identifier-printed surface and protect the unique identifier from being scanned by anyone other than the card purchaser. In some aspects, the greeting card may include an integrated element, such as a die-cut, sticker, tear-away, peel-off, or other perforated or manipulated element of the card structure that reveals the unique identifier for scanning by the card sender in establishing the collaborative content, and scanning by the card recipient in retrieval of the contributed digital compilation.

In further aspects of the invention, based on having a plurality of unique identifiers associated with a single SKU of manufactured tangible items, a system for uniquely printing a distinct unique identifier onto each of the tangible items may include a batched variable print data server that is coupled to the printing system that, upon receipt of individual print jobs, manufactures a series of uniquely identifiable greeting cards, each having common SKU card content with at least one item of uniquely different, printed content. In some aspects, both a unique identifier and a unique user-readable code may be printed onto (including affixing a printout onto) each individual card from a particular batch of unique greeting cards. In further aspects, a unique print job for a unique identifier on a particular greeting card may include identifying a particular print region within a greeting card design, orienting the printing of the unique identifier in context of the surrounding greeting card design, and printing the unique identifier onto the properly oriented portion of the greeting card. In some aspects, based on the printing of a batch of unique identifiers onto a batch of commonly designed greeting cards, the system for manufacturing uniquely identifiable greeting cards may produce similar SKU card designs with variable unique identifier features corresponding to variable customization zones within each card.

In aspects, a single unique identifier may be assigned to all items in a batch of a tangible objects. For example, all cards in a box of greeting cards may be printed with the same unique identifier. This arrangement allows a single collaborative object to be associated with one or more tangible objects through the common unique identifier. In addition, one or more tangible objects with different unique identifiers may be associated with a single collaborative object, as explained in more detail subsequently. Retail Display Turning now to FIG. 14, an exemplary digital presentation preview experience may be provided in a retail environment. The preview experience may be provided as part of a tangible item product display having a scanning feature for generating a digital presentation preview. Upon scanning a unique machine-readable code, a preview of the digital content included with the digital presentation experience may be displayed prior to purchasing the greeting card. In one aspect, an example digital presentation is shown to the user.

In one embodiment, the tangible item is a greeting card (not shown), and the product display may include a retail merchandizing component featuring a unique machine-readable code 1406 that a consumer could scan. The retail merchandising component may be an insert 1400 that sits behind greeting cards (and envelopes) in a greeting card slot within a greeting card rack. The insert 1400 may have a lower portion 1408 that is obscured by the greeting cards and envelopes in the card slot. In contrast to the lower portion 1008, the upper portion 1402 is, at least partially, visible above the greeting cards and envelopes.

The upper portion 1402 may include a card description 1404 or category and a machine-readable code 1406. In this example, the machine-readable code is a QR code. Each unique card may have card-specific digital presentation stock content. Accordingly, each insert 1400 may include a unique machine-readable code 1406 to enable a potential purchaser to view the specific stock content and/or example digital presentation built with the specific stock content.

In further aspects, because the unique identifier code (non-preview) is obscured within at least a portion of the greeting card structure so that the card purchaser is unable to preview the digital content accompanying the tangible greeting card product, the product information display may provide an indication of the type of digital contentment associated with that tangible item being sold at retail. In the example of the greeting card, the unique indicator preview may be represented as a triangle-shaped scannable code or QR code on the sample product information display (PID) insert 1400. In this example, prior to purchasing the greeting card displayed adjacent to this particular PID, the consumer may determine whether the tangible item features both physical and digital characteristics of a greeting card that they wish to purchase and eventually present to their card recipient.

As such, the complete and/or non-preview version of the unique identifier may be present in and potentially obscured from view (e.g., behind a tab) or protected from access by all potential purchasers. The unique identifier preview code 1406 may be scanned by a potential card purchaser to launch a preview of the digital component of the corresponding greeting card. In further aspects, at least a portion of the unique identifier code for each tangible product SKU may be imbedded within a PID icon for Video Greetings-enabled products, such that scanning the embedded code sample launches a video preview of the digital component (animation, music, theme, etc.) accompanying the specific tangible item. As mentioned, a different theme may be used for stock content (e.g., music, starting video, end video, banners, side bars, stickers, wallpaper, or other creative/editorial content) may be provided for different SKUs. For example, birthday theme may be associated with a birthday card and a graduation theme associated with a graduation card. Providing a preview identifier for each SKU (or group of SKU s with the same theme) allows an SKU specific theme to be viewed by the purchaser prior to purchase. Example Methods Referring now to FIG. 15, a flow diagram is provided depicting a method 1500 for generating a digital presentation, in accordance with aspects of the technology described herein. The method 1500 comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), to name a few. In addition, method 1500 is described, by way of example, with respect to the features of FIGS. 1-12. However, these methods may additionally or alternatively be executed by any one system, or any combination of systems, including, but not limited to, those described herein.

At step 1510, the method 1500 includes obtaining from a first user device a unique identifier located on the tangible object. At step 1520, the method 1500 includes receiving an instruction to associate the unique identifier with the digital presentation. At step 1530, the method 1500 includes receiving a first digital asset from a first user of the first user device. At step 1540, the method 1500 includes receiving a second digital asset from a second user of a second user device. At step 1550, the method 1500 includes using the first digital asset and the second digital asset to build the digital presentation. At step 1560, the method 1500 includes associating the unique identifier and the digital presentation together within a data store.

Figure 16:
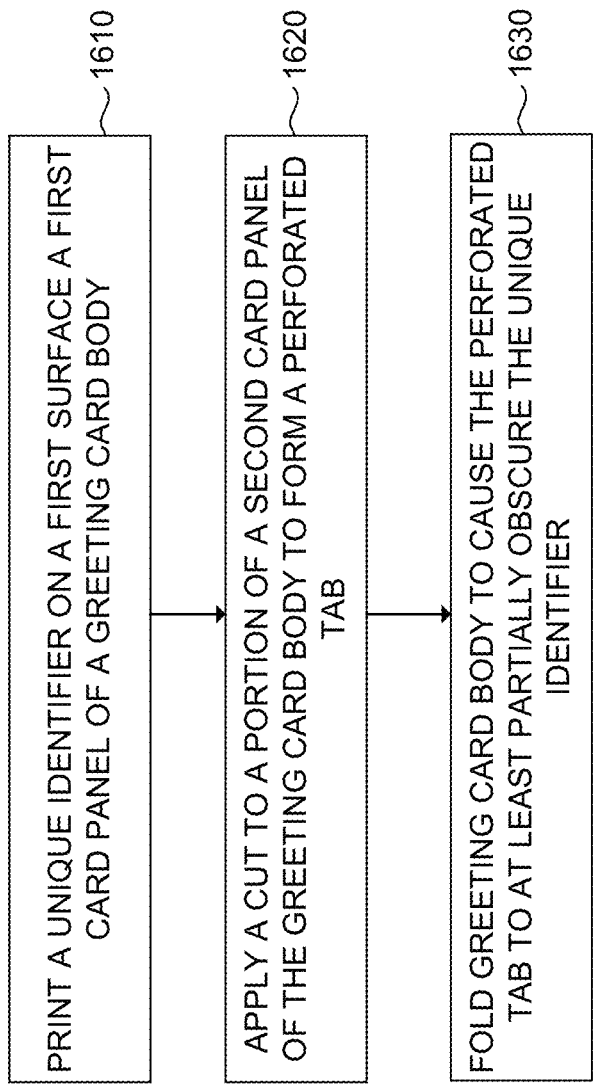
FIG. 16 illustrates a method for printing a greeting card with an obscured unique identifier, in accordance with aspects of the technology described herein.

Referring now to FIG. 16, a flow diagram is provided depicting a method 1600 for printing a tangible object with an obscured unique identifier, in accordance with aspects of the technology described herein. At step 1610, the method 1600 includes printing a unique identifier on a first surface a first card panel of a greeting card body. A unique identifier, such as a QR code, radio-frequency identification tag (RFID), NFC tag, and/or unique design, may be located on the tangible object and used to associate the tangible object with the digital presentation. As used herein, a unique identifier may include a unique machine-readable number and/or alphanumeric sequence encoded by the unique identifier. The unique identifier allows an associated tangible object to be differentiated from all of other similar tangible objects.

The unique identifier may be assigned to a card model during or before the printing process. In an aspect, the computerized printing system may select from unique identifiers allocated to a particular SKU when printing. Alternatively, the unique identifiers are randomly chosen and the unique identifier is scanned after printing and associated with the SKU that is also printed on the card. The scanning may occur prior to folding the card stock into the stacked position described with reference to FIG. 13. At the conclusion of the printing process, the printing system/digital-presentation system knows what card SKU is associated with each unique identifier. The unique identifier may then be associated with appropriate stock content within the digital-presentation system. The user is then able to see the correct stock content when creating the digital presentation without providing additional details about the greeting card model. The stock content can include and introduction, transitions, and terminal content. The stock content can match the content on the greeting card.

At step 1620, the method 1600 includes applying a cut to a portion of a second card panel of the greeting card body to form a perforated tab. A perforated tab has been described with reference to FIG. 13, for example, with the removable tab 1334.

At step 1630, the method 1600 includes folding the greeting card body to cause the perforated tab to at least partially obscure the unique identifier. The stacked arrangement of panels has been described with reference to FIG. 13 and serves to obscure the unique identifier.

Figure 17:
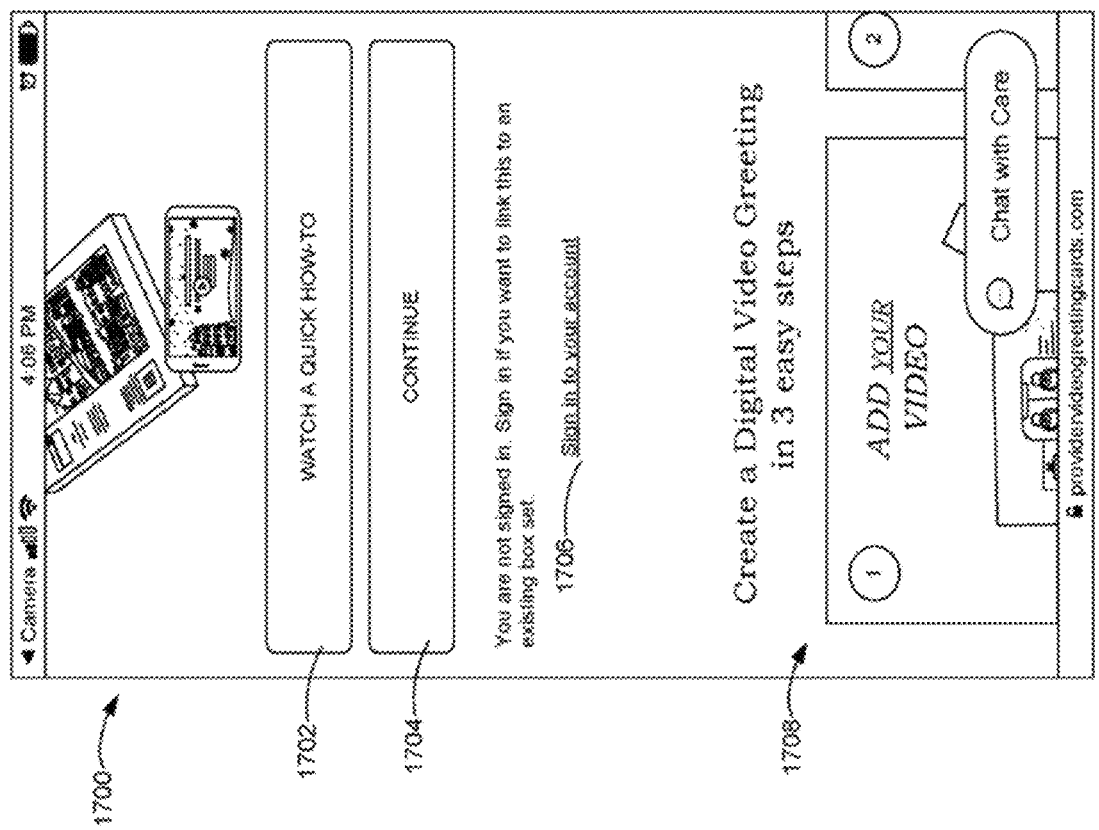
FIGS. 17-19 illustrate a user interface experience for associating one or more tangible objects having the same unique identifier with a single a digital presentation, in accordance with aspects of the technology described herein.
Figure 18:
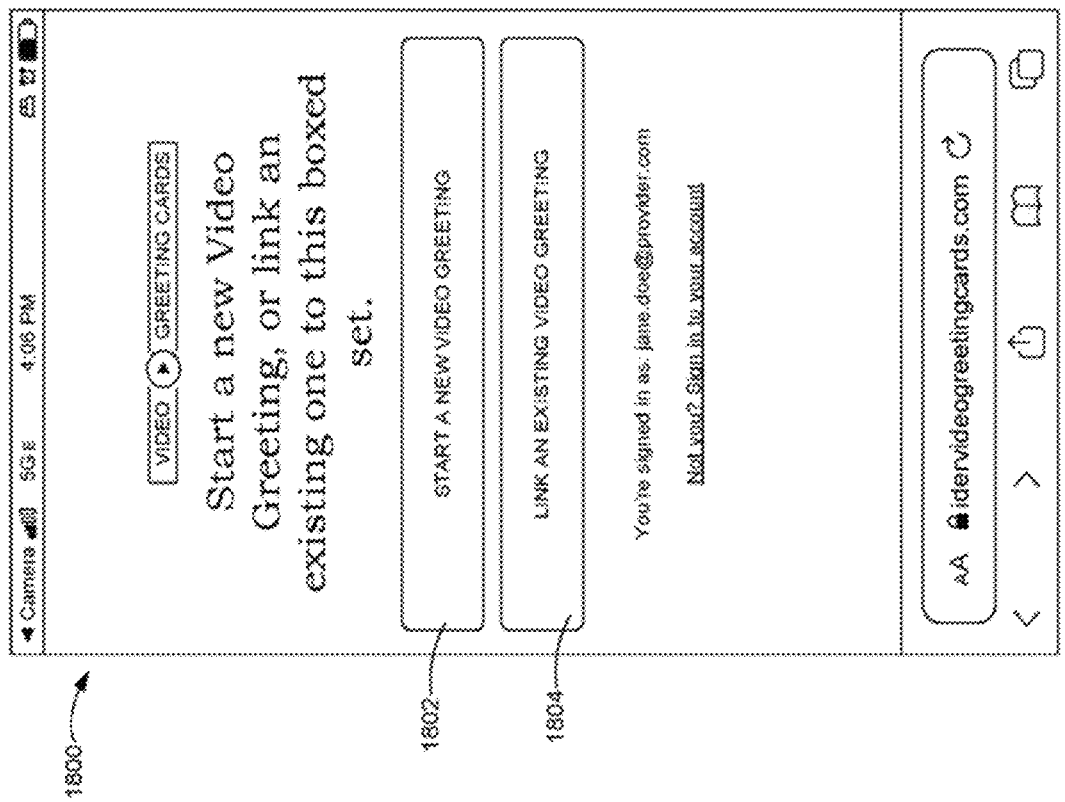
Figure 19:
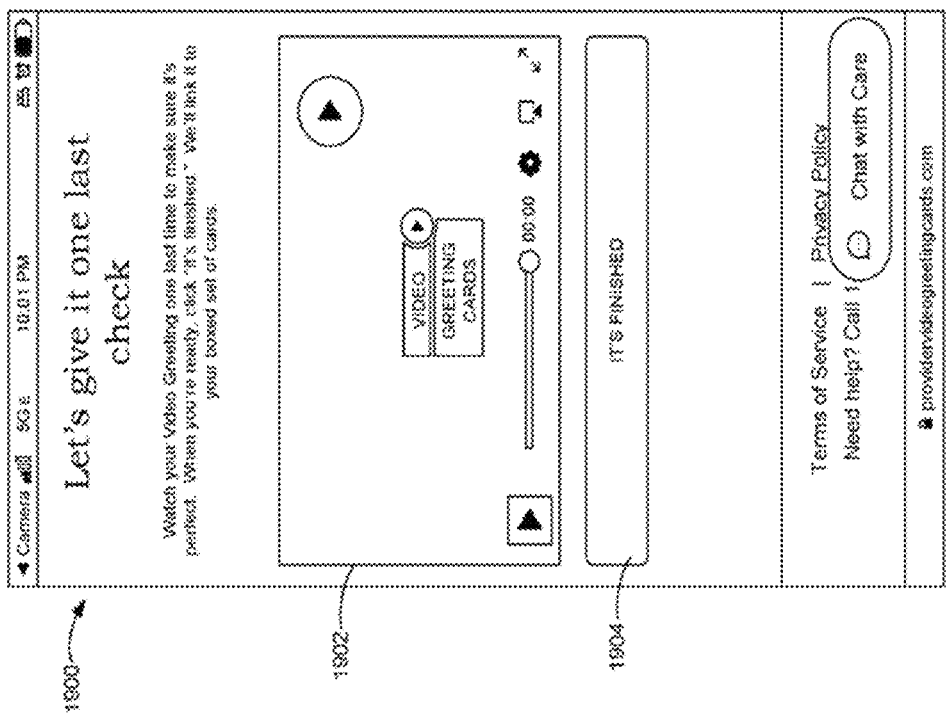

FIGS. 17-19 illustrate actions taken to add an existing digital presentation to a unique identifier, in accordance with aspects of the technology described herein.

Turning now to FIG. 17, an introductory interface 1700 is shown, in accordance with an aspect of the technology describe herein. The introductory interface 1700 may be shown upon the scanning a unique identifier and/or opening a user-experience application 722. The introductory interface 1700 helps a user understand how the application works. The user can view a tutorial by selecting the "watch a quick how-to" button 1702. The user may choose to move to the next interface by selecting the continue button 1704. The user may sign into their account through the sign-in link 1706. The user can navigate through an animation 1708 showing how to add videos to include gift indication or to form a collaborative (or single-person) greeting. Selecting the continue button 1702 may bring the user to a collaborative-asset linking interface 1800.

Turning now to FIG. 18, a collaborative-asset linking interface 1800 is shown, in accordance with an aspect of the technology describe herein. The collaborative-asset linking interface 1800 allows the user to start a new digital presentation or link the unique identifier to an existing digital presentation. The collaborative-asset linking interface 1800 allows the user to navigate to a series of interfaces that help the user create a new digital presentation by selecting the new video greeting button 1802.

Selecting the new video greeting button 1802 may bring the user to starting interface 801. Selecting the existing video greeting button 1804 brings the user to an interface that facilitates linking a unique identifier with an existing digital presentation. Linking a unique identifier with an existing digital presentation can result in two unique identifiers being linked to a single digital presentation. There are many situations where linking one or more unique identifiers to a single digital presentation is beneficial. For example, a first box of greeting cards may all be associated with a single unique identifier. However, the user may wish to send more greeting cards than the amount provided in a single box. In this example, an unlimited number of greeting cards could be linked to the unique identifier by scanning a single instance of a unique identifier associated with a box of cards. In this way, all cards in the box could be linked to the digital presentation. As an example use case, a user could engage their family to generate a holiday greeting video and then link the video to unique identifiers associated with one or more greeting cards or other tangible objects. In this way, all recipients would be able to view the single holiday greeting video through cards or other objects having different unique identifiers.

In one aspect, linking to an existing digital presentation can result in one or more new digital presentations. The new digital presentations can include the same user-provided content, but different themed content provided by the service. The themed content can include an introduction video, conclusion video, music, artwork, color schemes, and the like. In order to create a new digital presentation, the theme content from the existing digital presentation is removed and replaced.

For example, a grandparent may wish to give a different ornament to each grandchild. The ornaments could be selected with a design suited to the child. The grandparent may complete the process of generating a digital presentation and linking it to a first ornament. For example, each grandchild could be invited to share a favorite memory from the year to include in the digital presentation. Each ornament could have a different unique identifier. The unique identifiers on the group of ornaments can all be linked to the same user-provided content (e.g., a holiday greeting video) by linking to the first digital presentation. However, because the introduction and conclusion to the video may be automatically provided by the digital-presentation service to match a theme of an individual ornament, a series of new digital presentations could be generated with theme content that matches the individual ornament. In this instance, the end result is an existing digital presentation becomes a series of digital presentations, each linked to a single unique identifier.

In another aspect, the sender could also start with an existing digital presentation by linking an existing collaborative object to new unique identifier. The sender could then edit the digital presentation by adding content or subtracting content to create a new digital presentation. Upon making an edit, the sender could be asked whether the existing digital presentation should be changed or a new digital presentation created.

Turning now to FIG. 19, a finalization interface 1900 is provided, according to aspects of the technology described herein. The finalization interface 1900 allows the user to review a digital presentation and then finalized it. The digital presentation may be reviewed in the media player 1902. The digital presentation may be finalized by selecting the "finish" button 1904. Upon finalizing the digital presentation, the digital presentation may be saved and transitioned to view mode. The mode associated with the digital presentation can change the default user experience after scanning the unique identifier. In view mode, the digital presentation is automatically played upon scanning the associated unique identifier. View mode is meant of the recipient. In collaboration mode, the customization interface, which invites people to add content, may be displayed.

Figure 20:
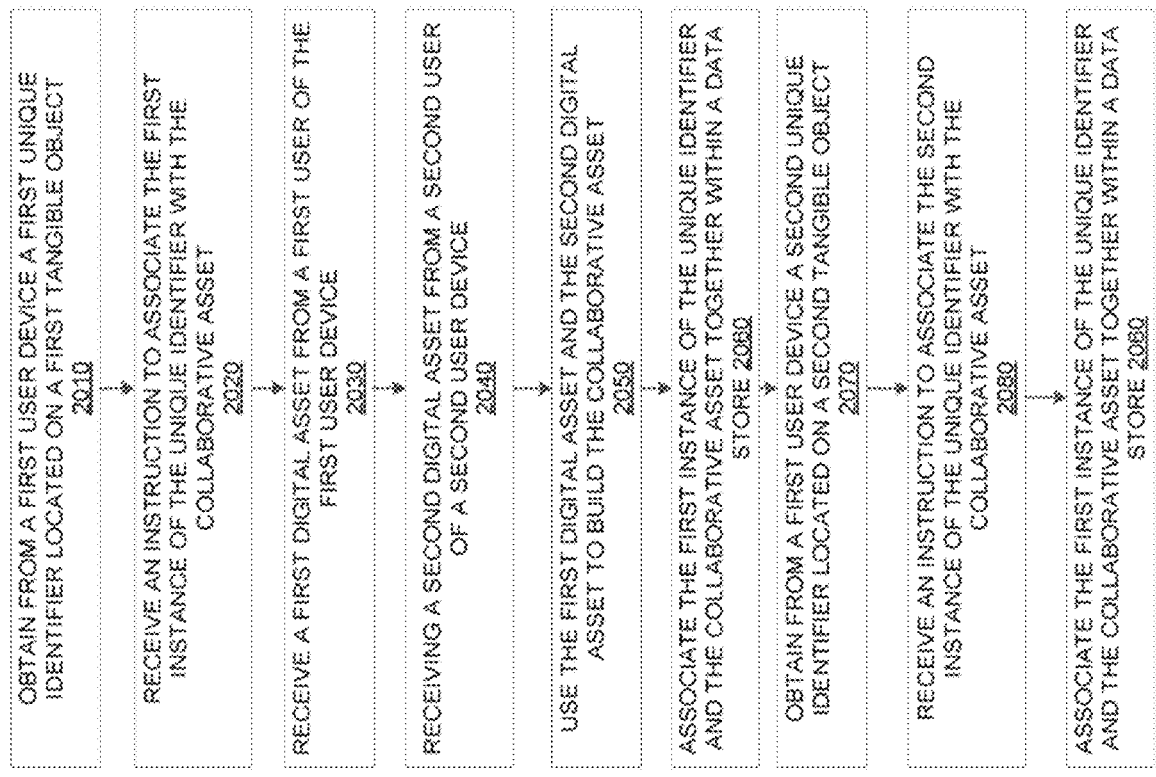
FIGS. 20-21 illustrate methods of generating a digital presentation in accordance with aspects of the technology described herein.

Referring now to FIG. 20, a flow diagram is provided depicting a method 2000 for generating a digital presentation, in accordance with aspects of the technology described herein. The method 2000 comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), to name a few. In addition, method 2000 is described, by way of example, with respect to the features of the corresponding figures described herein. However, these methods may additionally or alternatively be executed by any one system, or any combination of systems, including, but not limited to, those described herein.

At step 2010, the method 2000 includes obtaining from a first user device a first instance of a unique identifier located on the tangible object. At step 2020, the method 2000 includes receiving an instruction to associate the first instance of the unique identifier with the digital presentation. At step 2030, the method 2000 includes receiving a first digital asset from a first user of the first user device. At step 2040, the method 2000 includes receiving a second digital asset from a second user of a second user device.

At step 2050, the method 2000 includes using the first digital asset and the second digital asset to build the digital presentation. At step 2060, the method 2000 includes associating the first instance of the unique identifier and the digital presentation together within a data store. At step 2070, the method 2000 includes obtaining a second instance of a unique identifier located on a second tangible object. At step 2080, the method 2000 includes receiving an instruction to associate the second instance of the unique identifier with the digital presentation. At step 2090, the method 2000 includes associating the second instance of the unique identifier and the digital presentation together within the data store.

Figure 21:
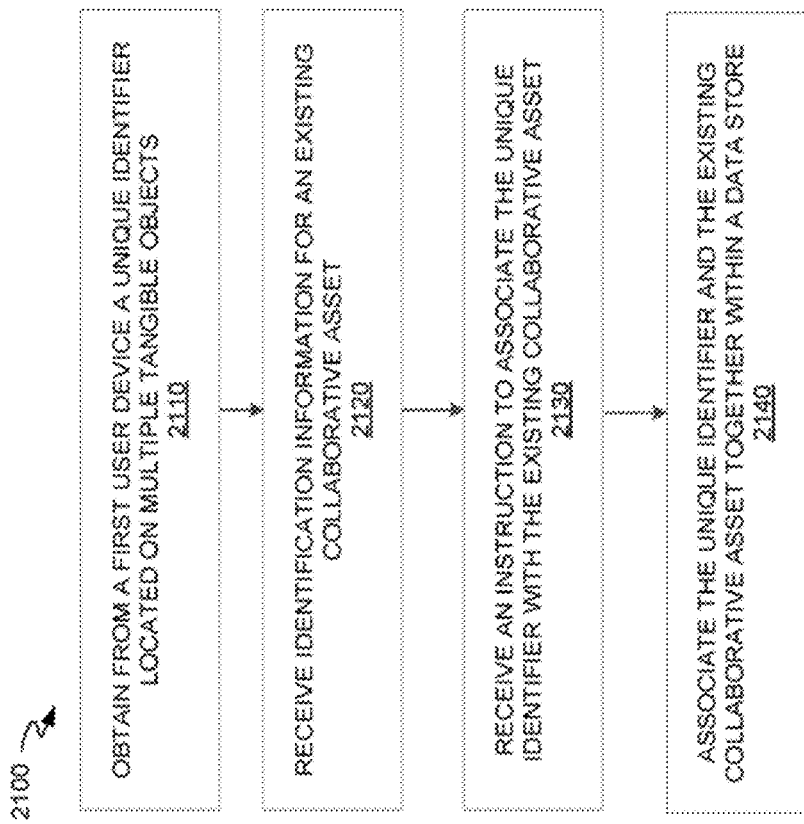

Referring now to FIG. 21, a flow diagram is provided depicting a method 2100 for printing a tangible object with an obscured unique identifier, in accordance with aspects of the technology described herein. At step 2110, the method 2100 includes obtaining from a first user device a unique identifier located on one or more tangible objects. At step 2120, the method 2100 includes receiving identification information for an existing digital presentation. At step 2130, the method 2100 includes receiving an instruction to associate the unique identifier with the existing digital presentation. At step 2140, the method 2100 includes associating the unique identifier and the existing digital presentation together within a data store.

Figure 22:
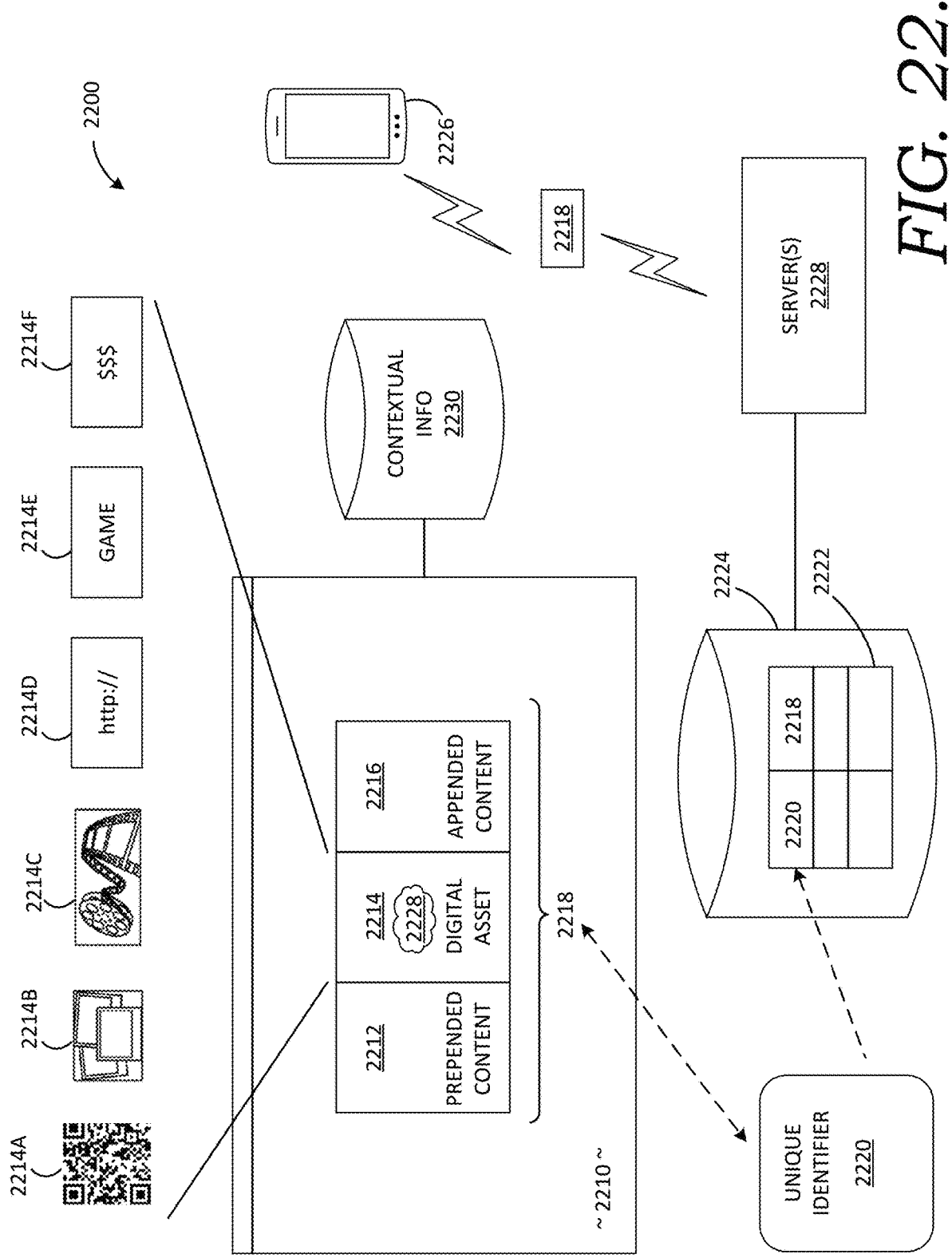
FIG. 22 depicts an illustrative system for practicing an embodiment of the invention.

Turning now to FIG. 22, another illustrative operating environment 2200 suitable for practicing an embodiment of the disclosed technology is provided. System 2200 is similar to and shares aspects with other systems and operating environments described herein, such as that of FIG. 6 or FIG. 7 and components in FIG. 11.

System 2200 facilitates presenting a customization user interface 2210 on a computing device. User interface 2210 receives instructions on customizing a digital presentation 2218, which includes prepended content 2212, a digital asset 2214, and appended content 2216 in one embodiment.

Prepended content 2212 could be personalized introduction, such as a custom greeting, text message, format, etc. Likewise, appended content 2216 could be a custom salutation, parting photograph, ending message, etc.

Digital asset 2214 can take on a variety of forms. It might be a QR code 2214A, pictures 2214B, movie 2214C, web link 2214D, game 2214E, other indication of value 2214F, and the like. In some embodiments, formatting aspects of prepended content 2212 are automatically proposed to a user based on one or more features, such as characteristics of a sender, digital asset 2214, or characteristics of the recipient. Digital asset 2214 can be associated with supplementary information 2228 that dictates conditions to play the digital asset or receive items of value.

Consider the scenario when a sender might want to send someone cash, or a cash-like equivalent via popular apps such the Cash App, Venmo, PayPal, and the like. An embodiment of the disclosed technology provides an alternative or additional way to convey such a gift. Instead of merely sending a QR code, a sender could prepend content 2212 and/or include appended content 2216 that is contextually relevant to the sender, gift, recipient, occasion, location, historical information, time of year, etc.

The digital asset, although including a QR code 2214A, might be a game that the recipient has to play to receive the unit of value, or a series of questions that must be correctly answered, or a riddle—dictated by supplementary information 2228, which can be part of digital asset 2214 or stored in connection with it in database 2224. For example, supplementary information 2228 might preclude conveying value (money, a digital present, etc.) unless the recipient device 2226 is in a certain location, such as that of a first date, or until a certain date arrives, such as an anniversary.

Digital presentation 2218 is associated with a unique identifier 2200. The association of the two can be stored in a table 2222 and stored in a datastore 2224, which is reachable by one or more servers 2228. Thus, when a recipient device 2226 communicates the unique identifier 2218 to the system (e.g., by way of server 2228), the applicable digital presentation 2218 is identifiable and caused to be presented on remote device 2226.

Figure 23:
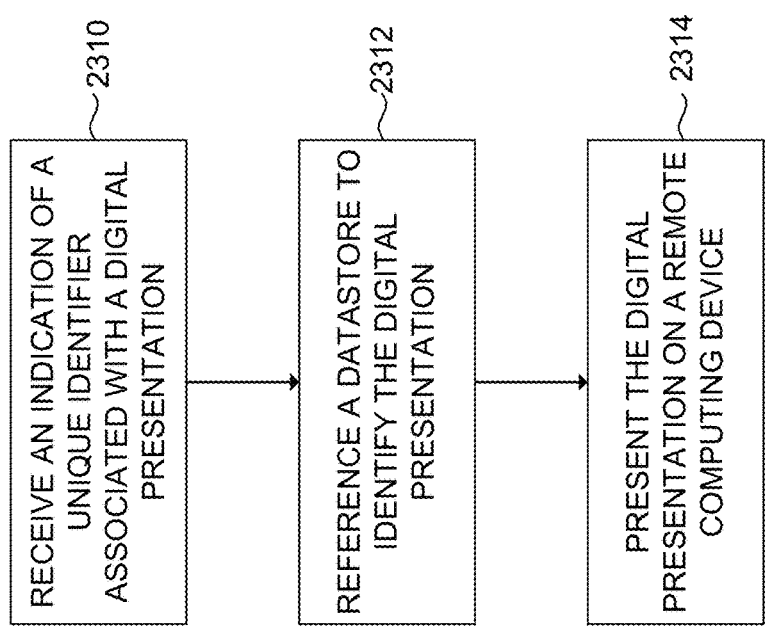
FIGS. 23 & 24 depict illustrative methods of practicing an embodiment of the disclosed technology.

Turning now to FIG. 23, an illustrative method for conveying a customized digital presentation 2218 is provided.

At a step 2310, an indication of a unique identifier is received that is associated with a digital presentation. For example, unique identifier 2218 is received by server 2228 from remote device 2226. For example, a user may have used remove device 2226 (which is remote with respect to server 2228) to scan a QR code (or follow a web link, etc.), leading to conveying a representation 2218 of the unique identifier to server 2228 (which could be a variation of user-experience server 702). And as mentioned, QR code 2214A (part of presentation 2218 in one embodiment) could be a digital representation of value in that it is useable to convey a gift, monetary amount, etc. to a recipient.

At a step 2312, a datastore is referenced to identify the digital presentation. For example, datastore 2224 is referenced, leading to determining that presentation 2218 is associated with unique identifier 2220, which could be a QR code, a bar code, an alpha-numeric string, an RFID component, an NFC component, etc.

At a step 2314, the digital presentation is caused to be presented via the remote computing device. For example, server 2228 could retrieve the data associated with presentation 2218 and have it conveyed (though one or more networks not shown) to remote device 2226, up which it is presented to a user. In one embodiment, this would include presenting the digital representation of value (e.g., QR code 2214A) consistent with a set of presentation instructions. Alternatively or additionally, other components could be presented as part of presentation 2218, such as items 2214B0F, which could include a digital game, a monetary gift, a selection of items from which the recipient could choose a gift, an item customized to the recipient's location at the time of redemption, an experiential gift that requires recipient engagement to receive an ultimate gift, a song playlist, a video playlist, a customized video, a customized set of pictures, a customized set of sounds, a time-delayed that is receivable only upon the occurrence of a timed countdown, an invitation, a letter, an avatar associated with the recipient or others, a live camera feed, or an augmented-reality presentation.

Figure 24:
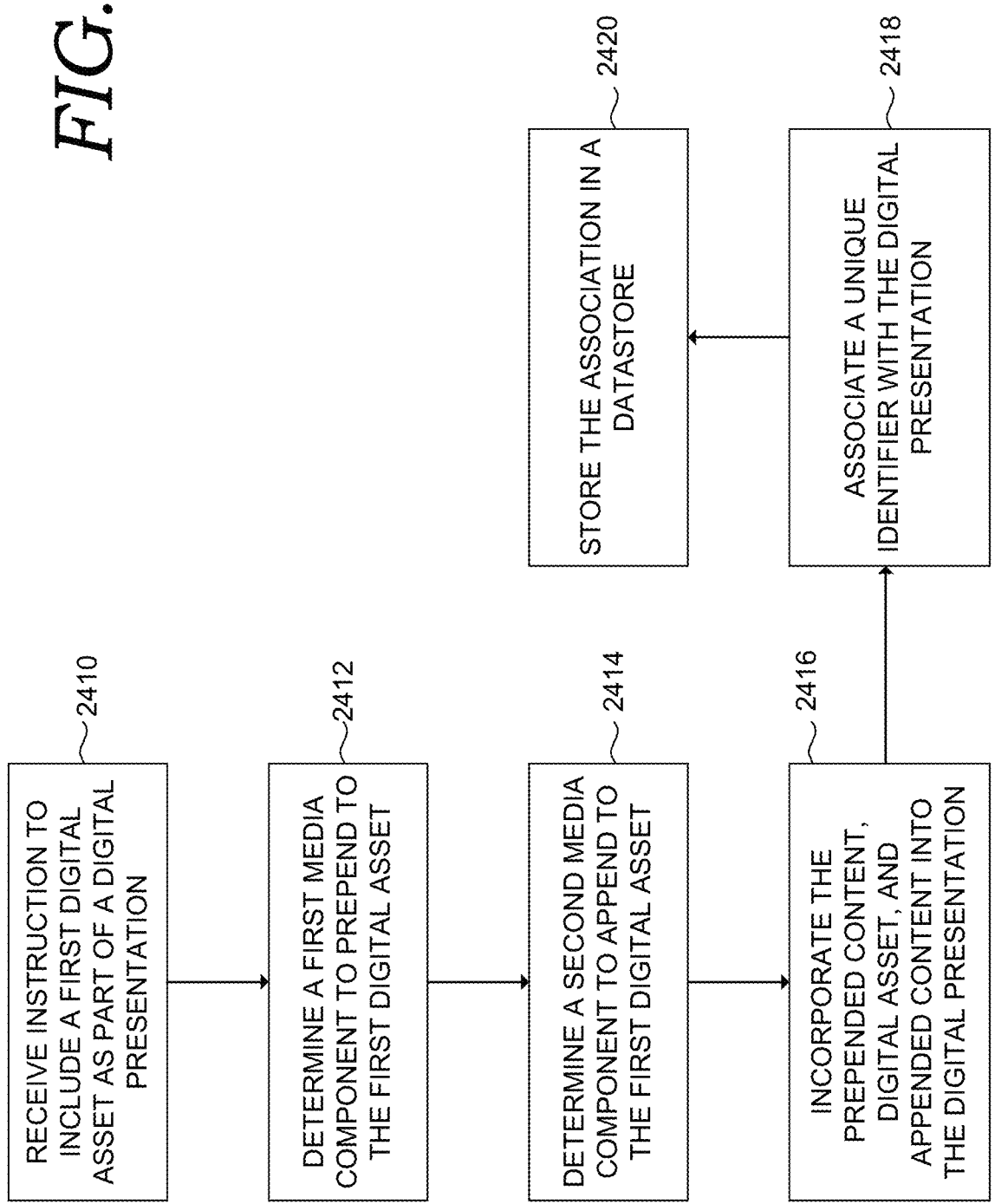

Turning now to FIG. 24, another illustrative method carried out by a set of computer-executable instructions in accordance with an embodiment of the disclosed technology is provided. At a step 2410, an indication is received to include a first digital asset (e.g., 2214A-F) as part of a digital presentation 2218. At a step 2412, a determination of a first media component 2212 to prepend to the first digital asset is made. This determination can be made automatically by the system based on attributes of the digital asset, sender, recipient, historical knowledge of gift giving, etc. (collectively represented as contextual knowledge database 2230). In one embodiment, input from a user is received to help or to make such determination.

For example, say a user uploads a fall picture 2124B. The system might then automatically propose a background or text message as part of prepended content 2212 consistent with the fall picture. Or the system might propose wording that one would not initially expect but would ultimately be applicable. Thus, instead of proposing content always seems consistent, sometimes the system might propose a variation of content that a user would not have normally expected.

As another example, suppose a user uploaded a video of someone blowing out candles. The system might propose birthday-themed content 2212 to prepend to the video. Aspects of such suggestions are more fully described in provisional application No. 63/460,248, which, as mentioned, is incorporated by reference herein.

At a step 2414, a second media component 2216 is determined, which is appended to digital asset 2214. This appended content 2216 can be proposed by the system automatically as is the prepended content 2212. As mentioned, in one embodiment, the digital asset influences the determination of the first 2212 or second 2216 media components.

At a step 2416, prepended content 2212, digital asset 2214, appended content 2216 (and, to the extent separate, additional presentation instructions 2228) are incorporated into digital presentation 2218.

At a step 2418, a unique identifier 2220 is associated with digital presentation 2218 and stored in datastore 2224. Thus, the presentation 2218 is presentable on remote device 2226 incident to it providing the unique identifier 2218 to, for example, server 2228.

In one embodiment, customization options are presented on user interface 2210 to customize prepended content 2212 or appended content 2216. For example, UI 2210 can include buttons, sliders, graphics, color choices, fonts, messages, animations, etc. that can be selected. Often, such options are overwhelming to users. The system helps in that regard by proposing context-relevant customization options based on contextual information 2230, for example, a sender of the first digital asset (via a sender profile), an intended recipient of the first digital asset (via a recipient profile), the digital asset, a location of the sender of the first digital asset, a location of the intended recipient of the first digital asset, or a date.

For example, if a user types in "get well soon" as aspect of prepended content 2212, the system will present sympathy-related options on UI 2210 that a user might select or confirm. Or a user might request that such options be presented.

In some embodiments, the unique identifier is tied to a physical object, such as an ornament, card, picture frame, or other keepsake. For example, unique identifier 2220 could be a QR code on a greeting card that, when scanned by a device such as remote device 2226 causes a recipient experience to be presented on the device.

In this way, another illustrative method of an aspect of the disclosed technology includes presenting a user interface, such as 2212, that enables a user to customize a recipient experience when the system receives an indication of a unique identifier, such as 2220. As mentioned, the user 2210 interface includes controls to define aspects of the recipient experience in one embodiment.

The method further includes receiving (e.g., via the user interface 2210), instructions 2228 that define the aspects of the recipient experience, including instructions that encourage recipient engagement. Instructions 2228 could include completing a game, popping a digital balloon that reveals the digital asset or a portion of it, a condition on an attribute of the recipient or user, preventing fully presenting the digital asset unless a certain activity is achieved (e.g., the recipient walks 10,000 steps), etc. Still further, the recipient can be presented with an option to provide feedback or a return gift or message to the sender (even without revealing the identify of the sender because the system is aware of it), and that feedback can be rewarded by way of a presentation to the receiver.

The method further continues by receiving an indication of a digital gift (e.g., 2214A-2214F) to be included as part of the recipient experience, storing in a datastore 2224 a recipient-experience identifier 2220 that is useable to retrieve aspects of the recipient experience, receiving via a remote computing device 2226 an indication 2218 of the unique identifier, causing the recipient experience 2218 to be presented via the remote computing device 2226, wherein the recipient experience includes the defined aspects.

Figure 25:
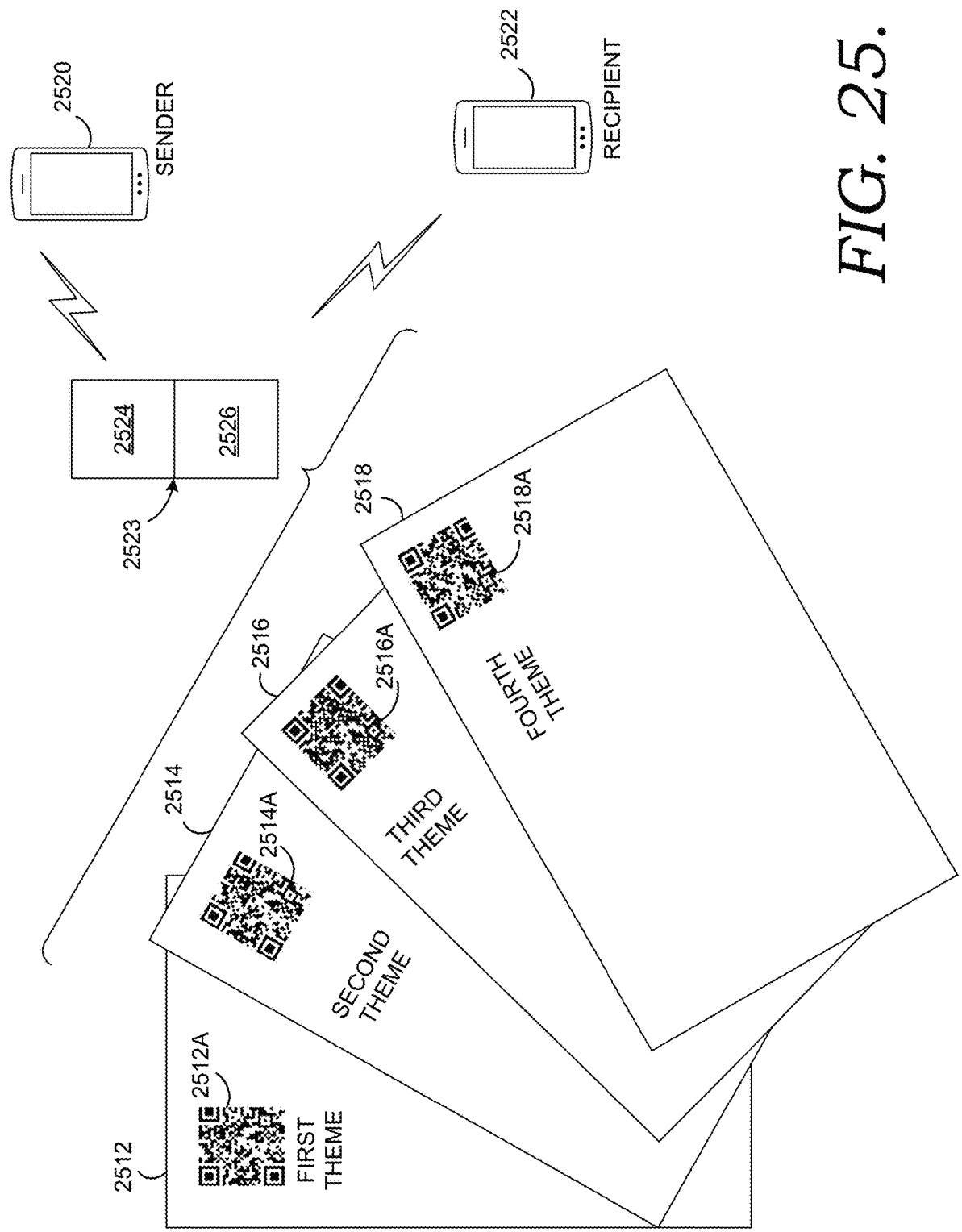
FIG. 25 depicts aspects of a common and supplemental-content embodiment.

FIG. 25 depicts aspects of another embodiment of the disclosed technology, one in which a common portion of a presentation can be presented along with multiple respective one or more supplemental portions, each optionally respectively contextually related to a group of objects, such as, for example, a boxed set of greeting cards. This embodiment accommodates a use case where, for example, a customer might purchase a boxed set of items, such as greeting cards, each of which is to be associated with a sender, and thus includes a common portion of a presentation, but wherein each of which is also associated with variable content based on the recipient, the specific card, or other attribute.

FIG. 25 depicts four illustrative cards 2512, 2514, 2516, and 2518. Each of the cards is respectively associated with a first theme, second theme, third theme, and fourth theme. Similarly, each card is associated with a unique identifier, 2512A, 2514A, 2516A, and 2518A.

For example, first card 2512 might have a birthday theme. Second card 2514 might have a graduation theme. Third card 2516 might have a "Happy Anniversary" theme. And fourth card 2518 might have a "Happy Valentine's Day" theme. In this embodiment, a mother may purchase a boxed set of cards to give to people she cares about. The disclosed technology allows her to record a common message, such as a video of herself in the form of a common greeting. However, when the recipient receives first card 2512, and uses his or her cell phone 2522 to scan QR 2512A, a digital presentation 2523 is presented that is composed of a common portion 2524 and a supplemental portion 2526, where the supplemental portion contextually relates to the theme of the first card.

When recipient 2522 scans first card 2512, common portion 2524 is played, but a birthday theme makes up supplemental portion 2526 because that is the theme associated with card 2512. And without the sender having to record a new common portion, he or she can send a second card 2514 of the same set to recipient 2522, which retrieves a different digital presentation composed of the same common portion 2524 but a different supplemental portion 2526, which contextually relates to the theme of second card 2514 (instead of first card 2512). Perhaps, as mentioned, second card 2514 is a graduation theme. And perhaps the sender desires to send the card to a different recipient. However, the recipient, upon scanning code 2514A, is presented with the same common component 2524 that was associated with first card 2512, but a graduation-related theme given that QR code 2514A (instead of 2512A) was scanned.

A second variation of utilizing the technology in connection with the setting of FIG. 25 includes automatically suggesting different contextual elements, backgrounds, themes, etc. that can be customized by a sender. For example, a sender may purchase a boxed set of cards, as shown. To customize them, sender 2520 would scan first QR code 2512A. The system would recognize first QR code 2512A as well as its corresponding theme and automatically present controls or themes or other suggestions on the user interface of the sender's device 2520 that are contextually relevant to the theme of first card 2512.

But when the sender scans second code 2514A, a different set of controls or options are presented to a sender that are contextually relevant to the second theme associated with second card 2514. The system is pre-programmed to know the themes of each card.

Thus, one embodiment of a method includes respectively associating each of a plurality of number items with a corresponding unique identifier, such as the cards 2512-2518 shown corresponding identifiers 2512A-2518A. Each unique identifier is useable to identify one or more attributes of its corresponding physical item.

One embodiment further includes providing a user interface that includes a set of controls that are useable to receive a communication of common digital content 2524 and receiving the common digital content.

One embodiment further includes receiving from a remote device an indication of a first unique identifier (e.g., 2512A) among the set of unique identifiers and without user intervention, automatically determining supplemental content 2526 that is to be presented with the common digital content 2524. The supplemental content can be selected based on the attributes of the physical item corresponding to the first unique identifier or other attributes (such as those of the sender or recipient) in one embodiment.

The method continues by causing a composite presentation 2523 to be presented on the remote device 2522. The composite presentation includes the supplemental content 2526 and the common digital content 2424 in one embodiment.

The method can also include receiving a second unique identifier (e.g., 2514A) and presenting a different supplemental content 2526 in connection with the common content 2524. The physical items could be packaged in a common packaging.

In another embodiment, each card of FIG. 25 could be completely independent. An actionable unique identifier 2512A enables, incident to a first action (e.g., a user capturing the QR code and following it, entering a unique string of digits, following a hyperlink, etc.), presenting of a first user interface that is useable to customize a presentation, resulting in a customized presentation. And incident to a subsequent action of acting on the same identifier 2512A, the system would present the customized presentation on a remote device (instead of a configuration option). In other embodiments, the sender could further customize the presentation before finalizing. In other embodiments, the sender could be required to first finalize the presentation by selecting a "finalize" option, after which, acting on the identifier 2512A would result in presenting the presentation.

Example Computing Environment.

Figure 11:
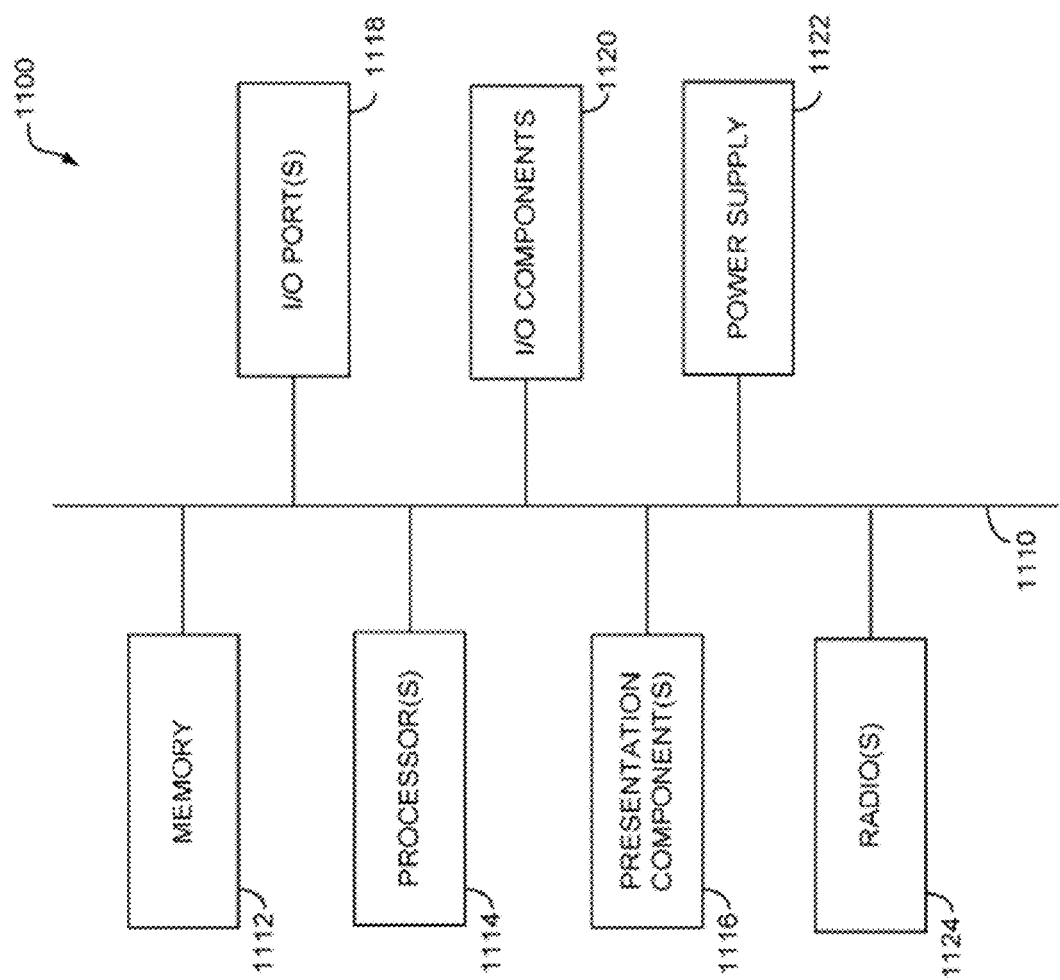
FIG. 11 is a block diagram that illustrates an exemplary computing device.

With reference to FIG. 11, computing device 1100 includes a bus 1110 that direct! y or indirectly couples the following devices: memory 1112, one or more processors 1114, one or more presentation components 1116, one or more input/output (1/O) ports 1118, one or more 1/0 components 1120, and an illustrative power supply 1122. Bus 1110 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an 1/0 component. Also, processors have memory. The inventors hereof recognize that such is the nature of the art and reiterate that the diagram of FIG. 11 is merely illustrative of an exemplary computing device that can be used in connection with one or more aspects of the present technology. Distinction is not made between such categories as "workstation," "server," "laptop," "handheld device," etc., as all are contemplated within the scope of FIG. 11 and with reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise non-transitory computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 1114 that read data from various entities such as memory 1112 or I/O components 1120. Presentation component(s) 1116 presents data indications to a user or other device. Exemplary presentation components include a display device, speaker, printing component, vibrating component, and the like.

The I/O ports 1118 allow computing device 1100 to be logically coupled to other devices, including I/O components 1120, some of which may be built in. Illustrative components include a microphone, joystick, game pad, satellite dish, scanner, printer, wireless device, etc.

The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Some aspects of computing device 1100 may include one or more radio(s) 1124 (or similar wireless communication components). The radio 1124 transmits and receives radio or wireless communications. The computing device 1100 may be a wireless terminal adapted to receive communications and media over various wireless networks. Computing device 1100 may communicate via wireless protocols, such as code division one or more access ("CDMA"), global system for mobiles ("GSM"), or time division one or more access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Embodiments

Embodiment 1. A greeting card customization system comprising: a unique identifier generator configured to dispense a single code for a single greeting card print job, wherein each single greeting card print job comprises a card design and card dimensions. The system also comprising a customization zone template configured to receive the single code and the single greeting card print job. The customization zone template is configured for: 1) accessing by a printing component to facilitate placement of the single code within a printable template zone corresponding to both the card design and the card dimensions; and 2) accessing by a finishing component to facilitate one or more of folding, die-cutting, gluing of the greeting card structure in relation to the printable template zone such that the single code is printed and protected from each process of the finishing component.

Embodiment 2. A method for associating a sample digital asset with a tangible object. The method including obtaining a sample portion of a unique identifier for a digital asset corresponding to a particular tangible object. The method also including associating the sample portion of the unique identifier and a product information display for a merchandiser of a plurality of the particular tangible object, wherein the sample portion comprises at least a first video segment of curated content from a digital asset theme of the particular tangible object.

Embodiment 3. A method for replacing themed content in an existing digital content with a new themed content. The method includes obtaining from a first user device a first instance of a unique identifier located on a first tangible object. The first tangible object having a first theme. The method further includes receiving an instruction to associate the first instance of the unique identifier with a digital asset.

The method further includes receiving a first digital asset from a first user of the first user device. The method further includes retrieving first stock content having the first theme. The method further includes using the first stock content and first digital asset to build a shareable digital asset. The method further includes associating the first instance of the unique identifier and the shareable digital asset together within a data store. The method further includes obtaining a second instance of a unique identifier located on a second tangible object. The second tangible object having a second theme. The method further includes receiving an instruction to associate the second instance of the unique identifier with the sharable digital asset. The method further includes retrieving second stock content having the second theme. The method further includes using the first digital asset and the second stock content to build a new shareable digital asset. The method further includes associating the second instance of the unique identifier and the new shareable digital asset together within a data store.

Explanation of Embodiment 3. The stock content can be stored and associated with the tangible object through the first or second instance of unique identifiers. For example, a first series of unique identifiers could be associated with a first theme. During manufacturing/distribution, unique identifiers from the first series may be associated with tangible objects that share the same theme. The unique identifier may be printed on the tangible objects and/or associated via a tag or label. The association between the theme and the unique identifier can be maintained in a data store that identifies unique identifiers associated with each theme. In order to determine a theme associated with a unique identifier, the unique identifier can be looked up in the data store and a corresponding theme identifier returned. In this way, the stock content with the correct theme can be inserted into a sharable digital asset generated for the tangible object.

The stock content can include introductory content and terminal content. Metadata associated with the first sharable digital asset can identify where the stock content starts and stops within the first sharable digital asset. Generating a second sharable digital asset from the first digital asset can include removing the first stock content having the first theme and adding the second stock content having the second theme.

The method of embodiment 3 allows user provided content to be associated with one or more tangible objects while generating unique sharable digital assets that match the tangible objects. For example, a person could generate a single video greeting and automatically generate four different sharable digital assets by creating the first sharable digital asset and then scanning additional tangible objects having unique identifiers associated with different themes. An instruction can be provided to use the previously created sharable digital asset as a seed for a new asset. Each new sharable digital asset can be retrieved by scanning the associated unique identifier.

As used herein a sharable digital asset includes at least one item of user provided content that is accessible by scanning a unique identifier. The sharable digital asset can include only a single user provided content that is provided by a single user. The storage and retrieval system for a sharable digital asset has been described herein in the context of a digital presentation, which may use the same system.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility, may be employed without reference to other features and sub combinations, and are contemplated within the scope of the claims.

What is claimed is:

1. A card, comprising a first fold that defines a first panel and a second panel, wherein each of the first and second panels includes front and rear surfaces, wherein the second panel includes a void, and wherein the back surface of the first panel includes an actionable unique identifier such that when the card is folded along said first fold, the actionable unique identifier is visible through the void.

2. The card of claim 1, wherein the actionable unique identifier is a QR code, unique web link, an alphanumeric string, or bar code.

3. The card of claim 1, wherein the actionable unique identifier is useable to retrieve a digital presentation.

4. The card of claim 3, wherein the actionable unique identifier is a QR code and the digital presentation is customizable by a user, thereby enabling a remote computing device to scan the QR code to present an option to create or customize the digital presentation.

5. The card of claim 1, wherein the actionable unique identifier is printed on the rear surface of the first panel.

6. The card of claim 5, wherein the actionable unique identifier being printed on the rear surface of the first panel includes a sticker affixed to the rear surface of the first panel, wherein the sticker includes the actionable unique identifier.

7. The card of claim 1, wherein the rear surface of the first panel is affixed to the rear surface of the second panel.

8. The card of claim 1,
wherein the actionable unique identifier enables, incident to a first action, presenting a first user interface that is useable to customize a presentation, resulting in a customized presentation; and
the actionable unique identifier enables, incident to a subsequent action after the first action, presenting the customized presentation on a remote device.

9. The card of claim 1, wherein the actionable unique identifier is useable to start a process for conveying a monetary value to recipient.

10. The card of claim 9, wherein said process for conveying a monetary value to said recipient includes enabling a computing device to scan said actionable unique identifier, thereby presenting a user interface that is useable to convey said monetary value to said recipient.

11. The card of claim 10, further comprising a second fold that defines a third panel such that when said card is closed, the third panel obscures the front surface of the second panel.

12. A card comprising:
an overall front surface defined by a first surface of the card in an unfolded state;
an overall back surface defined by a second surface of the card in an unfolded state;
a first fold line that defines a cover panel and a second panel, thereby providing a cover-panel front surface, cover-panel back surface, a second-panel front surface, and a second-panel back surface;
a void situated in the second panel;
an actionable identifier situated on the back surface of the cover panel such that, when folded, the actionable identifier is visible through the void, wherein the actional identifier is linked to a digital asset retrievable by conveying an indication of the actional identifier to a computing system that is configured to recognize the digital asset.

13. The card of claim 12, wherein the actionable identifier is a QR code.

14. The card of claim 13, wherein the QR code is scannable by a computing device to facilitate a conveyance of a monetary value to a recipient.

15. The card of claim 12, wherein the actionable identifier is printed on the cover-panel back surface.

16. The card of claim 13, wherein the actionable identifier printed on the cover-panel back surface is printed on a sticker that is affixed to the cover-panel back surface.

17. The card of claim 14, wherein facilitating said conveyance of said monetary includes enabling a computing device to scan said actionable unique identifier, thereby presenting a user interface that is useable to convey a said monetary value to said recipient.

* * * * *